(12) United States Patent
Nishioka

(10) Patent No.: US 7,054,053 B2
(45) Date of Patent: *May 30, 2006

(54) OPTICAL APPARATUS

(75) Inventor: Kimihiko Nishioka, Hachioji (JP)

(73) Assignee: Olympus Corporation, Tokyo (JP)

( * ) Notice: Subject to any disclaimer, the term of this patent is extended or adjusted under 35 U.S.C. 154(b) by 17 days.

This patent is subject to a terminal disclaimer.

(21) Appl. No.: 10/887,925

(22) Filed: Jul. 12, 2004

(65) Prior Publication Data

US 2005/0036195 A1    Feb. 17, 2005

Related U.S. Application Data

(63) Continuation of application No. 10/193,757, filed on Jul. 12, 2002, now Pat. No. 6,791,741.

(30) Foreign Application Priority Data

Jul. 13, 2001    (JP) ............................. 2001-213284

(51) Int. Cl.
*G02B 26/00* (2006.01)

(52) U.S. Cl. ..................... 359/291; 359/212; 359/666

(58) Field of Classification Search ................ 359/290, 359/291, 298, 726, 754, 212, 319, 320, 666, 359/667, 676, 631, 720, 739, 209, 210, 211; 349/1, 2, 13, 57, 193, 200, 113, 115, 116
See application file for complete search history.

(56) References Cited

U.S. PATENT DOCUMENTS

| 5,808,781 A | * | 9/1998 | Arney et al. ................. 359/291 |
| 6,464,363 B1 | | 10/2002 | Nishioka |
| 6,572,233 B1 | * | 6/2003 | Northman et al. .......... 359/839 |
| 6,658,208 B1 | * | 12/2003 | Watanabe et al. ............. 396/89 |

FOREIGN PATENT DOCUMENTS

JP    2000-081573    3/2000

OTHER PUBLICATIONS

Vdovin, G., "Quick Focusing of Imagining Optics Using Micromachined Adaptive Mirrors," Optics Communication, vol. 140, Aug. 1, 1997, pp. 187-190.

* cited by examiner

*Primary Examiner*—Georgia Epps
*Assistant Examiner*—Tuyen Tra
(74) *Attorney, Agent, or Firm*—Pillsbury Winthrop Shaw Pittman LLP

(57) ABSTRACT

An optical system having a deformable mirror is such that, in order to minimize variation of an image position on an imaging plane, or of a ray position, in at least two states where shapes of the deformable mirror are different, first- and lower-order terms of an equation expressing a surface of the deformable mirror are changed in the two states. As a result, an optical system including variable optical-property elements such as a variable focal-length lens, a deformable mirror, and a variable prism, and an optical apparatus having the optical system can be provided which is small in power consumption, noiseless, short in response time, simple in mechanical structure, and low in cost, minimize variation of the image position on the imaging plane, and permits sufficient correction for aberration caused by a shape error or the like.

16 Claims, 42 Drawing Sheets

TRANS-TYPE

CIS-TYPE

US 7,054,053 B2

OPTICAL APPARATUS

RELATED APPLICATIONS

This Application is a Continuation of application Ser. No. 10/193,757 filed Jul. 12, 2002 now U.S. Pat. No. 6,791,741, which claims the benefit of Japanese priority document 2001-213284, filed Jul. 13, 2001, the entire contents of which Applications are hereby incorporated by reference.

BACKGROUND OF THE INVENTION

1. Field of the Invention

The present invention relates to variable optical-property elements such as a variable focal-length lens, a variable focal-length diffraction optical element, a variable deflection-angle prism, and a deformable mirror, and to an optical apparatus such as spectacles, a video projector, a digital camera, a TV camera, an endoscope, a telescope, or a camera finder, having an optical system including such variable optical-property elements.

2. Description of Related Art

Conventional lenses have been manufactured by polishing glass. Since the lens itself cannot vary a focal length, a mechanical structure is complicated because a lens unit must be moved along the optical axis for focusing or zooming of a camera, or changing magnification.

Because a motor or the like is used for moving a part of the lens unit, this conventional practice has disadvantages that power consumption is large, noise is produced, response time is long, and much time is required for moving lenses.

For shake prevention as well, mechanical movement of the lenses by a motor or a solenoid causes defects such as a large power consumption and a complicate mechanical structure, resulting in a higher cost.

In a zoom imaging optical system such as a digital camera, the problem is raised that the position of an image on an imaging plane is considerably shifted, depending upon the focal position of reflected light, resulting in a change in a field direction.

Use of a prism of high refractive index causes inconvenience that aberration cannot be completely corrected.

SUMMARY OF THE INVENTION

It is, therefore, an object of the present invention to provide an optical system comprising a variable optical-property element such as a variable focal-length lens, a deformable mirror, or a variable deflection-angle prism, which is low in power consumption, quiet, and short in response time to contribute to cost curtailment, and small in variation of the image position on the imaging plane, and permits sufficient correction for aberration caused by a shape error, and an optical apparatus including the optical system.

In order to achieve the above object, the optical apparatus according to the present invention is provided with a deformable mirror which has positioning marks within or outside a beam passing range of the deformable mirror and on frames for mounting the deformable mirror.

The optical system according to the present invention is provided with a deformable mirror in which, in order to reduce variation of the image position on the imaging plane in at least two states with different shapes of the deformable mirror, first and lower-order terms in an equation expressing the surface of the deformable mirror are changed in the above-mentioned two states.

The optical system according to the present invention is provided with an optical element having a rotationally asymmetric optical surface in order to correct aberration produced by a shape error of the deformable mirror.

This and other objects as well as the features and advantages of the present invention will become apparent from the following detailed description of the preferred embodiments when taken in conjunction with the accompanying drawings.

BRIEF DESCRIPTION OF THE DRAWINGS

FIGS. 24A and 34B are views showing two examples of variable deflection-angle prisms, according to the present invention;

DETAILED DESCRIPTION OF THE PREFERRED EMBODIMENTS

In accordance with the drawings, the embodiments of the present invention will be described below. A description will be given of the examples of structures of a deformable mirror, a variable focal-length lens, and the like which are applicable to the present invention.

Figure 1:
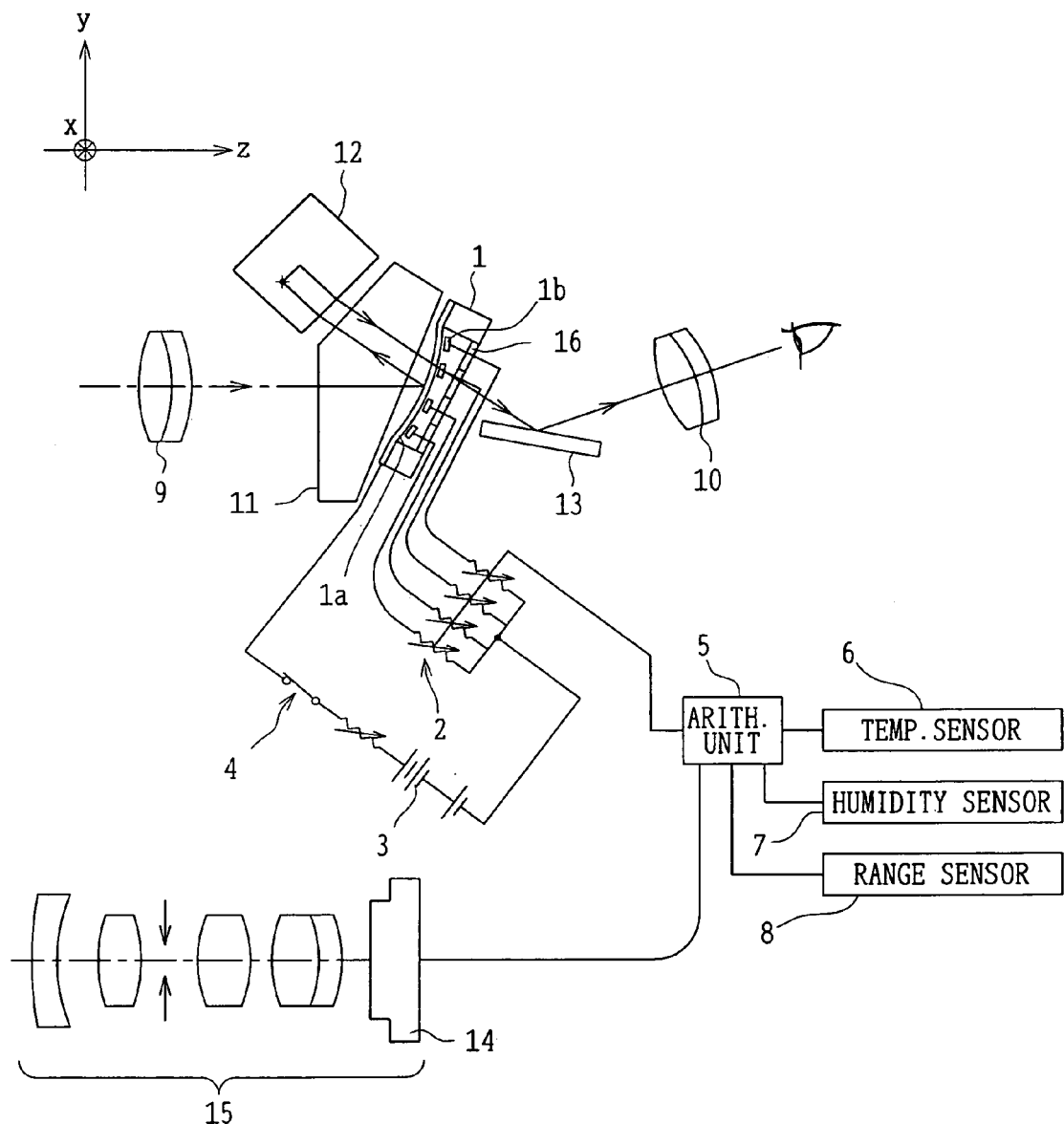
FIG. 1 is a diagram showing schematically a Keplerian finder for a digital camera using a deformable mirror according to one embodiment of the optical apparatus of the present invention.

FIG. 1 shows a Keplerian finder for a digital camera using the deformable mirror which is an embodiment of the optical apparatus according to the present invention. It can, of course, be used for a silver halide film camera. Reference is first made to a deformable mirror 1.

The deformable mirror 1 refers to an optical-property deformable mirror (which is hereinafter simply called a deformable mirror) comprised of a thin film (reflecting surface) 1$a$ coated with aluminum and a plurality of electrodes 1$b$. Reference numeral 2 denotes a plurality of variable resistors connected to the electrodes 1$b$; 3 denotes a power supply connected between the thin film 1$a$ and the electrodes 1$b$ through the variable resistors 2 and a power switch 4; 5 denotes an arithmetical unit for controlling the resistance values of the variable resistors 2; and 6, 7, and 8 denote a temperature sensor, a humidity sensor, and a range sensor, respectively, connected to the arithmetical unit 5, which are arranged as shown in the figure to constitute one optical apparatus.

Each of the surfaces of an objective lens 9, an eyepiece 10, a prism 11, an isosceles rectangular prism 12, a mirror 13, and the deformable mirror 1 need not necessarily be planar, and may have any shape such as a spherical or rotationally symmetrical aspherical surface; a spherical, planar, or rotationally symmetrical aspherical surface which is decentered with respect to the optical axis; an aspherical surface with symmetrical surfaces; an aspherical surface with only one symmetrical surface; an aspherical surface with no symmetrical surface; a free-formed surface; a surface with a nondifferentiable point or line; etc. Moreover, any surface which has some effect on light, such as a reflecting or refracting surface, is satisfactory. In general, such a surface is hereinafter referred as to an extended surface.

The thin film $1a$, like a membrane mirror set forth, for example, in "Handbook of Microlithography, Micromachining and Microfabrication", by P. Rai-Choudhury, Volume 2: Micromachining and Microfabrication, p. 495, FIG. 8.58, SPIE PRESS, or Optics Communication, Vol. 140, pp. 187–190, 1997, is such that when the voltage is applied across the plurality of electrodes $1b$, the thin film $1a$ is deformed by the electrostatic force and its surface profile is changed. Whereby, not only can focusing be adjusted to the diopter of an observer, but also it is possible to suppress deformations and changes of refractive indices, caused by temperature and humidity changes of the lenses 9 and 10 and/or the prism 11, the isosceles rectangular prism 12, and the mirror 13, or the degradation of imaging performance by the expansion and deformation of a lens frame and assembly errors of parts, such as optical elements and frames. In this way, a focusing adjustment and correction for aberration produced by the focusing adjustment can be always properly made.

According to the embodiment, light from an object is refracted by the entrance and exit surfaces of the objective lens 9 and the prism 11, and after being reflected by the deformable mirror 1, is transmitted through the prism 11. The light is further reflected by the isosceles rectangular prism 12 (in FIG. 1, a mark + on the optical path indicates that a ray of light travels toward the back side of the plane of the page), and is reflected by the mirror 13 to enter the eye through the eyepiece 10. As mentioned above, the lenses 9 and 10, the prisms 11 and 12, and the deformable mirror 1 constitute the observing optical system of the optical apparatus in the embodiment. The surface profile and thickness of each of these optical elements is optimized and thereby aberration can be minimized.

Specifically, the configuration of the thin film $1a$, as the reflecting surface, is controlled in such a way that the resistance values of the variable resistors 2 are changed by signals from the arithmetical unit 5 to optimize imaging performance. Signals corresponding to ambient temperature and humidity and a distance to the object are input into the arithmetical unit 5 from the temperature sensor 6, the humidity sensor 7, and the range sensor 8. In order to compensate for the degradation of imaging performance due to the ambient temperature and humidity and the distance to the object in accordance with these input signals, the arithmetical unit 5 outputs signals for determining the resistance values of the variable resistors 2 so that voltages by which the configuration of the thin film $1a$ is determined are applied to the electrodes $1b$. Thus, since the thin film $1a$ is deformed with the voltages applied to the electrodes $1b$, that is, the electrostatic force, it assumes various shapes including an aspherical surface, according to circumstances. The range sensor 8 need not necessarily be used, and in this case, it is only necessary that an imaging lens 15 of the digital camera is moved so that a high-frequency component of an image signal from a solid-state image sensor 14 is roughly maximized, and the object distance is calculated from this position so that an observer's eye is able to focus upon the object image by deforming the deformable mirror.

When the thin film $1a$ is made of synthetic resin, such as polyimide, it can be considerably deformed even at a low voltage, which is advantageous. Also, the prism 11 and the deformable mirror 1 can be integrally configured into a unit.

Although not shown in the figure, the solid-state image sensor 14 may be constructed integrally with the substrate of the deformable mirror 1 by a lithography process.

When each of the lenses 9 and 10, the prisms 11 and 12, and the mirror 13 is configured by a plastic mold, an arbitrary curved surface of a desired configuration can be easily obtained and its fabrication is simple. In the photographing apparatus of the embodiment, the lenses 9 and 10 are arranged separately from the prism 11. However, if the prisms 11 and 12, the mirror 13, and the deformable mirror 1 are designed so that aberration can be eliminated without providing the lenses 9 and 10, the prisms 11 and 12 and the deformable mirror 1 will be configured as one optical block, and the assembly is facilitated. Parts or all of the lenses 9 and 10, the prisms 11 and 12, and the mirror 13 may be made of glass. By doing so, a photographing apparatus with a higher degree of accuracy is obtained.

Also, although in FIG. 1 the arithmetical unit 5, the temperature sensor 6, the humidity sensor 7, and the range sensor 8 are provided so that the deformable mirror 1 compensates for the changes of the temperature, the humidity, and the object distance, the present invention is not limited to this construction. That is, the arithmetical unit 5, the temperature sensor 6, the humidity sensor 7, and the range sensor 8 may be eliminated so that the deformable mirror 1 compensates for only a change of an observer's diopter.

Figure 2:
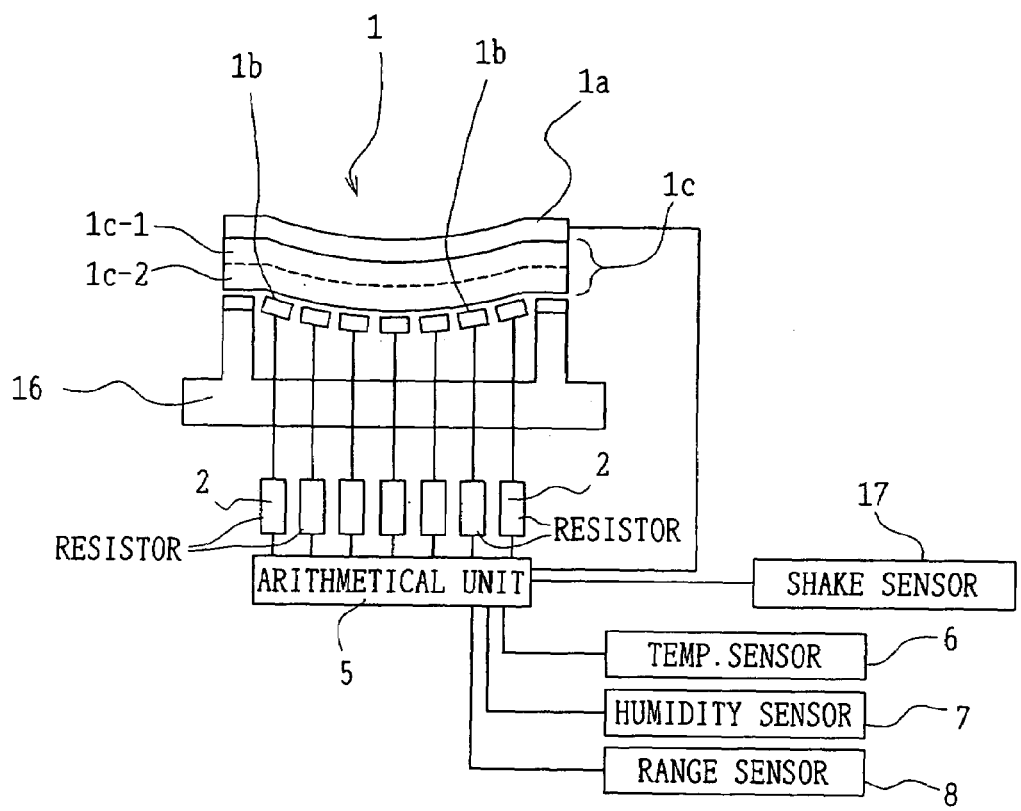
FIG. 2 is a diagram showing schematically another embodiment of a deformable mirror according to the present invention.
Figure 3:
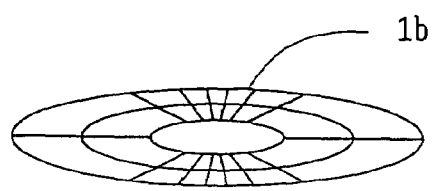
FIG. 3 is an explanatory view showing one aspect of electrodes used in the deformable mirror of FIG. 2.
Figure 4:
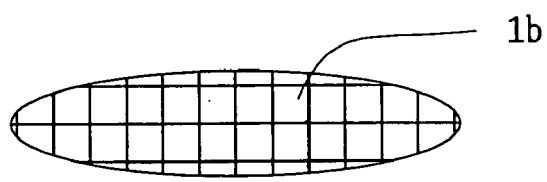
FIG. 4 is an explanatory view showing another aspect of electrodes used in the deformable mirror of FIG. 2.

FIG. 2 shows another embodiment of the deformable mirror 1 according to the present invention. In this embodiment, a piezoelectric element $1c$ is interposed between the thin film $1a$ and the electrodes $1b$, and these are placed on a support 16. A voltage applied to the piezoelectric element $1c$ is changed in accordance with the individual electrodes $1b$, and thereby the piezoelectric element $1c$ causes expansion or contraction which is partially different so that the shape of the thin film $1a$ can be changed. The configuration of the electrodes $1b$ may be selected accordance with the deformation of the thin film $1a$. For example, as illustrated in FIG. 3, it may have a concentric division pattern, or as in FIG. 4, it may be a rectangular division pattern. As other patterns, proper configurations can be chosen.

In FIG. 2, reference numeral 17 represents a shake sensor connected to the arithmetical unit 5. The shake sensor 17, for example, detects the shake of a digital camera and changes the voltages applied to the electrodes $1b$ through the arithmetical unit 5 and the variable resistors 2 in order to deform the thin film $1a$ to compensate for the blurring of an image caused by the shake. At this time, the signals from the temperature sensor 6, the humidity sensor 7, and the range sensor 8 are taken into account simultaneously, and focusing and compensation for temperature and humidity are performed. In this case, stress is applied to the thin film $1a$ by the deformation of the piezoelectric element $1c$, and hence it is good practice to design the thin film $1a$ so that it has a moderate thickness and a proper strength.

Figure 5:
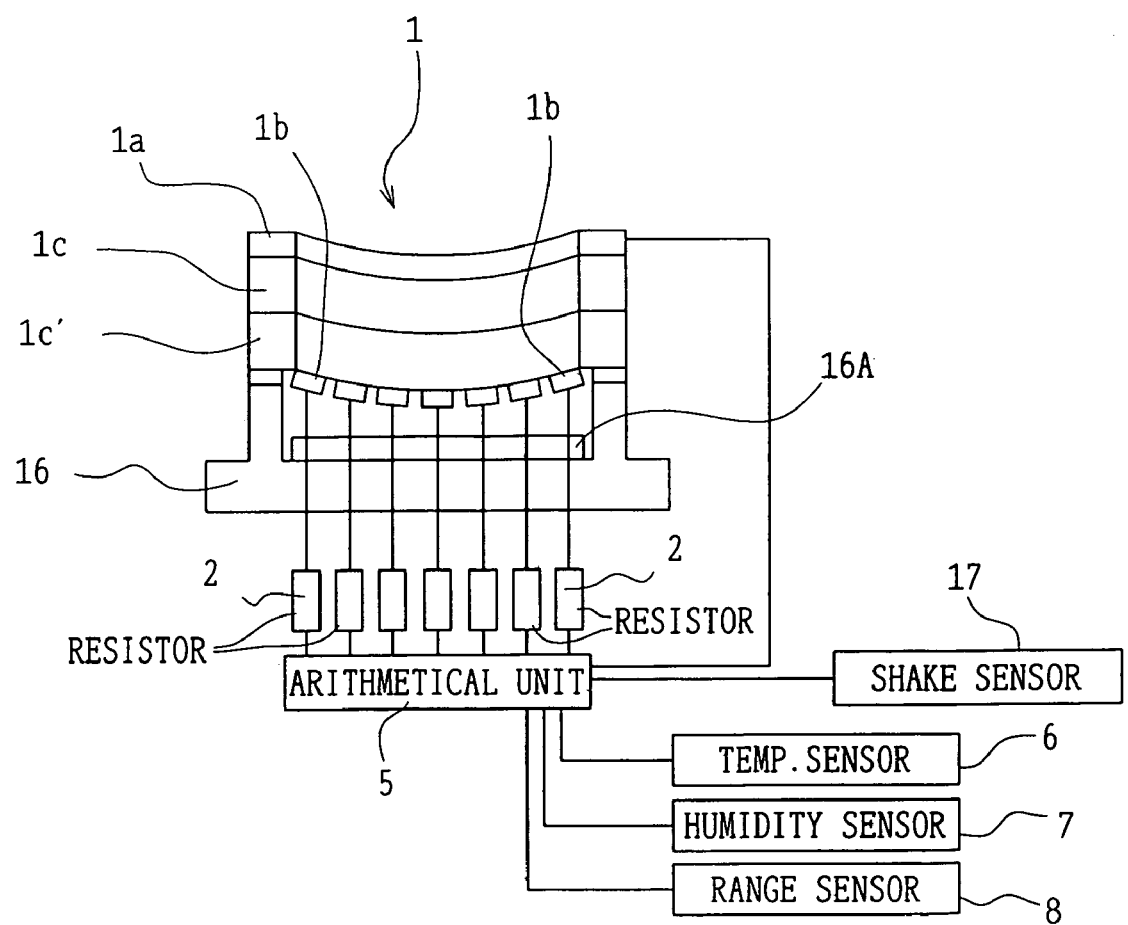
FIG. 5 is a view showing schematically another embodiment of the deformable mirror according to the present invention.

FIG. 5 shows another embodiment of the deformable mirror according to the present invention. This embodiment has the same construction as the embodiment of FIG. 2 with the exception that two piezoelectric elements $1c$ and $1c'$ are interposed between the thin film 1a and the electrodes 1b and are made with substances having piezoelectric characteristics which are reversed in direction. Specifically, when the piezoelectric elements 1c and 1c' are made with ferroelectric crystals, they are arranged so that their crystal axes are reversed in direction with respect to each other. In this case, the piezoelectric elements 1c and 1c' expand or contract in a reverse direction when voltages are applied, and thus there is the advantage that a force for deforming the thin film 1a becomes stronger than in the embodiment of FIG. 2 and as a result, the shape of the mirror surface can be considerably changed.

For substances used for the piezoelectric elements 1c and 1c', for example, there are piezoelectric substances such as barium titanate, Rochelle salt, quartz crystal, tourmaline, KDP, ADP, and lithium niobate; polycrystals or crystals of the piezoelectric substances; piezoelectric ceramics such as solid solutions of $PbZrO_3$ and $PbTiO_3$; organic piezoelectric substances such as PVDF; and other ferroelectrics. In particular, the organic piezoelectric substance has a small value of Young's modulus and brings about a considerable deformation at a low voltage, which is favorable. When the piezoelectric elements 1c and 1c' are used, it is also possible to properly deform the thin film 1a in the above embodiment if their thicknesses are made uneven.

For materials of the piezoelectric elements 1c and 1c', high-polymer piezoelectrics such as polyurethane, silicon rubber, acrylic elastomer, PZT, PLZT, and PVDF; vinylidene cyanide copolymer; and copolymer of vinylidene fluoride and trifluoroethylene are used.

The use of an organic substance, synthetic resin, or elastomer, having a piezoelectric property, brings about a considerable deformation of the surface of the deformable mirror, which is favorable.

Figure 6:
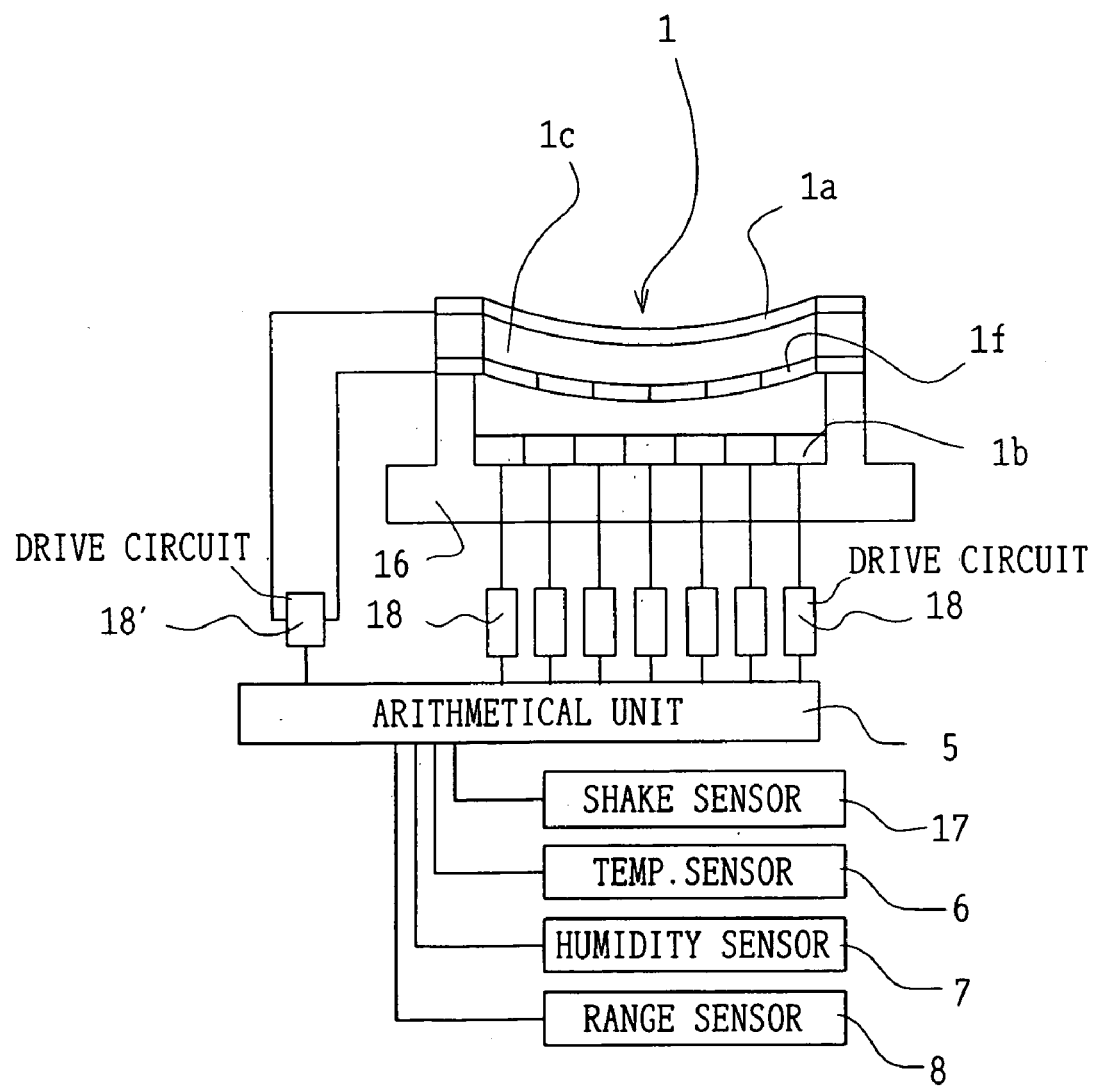
FIG. 6 is a view showing schematically another embodiment of the deformable mirror according to the present invention.

FIG. 6 shows another embodiment of the deformable mirror according to the present invention. The deformable mirror 1 of this embodiment is designed so that the piezoelectric element 1c is sandwiched between the thin film 1a and an electrode 1f, and voltages are applied between the thin film 1a and the electrode 1f through a driving circuit 18' controlled by the arithmetical unit 5. Furthermore, voltages are also applied to the electrodes 1b provided on the support 16, through driving circuits 18 controlled by the arithmetical unit 5. In this embodiment, therefore, the thin film 1a can be doubly deformed by electrostatic forces due to the voltages applied between the thin film 1a and the electrode 1f and applied to the electrodes 1b. There are advantages that various deformation patterns can be provided and the response is quick, compared with any of the above embodiments.

By changing the signs of the voltages applied between the thin film 1a and the electrode 1f, the deformable mirror can be deformed into a convex or concave surface. In this case, a considerable deformation may be performed by a piezoelectric effect, while a slight shape change may be carried out by the electrostatic force. Alternatively, the piezoelectric effect may be used for the deformation of the convex surface, while the electrostatic force may be used for the deformation of the concave surface. Also, the electrode 1f may be constructed as a plurality of electrodes like the electrodes 1b. This condition is shown in FIG. 6.

When an electrostrictive substance, for example, acrylic elastomer or silicon rubber, is used for the piezoelectric element 1c shown in FIGS. 2 and 5, the piezoelectric element 1c, as indicated by a broken line in FIG. 2, may be constructed by cementing another substrate 1c-1 to an electrostrictive substance 1c-2.

In the present invention, all of the piezoelectric effect, the electrostrictive effect, and electrostriction are generally called the piezoelectric effect. Thus, it is assumed that the electrostrictive substance is included in the piezoelectric substance.

Figure 7:
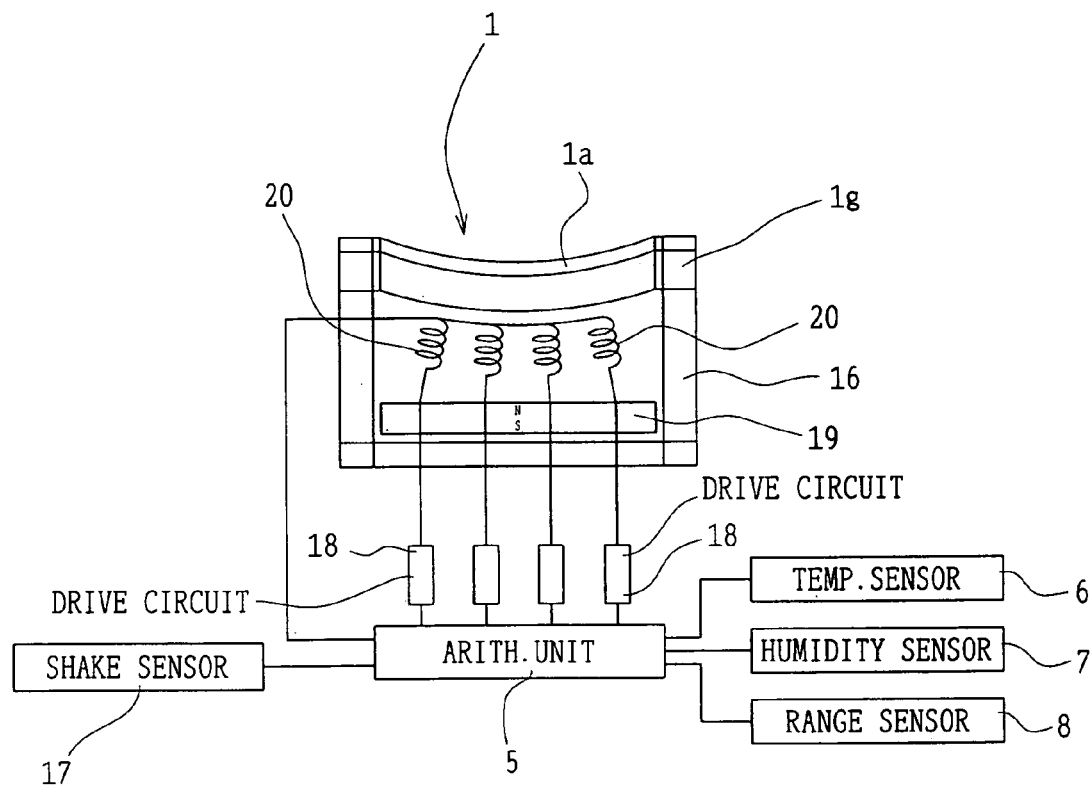
FIG. 7 is a view showing schematically another embodiment of the deformable mirror according to the present invention.

FIG. 7 shows another embodiment of the deformable mirror according to the present invention. The deformable mirror 1 of this embodiment is designed so that the shape of the reflecting surface can be changed by utilizing an electromagnetic force. A permanent magnet 19 mounted and fixed on a bottom surface inside the support 16, and the periphery of a substrate 1g made with silicon nitride or polyimide is mounted on the top surface thereof. The thin film 1a consisting of the coating of metal, such as aluminum, is deposited on the surface of the substrate 1g, thereby constituting the deformable mirror 1. Below the substrate 1g, a plurality of coils 20 are arranged and connected to the arithmetical unit 5 through the driving circuits 18. In accordance with output signals from the arithmetical unit 5 corresponding to changes of the optical system obtained at the arithmetical unit 5 by signals from the sensor 6, 7, 8, and 17, proper electric currents are supplied from the driving circuits 18 to the coils 20. At this time, the coils 20 are repelled or attracted by the electromagnetic force with the permanent magnet 19 to deform the substrate 1g and the thin film 1a.

In this case, a different amount of current can also be caused to flow through each of the coils 20. A single coil 20 may be used, and the permanent magnet 19 may be provided on the substrate 1g so that the coils 20 are arranged on the bottom side in the support 16. It is desirable that the coils 20 are fabricated by a lithography process. A ferromagnetic core (iron core) may be encased in each of the coils 20.

Figure 8:
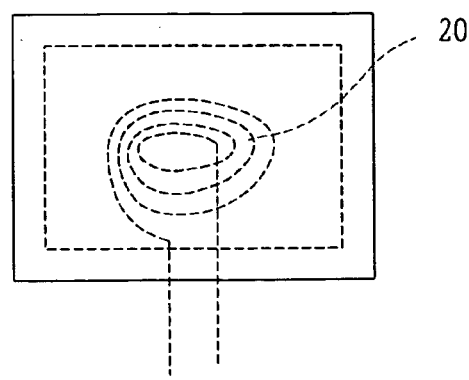
FIG. 8 is an explanatory view showing the winding density of a thin-film coil in the embodiment of FIG. 7.

In this case, each of the coils 20, as illustrated in FIG. 8, can be designed so that a coil density varies with place and thereby a desired deformation is brought to the substrate 1g and the thin film 1a. A single coil 20 may be used, and a ferromagnetic core (iron core) may be encased in each of the coils 20.

Figure 9:
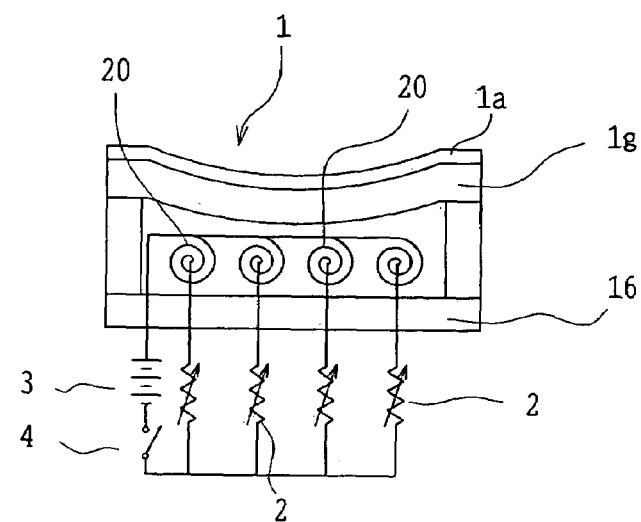
FIG. 9 is a view showing schematically another embodiment of the deformable mirror according to the present invention.

FIG. 9 shows another embodiment of the deformable mirror according to the present invention. In the deformable mirror 1 of this embodiment, the substrate 1g is made with a ferromagnetic such as iron, and the thin film 1a as a reflecting film is made with aluminum. In this case, since the thin film coils need not be used, the structure is simple and the manufacturing cost can be reduced. If the power switch 4 is replaced with a changeover and power on-off switch, the directions of currents flowing through the coils 20 can be changed, and the configuration of the substrate 1g and the thin film 1a can be changed at will.

Figure 10:
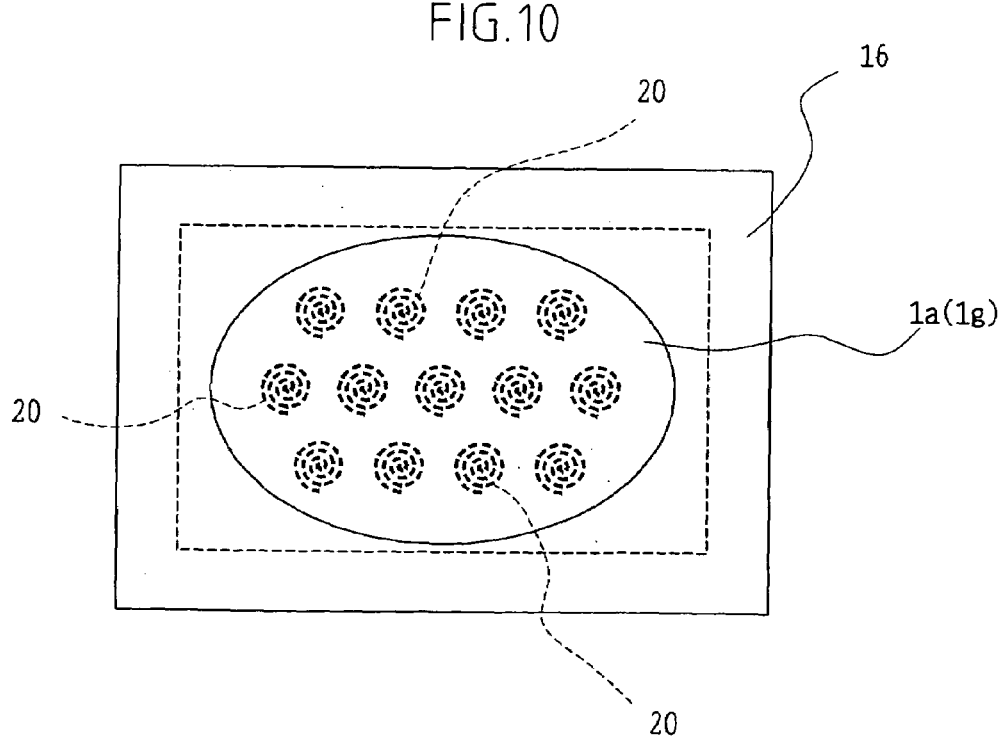
FIG. 10 is an explanatory view showing an example of an array of coils in the embodiment of FIG. 9.
Figure 11:
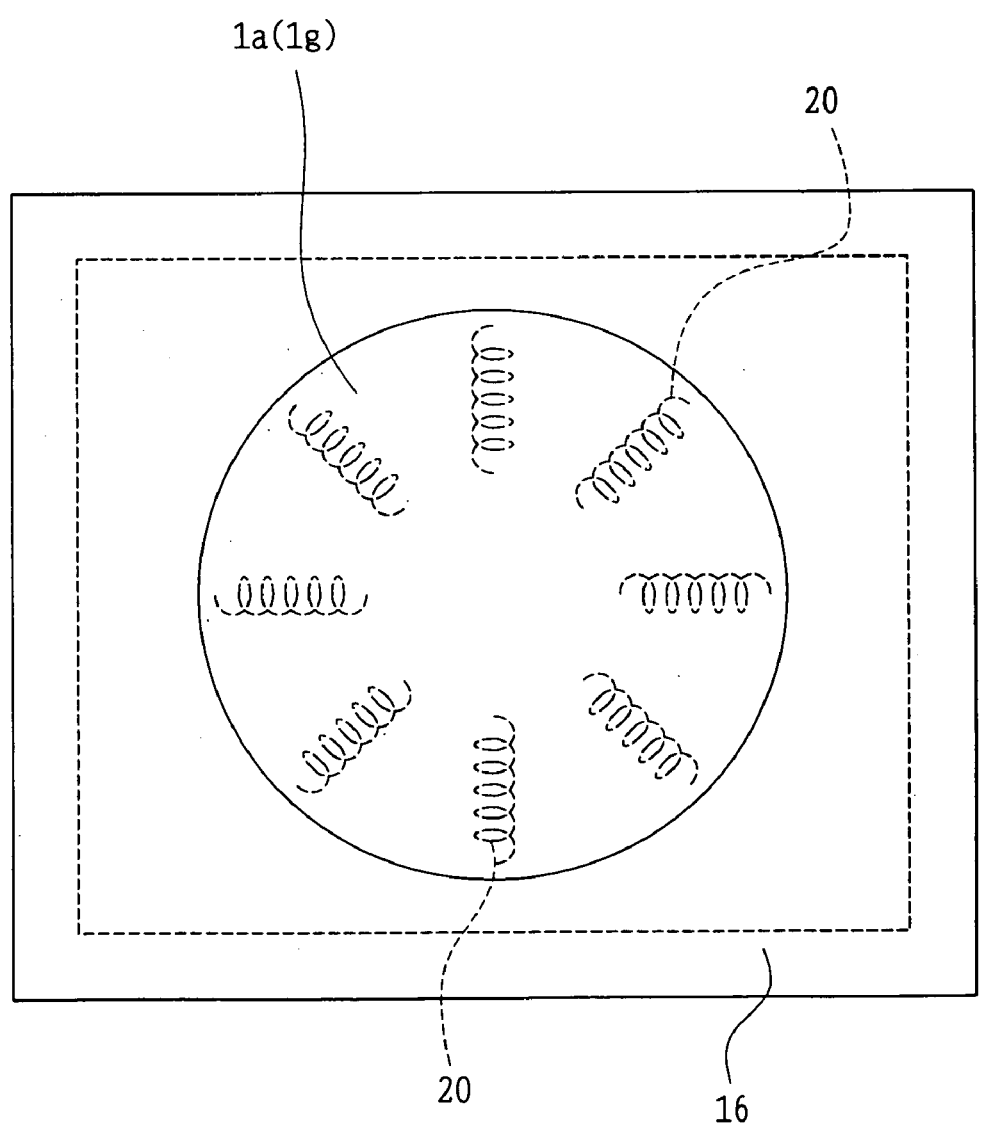
FIG. 11 is an explanatory view showing another example of the array of coils in the embodiment of FIG. 9.
Figure 12:
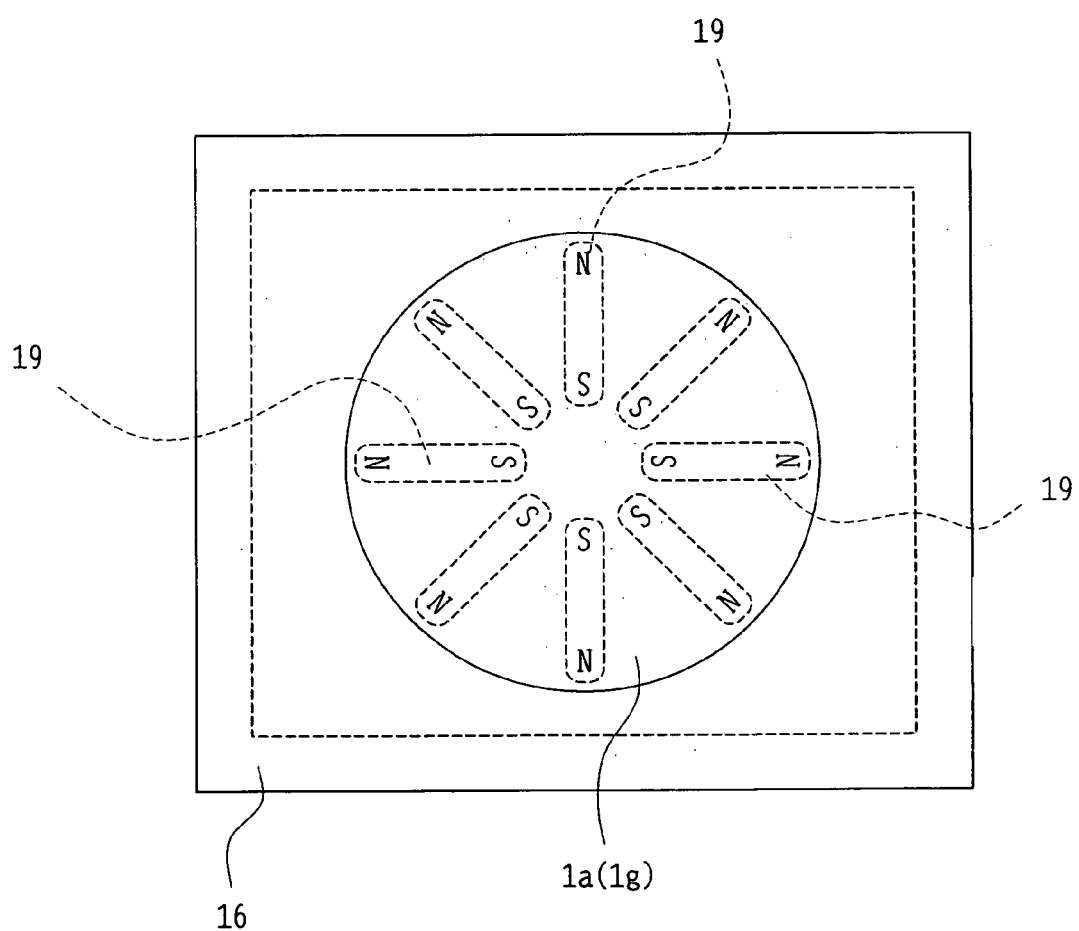
FIG. 12 is an explanatory view showing an array of permanent magnets suitable for the array of coils of FIG. 11 in the embodiment of FIG. 9.

FIG. 10 shows an array of the coils 20 in this embodiment, and FIG. 11 shows another array of the coils 20. These arrays are also applicable to the embodiment of FIG. 7. FIG. 12 shows an array of the permanent magnets 19 suitable for the array of the coils of FIG. 11 in the embodiment of FIG. 7. Specifically, when the permanent magnets 19, as shown in FIG. 12, are radially arranged, a delicate deformation can be provided to the substrate 1g and the thin film 1a in contrast with the embodiment of FIG. 7. As mentioned above, when the electromagnetic force is used to deform the substrate 1g and the thin film 1a (in the embodiments of FIGS. 7 and 9), there is the advantage that they can be driven at a lower voltage than in the case where the electrostatic force is used.

Some embodiments of the deformable mirror have been described, but as shown in FIG. 6, at least two kinds of forces may be used in order to change the shape of the deformable mirror. Specifically, at least two of the electrostatic force, electromagnetic force, piezoelectric effect, magnetostriction, pressure of a fluid, electric field, magnetic field, temperature change, and electromagnetic wave, may be used simultaneously to deform the deformable mirror. That is, when at least two different driving techniques are used to make the variable optical-property element, a considerable deformation and a slight deformation can be realized simultaneously and a mirror surface with a high degree of accuracy can be obtained.

Figure 13:
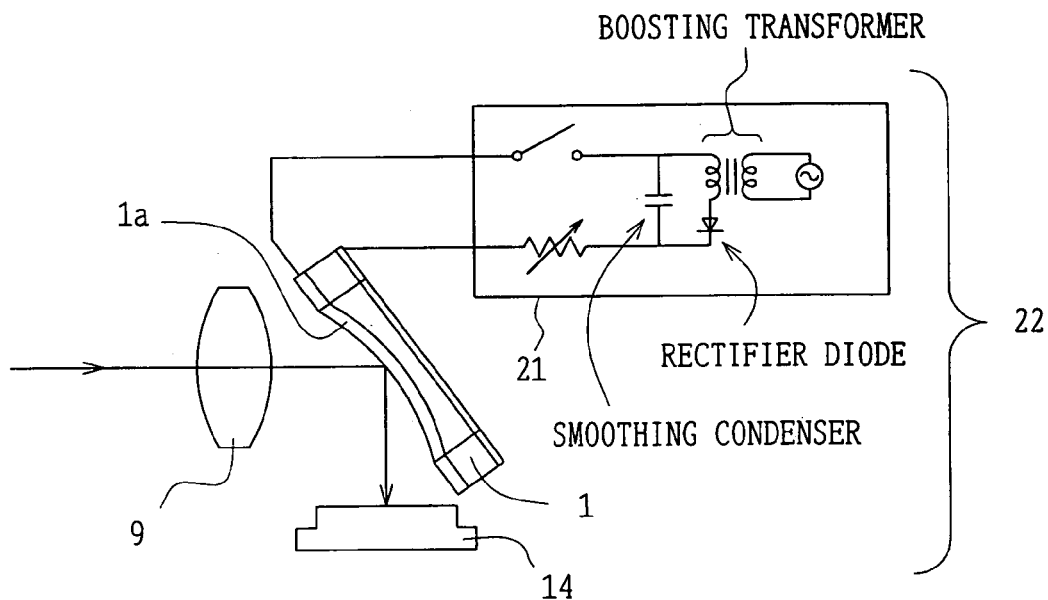
FIG. 13 is a view showing schematically an imaging system which uses the deformable mirror applicable to the optical apparatus in another embodiment of the present invention.

FIG. 13 shows an imaging system which uses the deformable mirror applicable to the optical apparatus in another embodiment of the present invention, and which is used, for example, in a digital camera of a cellular phone, a capsule endoscope, an electronic endoscope, a digital camera for personal computers, or a digital camera for PDAs. In the imaging system of this embodiment, one imaging device 22 is constructed with the deformable mirror 1, the lens 9, the solid-state image sensor 14, and a control system 21. In the imaging device 22 of the embodiment, light from an object passing through the lens 9 is condensed by the deformable mirror 1 and is imaged on the solid-state image sensor 14. The deformable mirror 1 is a kind of variable optical-property element and is also referred to as a variable focal-length mirror.

According to this embodiment, even when the object distance is changed, the deformable mirror 1 is deformed and thereby the object can be brought into a focus. The embodiment need not use the motor to move the lens and excels in compact and lightweight design and low power consumption. The imaging device 22 can be used in any of the embodiments as the imaging system of the present invention. When a plurality of deformable mirrors 1 are used, a zoom or variable magnification imaging system or optical system can be constructed.

In FIG. 13, an example of a control system which includes the boosting circuit of a transformer using coils in the control system 21 is cited. When a laminated piezoelectric transformer is particularly used, a compact design is achieved. The boosting circuit can be used in the deformable mirror or the variable focal-length lens of the present invention which uses electricity, and is useful in particular for the deformable mirror or the variable focal-length lens which utilizes the electrostatic force or the piezoelectric effect.

In the deformable mirror or the variable focal-length lens which uses the electrostatic force or the piezoelectric effect, a high voltage is sometimes required for drive. In this case, for example, as shown in FIG. 13, it is desirable that the boosting transformer or the piezoelectric transformer is used to constitute the control system.

If the thin film 1*a* for reflection is also provided in a portion which is not deformed, it can be used as a reference surface when the profile of the deformable mirror is measured by an interferometer, which is convenient.

Figure 14:
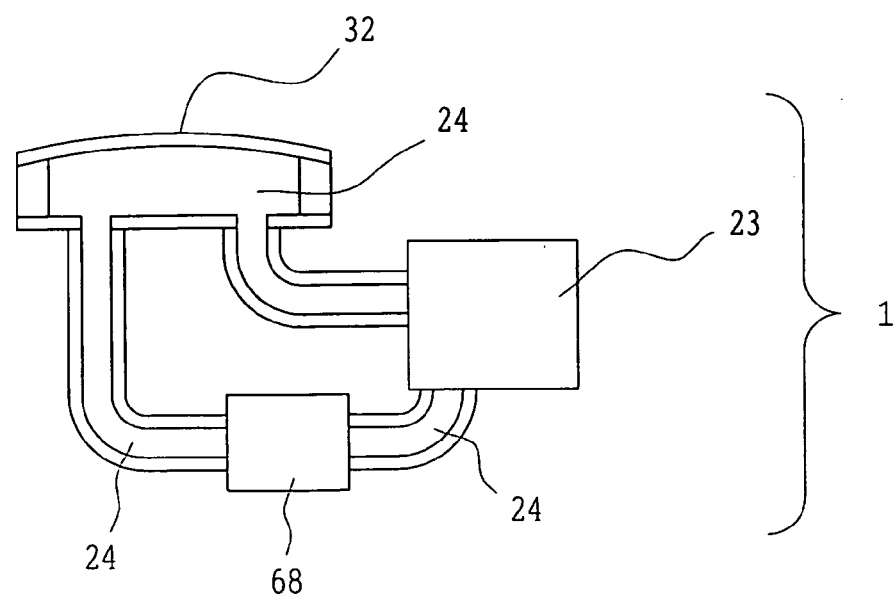
FIG. 14 is a view showing schematically the deformable mirror according to another embodiment of the present invention.

FIG. 14 shows the deformable mirror 1 in which a fluid 24 is taken in and out by a micropump 23 to deform a mirror surface, in another embodiment of the deformable mirror of the present invention. According to this embodiment, there is the merit that the mirror surface can be considerably deformed. Also, in this figure, reference numeral 32 denotes a reflecting firm and 68 denotes a liquid tank.

The micropump 23 is a small-sized pump, for example, made by a micromachining technique and is constructed so that it is operated with an electric power. As examples of pumps made by the micromachining technique, there are those which use thermal deformations, piezoelectric substances, and electrostatic forces.

Figure 15:
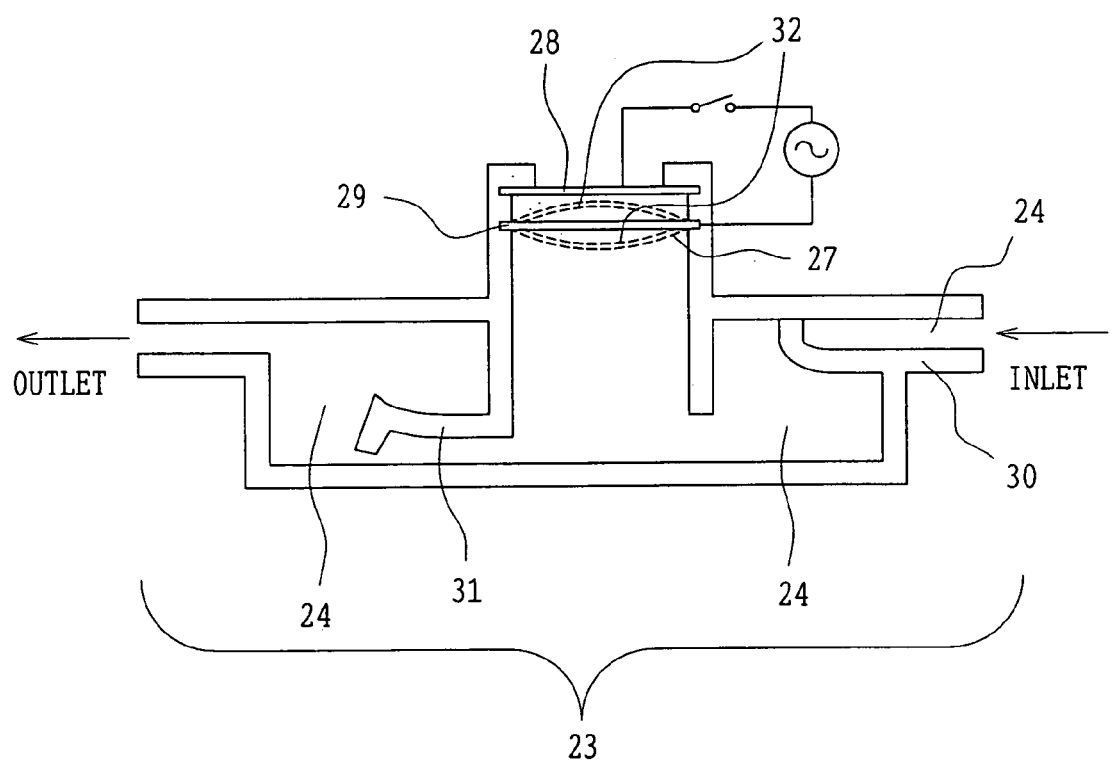
FIG. 15 is a view showing schematically an example of a micropump applicable to the present invention.

FIG. 15 shows an example of a micropump applicable to the present invention. In the micropump 23 of the embodiment, a vibrating plate 27 is vibrated by the electrostatic force or the electric force of the piezoelectric effect. In this figure, a case where the vibrating plate is vibrated by the electrostatic force is shown and reference numerals 28 and 29 represent electrodes. Dotted lines indicate the vibrating plate 27 where it is deformed. When the vibrating plate 27 is vibrated, two valves 30 and 31 are opened and closed to feed the fluid 24 from the right to the left.

In the micropump of this embodiment, the reflecting film 32 is deformed into a concave or convex surface in accordance with the amount of the fluid 24, and thereby functions as the deformable mirror. The deformable mirror is driven by the fluid 24. An organic or inorganic substance, such as silicon oil, air, water, or jelly, can be used as the fluid.

Figure 16:
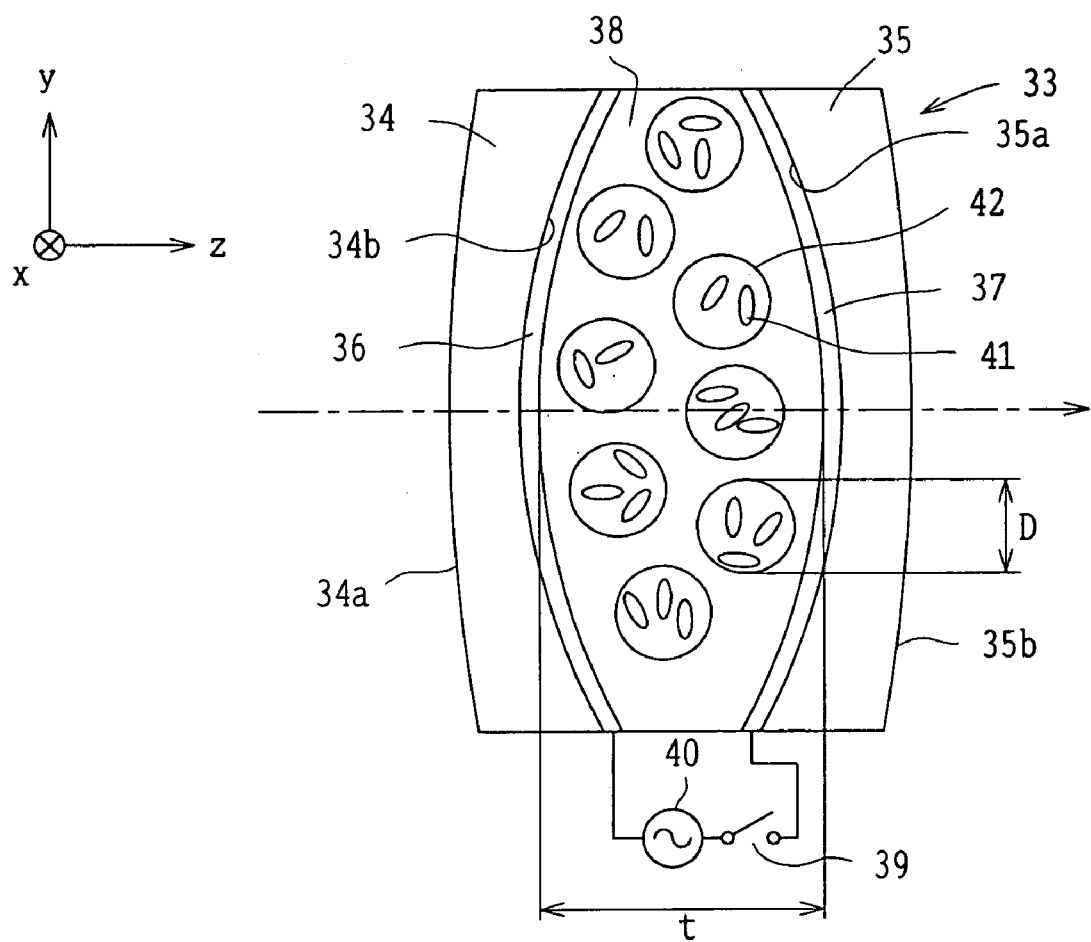
FIG. 16 is a view showing the principal structure of a variable focal-length lens according to the present invention.

FIG. 16 shows the structure of a variable focal-length lens according to the present invention, a variable focal-length lens 33 includes a first lens 34 having lens surfaces 34*a* and 34*b* as a first surface and a second surface, respectively, a second lens 35 having lens surfaces 35*a* and 35*b* as a third surface and a fourth surface, respectively, and a macromolecular dispersed liquid crystal layer 38 sandwiched between these lenses through transparent electrodes 36 and 37. Incident light is converged through the first and second lenses 34 and 35. The transparent electrodes 36 and 37 are connected to an alternating-current power supply 40 through a switch 39 so that an alternating-current electric field is selectively applied to the macromolecular dispersed liquid crystal layer 38. The macromolecular dispersed liquid crystal layer 38 is composed of a great number of minute macromolecular cells 42, each having any shape, such as a sphere or polyhedron, and including liquid crystal molecules 41, and its volume is equal to the sum of volumes occupied by macromolecules and the liquid crystal molecules 41 which constitute the macromolecular cells 42.

Here, for the size of each of the macromolecular cells 42, for example, in the case of a sphere, when an average diameter is denoted by D and the wavelength of light used is denoted by λ, the average diameter D is chosen to satisfy the following condition:

$$2 \text{ nm} \leq D \leq \lambda/5 \quad (1)$$

That is, the size of each of the liquid crystal molecules 41 is at least about 2 nm and thus the lower limit of the average diameter D is set to about 2 nm or larger. The upper limit of the diameter D depends on a thickness t of the macromolecular dispersed liquid crystal layer 38 in the direction of the optical axis of the variable focal-length lens 33. However, if the diameter is larger than the wavelength λ, a difference between the refractive indices of the macromolecules and the liquid crystal molecules 41 will cause light to be scattered at the interfaces of the macromolecular cells 42 and will render the liquid crystal layer 38 opaque. Hence, the upper limit of the diameter D should be λ/5 or less. A high degree of accuracy is not necessarily required, depending on an optical product using the variable focal-length lens. In this case, the diameter D below the value of the wavelength λ is satisfactory. Also, the transparency of the macromolecular dispersed liquid crystal layer 38 deteriorates with increasing thickness t.

Figure 17:
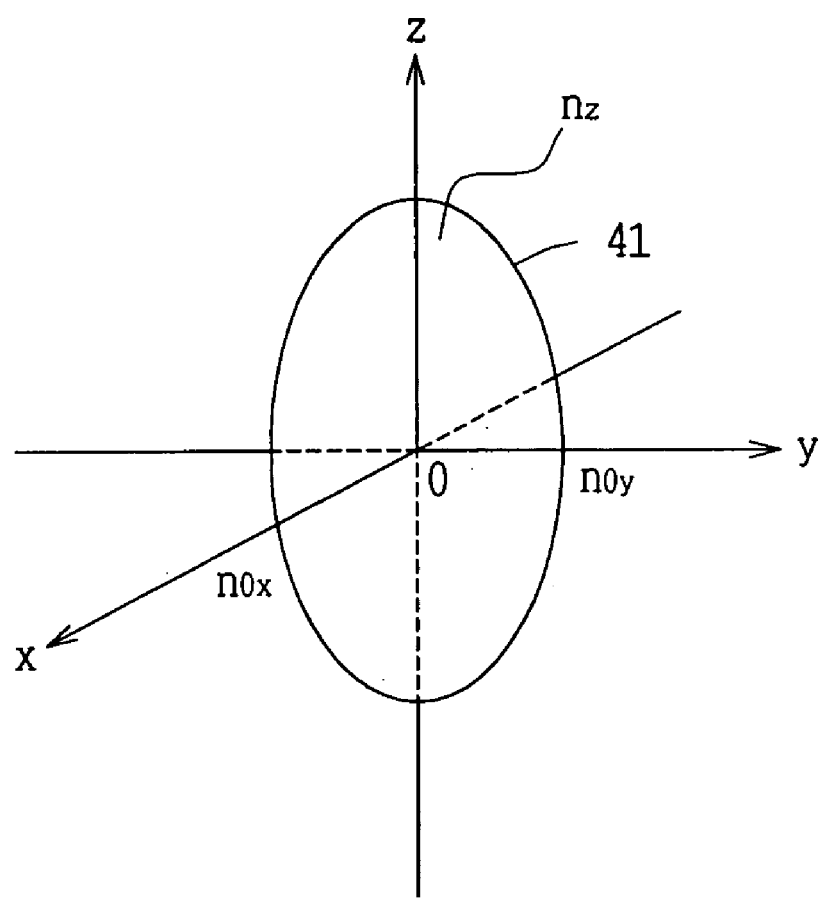
FIG. 17 is a view showing the index ellipsoid of a nematic liquid crystal of uniaxial anisotropy.

In the liquid crystal molecules 41, for example, uniaxial nematic liquid crystal molecules are used. The index ellipsoid of each of the liquid crystal molecules 41 is as shown in FIG. 17. That is, $$n_{ox}=n_{oy}=n_o \quad (2)$$

where $n_o$ is the refractive index of an ordinary ray and $n_{ox}$ and $n_{oy}$ are refractive indices in directions perpendicular to each other in a plane including ordinary rays.

Figure 18:
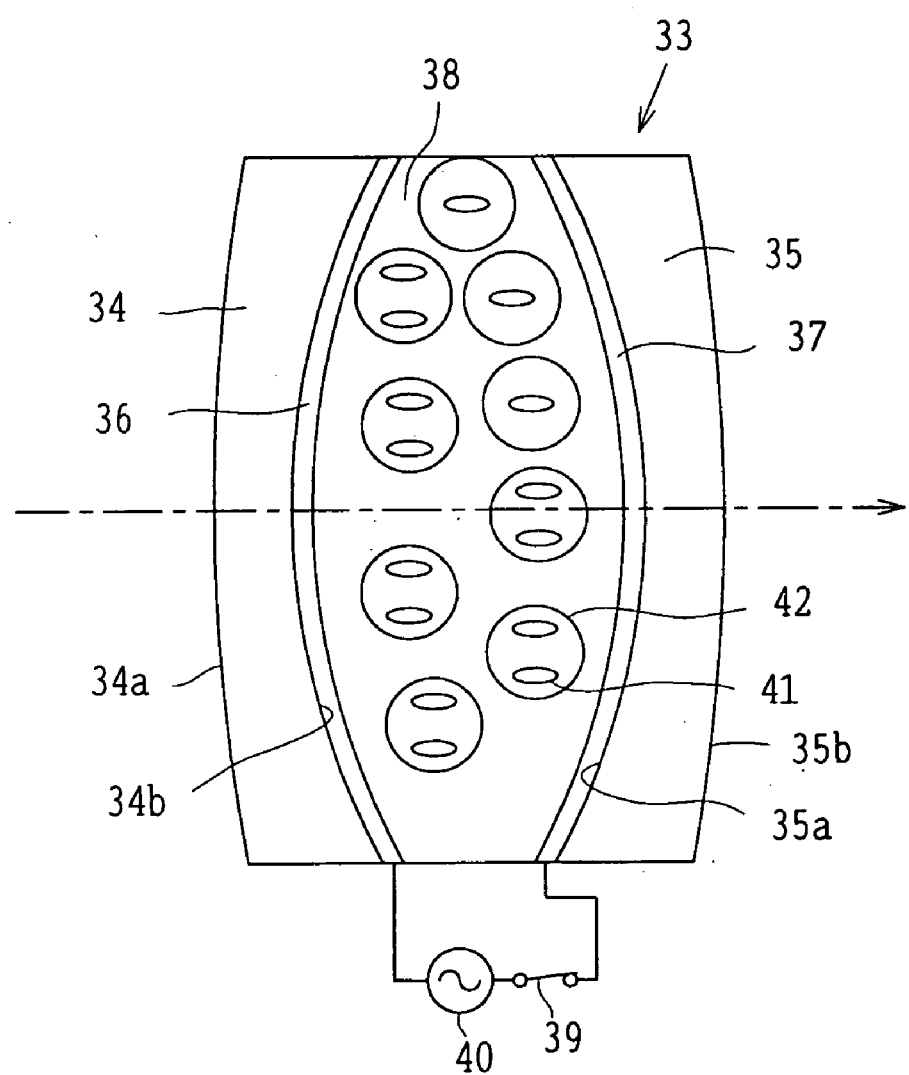
FIG. 18 is a view showing a state where an electric field is applied to a macromolecular dispersed liquid crystal layer in FIG. 16.

Here, in the case where the switch 39, as shown in FIG. 16 is turned off, that is, the electric field is not applied to the liquid crystal layer 38, the liquid crystal molecules 41 are oriented in various directions, and thus the refractive index of the liquid crystal layer 38 relative to incident light becomes high to provide a lens with strong refracting power. In contrast to this, when the switch 39, as shown in FIG. 18, is turned on and the alternating-current electric field is applied to the liquid crystal layer 38, the liquid crystal molecules 41 are oriented so that the major axis of the index ellipsoid of each liquid crystal molecule 41 is parallel with the optical axis of the variable focal-length lens 33, and hence the refractive index becomes lower to provide a lens with weaker refracting power.

Figure 19:
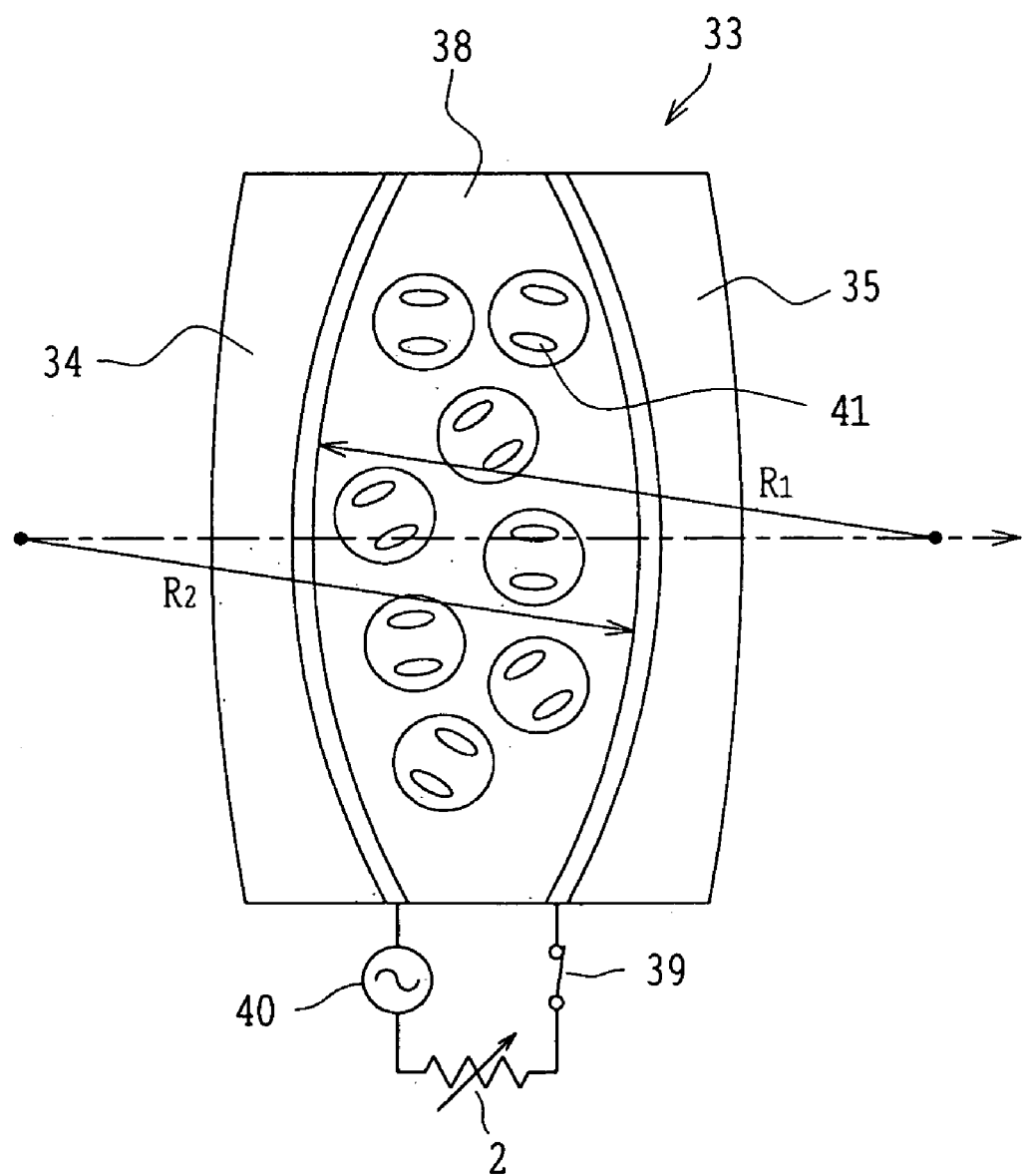
FIG. 19 is a view showing an example where a voltage applied to the macromolecular dispersed liquid crystal layer in FIG. 16 can be changed.

The voltage applied to the macromolecular dispersed liquid crystal layer 38, for example, as shown in FIG. 19, can be changed stepwise or continuously by a variable resistor 2. By doing so, as the applied voltage becomes high, the liquid crystal molecules 41 are oriented so that the major axis of the index ellipsoid of each liquid crystal molecule 41 becomes progressively parallel with the optical axis of the variable focal-length lens 33, and thus the refractive index can be changed stepwise or continuously.

Here, in the case of FIG. 16, that is, in the case where the electric field is not applied to the macromolecular dispersed liquid crystal layer 38, when the refractive index in the direction of the major axis of the index ellipsoid, as shown in FIG. 17, is denoted by $n_z$, an average refractive index $n_{LC}'$ of the liquid crystal molecules 41 is roughly given by $$(n_{ox}+n_{oy}+n_z)/3=n_{LC}' \quad (3)$$

Also, when the refractive index $n_z$ is expressed as a refractive index $n_e$ of an extraordinary ray, an average refractive index $n_{LC}$ where Equation (2) is established is given by $$(2n_o+n_e)/3=n_{LC} \quad (4)$$

In this case, when the refractive index of each of the macromolecules constituting the macromolecular cells 42 is represented by $n_p$ and the ratio of volume between the liquid crystal layer 38 and the liquid crystal molecules 41 is represented by ff, a refractive index $n_A$ of the liquid crystal layer 38 is given from the Maxwell-Garnet's law as $$n_A=\text{ff} \cdot n_{LC}+(1-\text{ff})n_p \quad (5)$$

Thus, as shown in FIG. 19, when the radii of curvature of the inner surfaces of the lenses 34 and 35, that is, the surfaces on the side of the liquid crystal layer 38, are represented by $R_1$ and $R_2$, a focal length $f_1$ of the variable focal-length lens 33 is given by $$1/f_1=(n_A-1)(1/R_1-1/R_2) \quad (6)$$

Also, when the center of curvature is located on the image side, it is assumed that the radius of curvature $R_1$ or $R_2$ is positive. Refraction caused by the outer surface of each of the lenses 34 and 35 is omitted. That is, the focal length of the lens of only the liquid crystal layer 38 is given by Equation (6).

When the average refractive index of ordinary rays is expressed as $$(n_{ox}+n_{oy})/2=n_o' \quad (7)$$

a refractive index $n_B$ of the liquid crystal layer 38 in the case of FIG. 18, namely, in the case where the electric field is applied to the liquid crystal layer 38, is given by $$n_B=\text{ff} \cdot n_o'+(1-\text{ff})n_p \quad (8)$$

and thus a focal length $f_2$ of the lens of only the liquid crystal layer 38 in this case is given by $$1/f_2=(n_B-1)(1/R_1-1/R_2) \quad (9)$$

Also, the focal length where a lower voltage than in FIG. 18 is applied to the liquid crystal layer 38 is a value between the focal length $f_1$ given by Equation (6) and the focal length $f_2$ by Equation (9).

From Equations (6) and (9), a change rate of the focal length by the liquid crystal layer 38 is given by $$|(f_2-f_1)/f_2|=|(n_B-n_A)/(n_B-1)| \quad (10)$$

Thus, in order to increase the change rate, it is only necessary to increase the value of $|(n_B-n_A)|$. Here, $$n_B-n_A=\text{ff}(n_o'-n_{LC}') \quad (11)$$

and hence if the value of $|n_o'-n_{LC}'|$ is increased, the change rate can be raised. Practically, since the refractive index $n_B$ is about 1.3–2, the value of $|n_o'-n_{LC}'|$ is chosen so as to satisfy the following condition:

$$0.01 \leq |n_o'-n_{LC}'| \leq 10 \quad (12)$$

In this way, when ff=0.5, the focal length obtained by the liquid crystal layer 38 can be changed by at least 0.5%, and thus an effective variable focal-length lens can be realized. Also, the value of $|n_o'-n_{LC}'|$ cannot exceed 10 because of restrictions on liquid crystal substances.

Subsequently, a description will be given of grounds for the upper limit of Condition (1). The variation of a transmittance τ where the size of each cell of a macromolecular dispersed liquid crystal is changed is described in "Transmission variation using scattering/transparent switching films" on pages 197–214 of "Solar Energy Materials and Solar Cells", Wilson and Eck, Vol. 31, Eleesvier Science Publishers B. v., 1993. In FIG. 6 on page 206 of this publication, it is shown that when the radius of each cell of the macromolecular dispersed liquid crystal is denoted by r, t=300 μm, ff=0.5, $n_p$=1.45, $n_{LC}$=1.585, and λ=500 nm, the theoretical value of the transmittance τ is about 90% if r=5 nm (D=λ/50 and D·t=λ·6 μm, where D and λ are expressed in nanometers), and is about 50% if r=25 nm (D=λ/10).

Here, it is assumed that t=150 μm and the transmittance τ varies as the exponential function of the thickness t. The transmittance τ in the case of t=150 μm is nearly 71% when r=25 nm (D=λ/10 and D·t=λ·15 μm). Similarly, in the case of t=75 μm, the transmittance τ is nearly 80% when r=25 nm (D=λ/10 and D·t=λ·7.5 μm).

From these results, the transmittance τ becomes at least 70–80% and the liquid crystal can be actually used as a lens, if the liquid crystal satisfies the following condition:

$$D \cdot t \leq \lambda \cdot 15 \text{ μm} \quad (13)$$

Hence, for example, in the case of t=75 μm, if D≦λ/5, a satisfactory transmittance can be obtained.

The transmittance of the macromolecular dispersed liquid crystal layer 38 is raised as the value of the refractive index $n_p$ approaches the value of the refractive index $n_{LC}'$. On the other hand, the values of the refractive indices $n_o'$ and $n_p$ are different from each other, the transmittance of the liquid crystal layer 38 will be degraded. In FIGS. 16 and 18, the transmittance of the liquid crystal layer 38 is improved on an average when the liquid crystal layer 38 satisfies the following equation:

$$n_p = (n_o' + n_{LC}')/2 \qquad (14)$$

The variable focal-length lens 33 is used as a lens, and thus in both FIGS. 16 and 18, it is desirable that the transmittances are almost the same and high. For this, although there are limits to the substances of the macromolecules and the liquid crystal molecules 41 constituting the macromolecular cells 42, it is only necessary, in practical use, to satisfy the following condition:

$$n_o' \leq n_p \leq n_{LC}' \qquad (15)$$

When Equation (14) is satisfied, Condition (13) is moderated and it is only necessary to satisfy the following condition:

$$D \cdot t \leq \lambda \cdot 60 \ \mu m \qquad (16)$$

It is for this reason that, according to the Fresnel's law of reflection, the reflectance is proportional to the square of the difference of the refractive index, and thus the reflection of light at the interfaces between the macromolecules and the liquid crystal molecules 41 constituting the macromolecular cells 42, that is, a reduction in the transmittance of the liquid crystal layer 38, is roughly proportional to the square of the difference in refractive index between the macromolecules and the liquid crystal molecules 41.

In the above description, reference has been made to the case where $n_o' \approx 1.45$ and $n_{LC}' \approx 1.585$, but in a more general formulation, it is only necessary to satisfy the following condition:

$$D \cdot t \leq \lambda \cdot 15 \ \mu m \cdot (1.585-1.45)^2/(n_u-n_p)^2 \qquad (17)$$

where $(n_u-n_p)^2$ is a value when one of $(n_{LC}'-n_p)^2$ and $(n_o'-n_p)^2$ is larger than the other.

In order to largely change the focal length of the variable focal-length lens 33, it is favorable that the ratio ff is as high as possible, but in the case of ff=1, the volume of the macromolecule becomes zero and the macromolecular cells 42 cease to be formable. Thus, it is necessary to satisfy the following condition:

$$0.1 \leq ff \leq 0.999 \qquad (18)$$

On the other hand, the transmittance τ improves as the ratio ff becomes low, and hence Condition (17) may be moderated, preferably, as follows:

$$4 \times 10^{-6} [\mu m]^2 \leq D \cdot t \leq \lambda \cdot 45 \ \mu m \cdot (1.585-1.45)^2/(n_u-n_p)^2 \qquad (19)$$

Also, the lower limit of the thickness t, as is obvious from FIG. 16, corresponds to the diameter D, which is at least 2 nm as described above, and therefore the lower limit of D·t becomes $(2 \times 10^{-3} \ \mu m)^2$, namely $4 \times 10^{-6} [\mu m]^2$.

An approximation where the optical property of substance is represented by the refractive index is established when the diameter D is 5–10 nm or larger, as set forth in "Iwanami Science Library 8, Asteroids are coming", T. Mukai, Iwanami Shoten, p. 58, 1994. If the value of the diameter D exceeds 500 λ, the scattering of light will be changed geometrically, and the scattering of light at the interfaces between the macromolecules and the liquid crystal molecules 41 constituting the macromolecular cells 42 is increased in accordance with the Fresnel's equation of reflection. As such, in practical use, the diameter D must be chosen so as to satisfy the following condition:

$$7 \ nm \leq D \leq 500\lambda \qquad (20)$$

Figure 20:
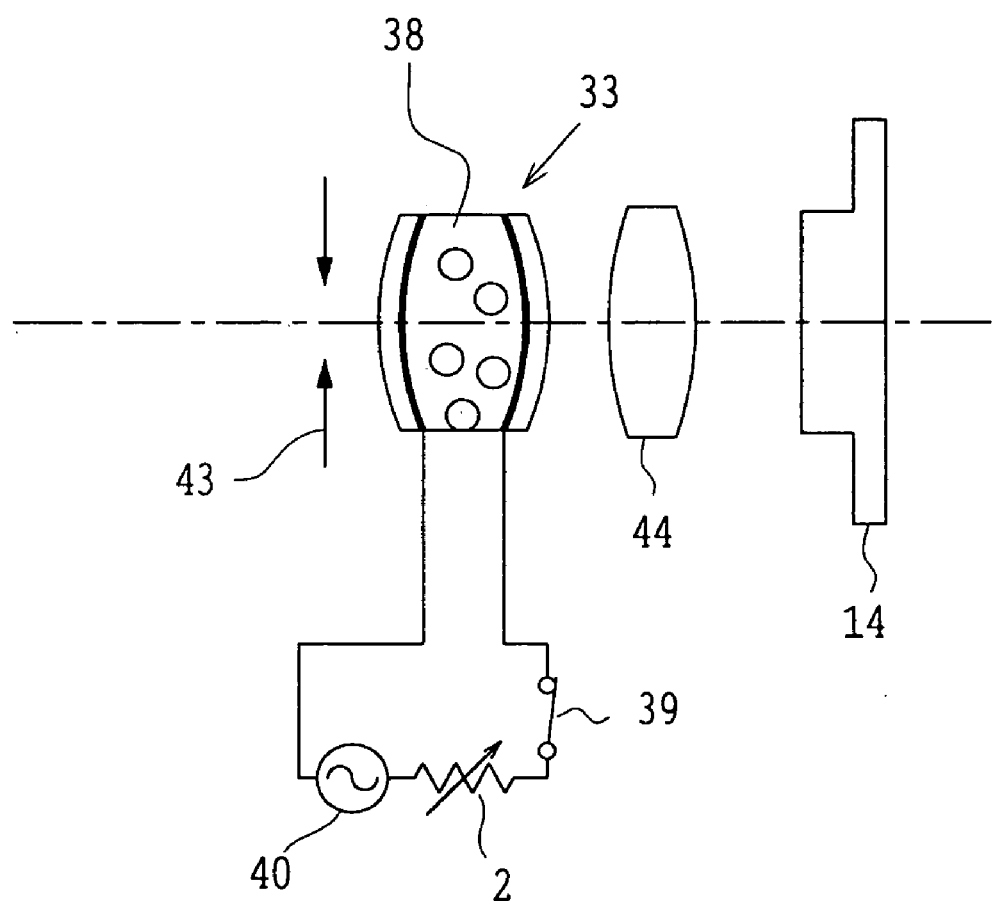
FIG. 20 is a view showing an example of an imaging optical system for digital cameras which uses the variable focal-length lens according to the present invention.

FIG. 20 shows an imaging optical system for digital cameras using the variable focal-length lens 33 of FIG. 19. In this imaging optical system, an image of an object (not shown) is formed on the solid-state image sensor 14, such as a CCD, through a stop 43, the variable focal-length lens 33, and a lens 44. Also, in FIG. 20, the liquid crystal molecules are not shown.

According to such an imaging optical system, the alternating voltage applied to the macromolecular dispersed liquid crystal layer 38 of the variable focal-length lens 33 is controlled by the variable resistor 2 to change the focal length of the variable focal-length lens 33. Whereby, without moving the variable focal-length lens 33 and the lens 44 along the optical axis, it becomes possible to perform continuous focusing (namely bring the object into a focus) with respect to the object distance, for example, from the infinity to 600 mm.

Figure 21:
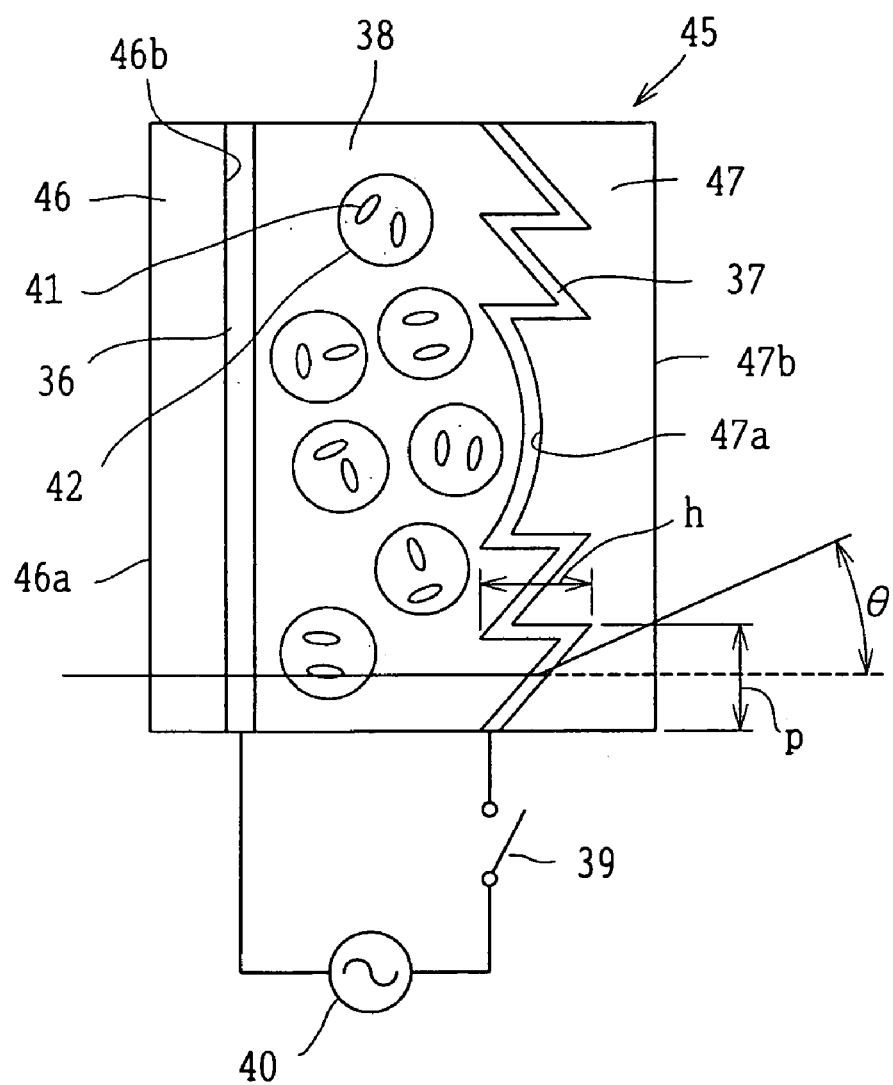
FIG. 21 is a view showing an example of a variable focal-length diffraction optical element according to the present invention.

FIG. 21 shows one example of a variable focal-length diffraction optical element applicable to the present invention. This variable focal-length diffraction optical element 45 includes a first transparent substrate 46 having a first surface 46a and a second surface 46b which are parallel with each other and a second transparent substrate 47 having a third surface 47a which is constructed with an annular diffraction grating of saw-like cross section having the depth of a groove corresponding to the wavelength of light and a fourth surface 47b which is flat. Incident light emerges through the first and second transparent substrates 46 and 47. Between the first and second transparent substrates 46 and 47, as in FIG. 16, the macromolecular dispersed liquid crystal layer 38 is sandwiched through the transparent electrodes 36 and 37 so that the transparent electrodes 36 and 37 are connected to the alternating-current power supply 40 through the switch 39 and the alternating-current electric field is applied to the macromolecular dispersed liquid crystal layer 38.

In such a structure, when the grating pitch of the third surface 47a is represented by p and an integer is represented by m, a ray of light incident on the variable focal-length diffraction optical element 45 is deflected by an angle θ satisfying the following equation:

$$p \sin \theta = m\lambda \qquad (21)$$

and emerges therefrom. When the depth of the groove is denoted by h, the refractive index of the transparent substrate 47 is denoted by $n_{47}$, and an integer is denoted by k, a diffraction efficiency becomes 100% at the wavelength λ and the production of flare can be prevented by satisfying the following equations:

$$h(n_A - n_{47}) = m\lambda \qquad (22)$$

$$h(n_B - n_{47}) = k\lambda \qquad (23)$$

Here, the difference in both sides between Equations (22) and (23) is given by $$h(n_A - n_B) = (m-k)\lambda \qquad (24)$$

Therefore, when it is assumed that λ=500 nm, $n_A$=1.55, and $n_B$=1.5,
   0.05 h=(m−k)·500 nm
and when m=1 and k=0,
   h=10000 nm=10 μm In this case, the refractive index $n_{47}$ of the transparent substrate 47 is obtained as 1.5 from Equation (22). When the grating pitch p on the periphery of the variable focal-length diffraction optical element 45 is assumed to be 10 μm, θ≈2.87° and a lens with an F-number of 10 can be obtained.

The variable focal-length diffraction optical element 45, whose optical path length is changed by the on-off operation of the voltage applied to the liquid crystal layer 38, for example, can be used for focus adjustment in such a way that it is placed at a portion where the light beam of a lens system is not parallel, or can be used to change the focal length of the entire lens system.

In the embodiment, it is only necessary that Equations (22)–(24) are set in practical use to satisfy the following conditions:

$$0.7m\lambda \leq h(n_A - n_{47}) \leq 1.4m\lambda \quad (25)$$

$$0.7k\lambda \leq h(n_A - n_{47}) \leq 1.4k\lambda \quad (26)$$

$$0.7(m-k)\lambda \leq h(n_A - n_B) \leq 1.4(m-k)\lambda \quad (27)$$

Figure 22:
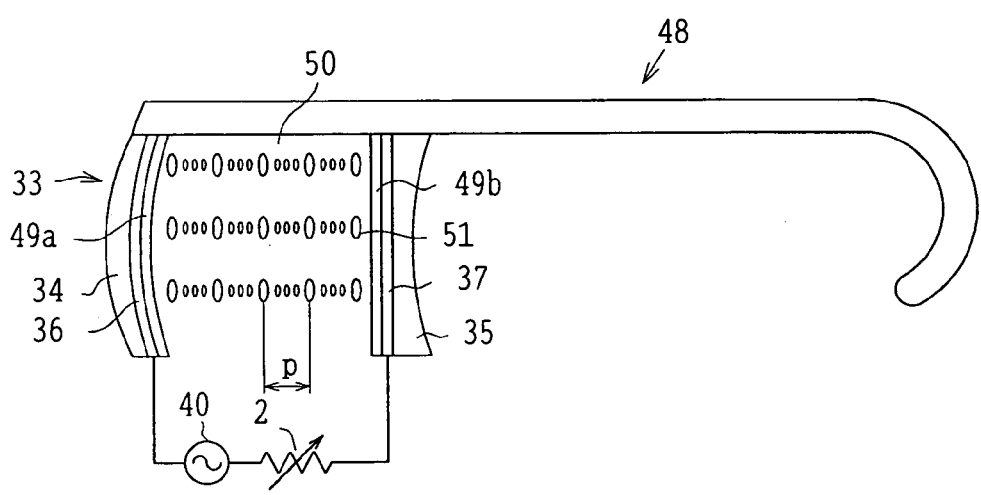
FIG. 22 is a view showing variable focal-length spectacles, each having a variable focal-length lens which uses a twisted nematic liquid crystal.
Figure 23:
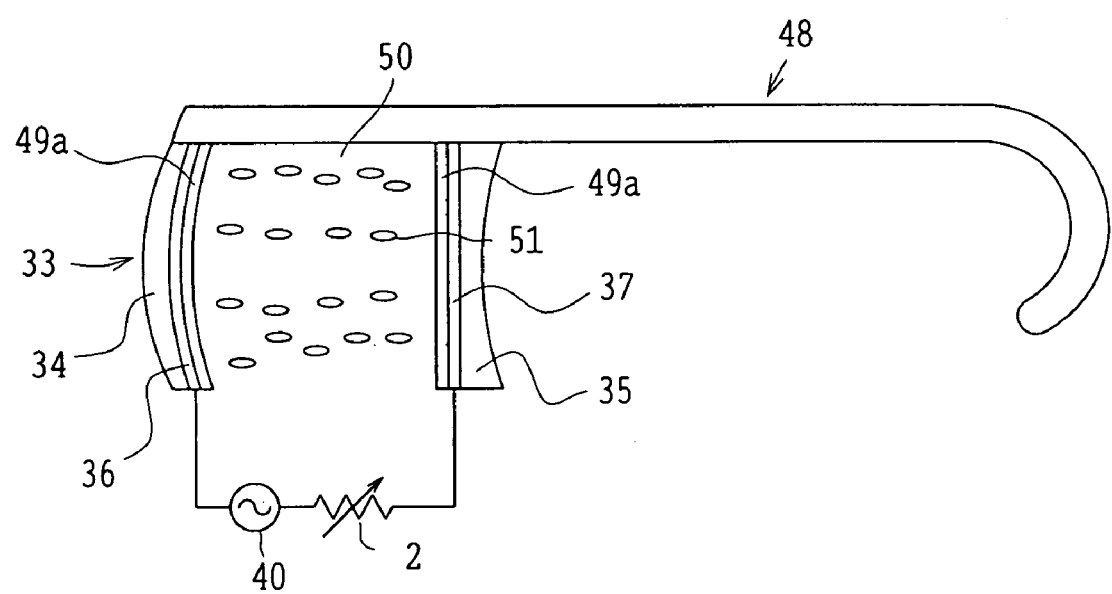
FIG. 23 is a view showing the orientation of liquid crystal molecules where a voltage applied to a twisted nematic liquid crystal layer of FIG. 22 is increased.

A variable focal-length lens using a twisted nematic liquid crystal also falls into the category of the present invention. FIGS. 22 and 23 show variable focal-length spectacles 48 in this case. The variable focal-length lens 33 has lenses 34 and 35, orientation films 49a and 49b provided through the transparent electrodes 36 and 37, respectively, inside these lenses, and a twisted nematic liquid crystal layer 50 sandwiched between the orientation films. The transparent electrodes 36 and 37 are connected to the alternating-current power supply 40 through the variable resistor 2 so that the alternating-current electric field is applied to the twisted nematic liquid crystal layer 50.

In this structure, when the voltage applied to the twisted nematic liquid crystal layer 50 is increased, liquid crystal molecules 51, as illustrated in FIG. 23, exhibit a homeotropic orientation, in which the refractive index of the liquid crystal layer 50 is lower and the focal length is longer than in a twisted nematic condition of FIG. 22 in which the applied voltage is low.

A spiral pitch P of the liquid crystal molecules 51 in the twisted nematic condition of FIG. 22 must be made nearly equal to, or much smaller than, the wavelength λ of light, and thus is set to satisfy the following condition:

$$2 \text{ nm} \leq P \leq 2\lambda/3 \quad (28)$$

Also, the lower limit of this condition depends on the sizes of the liquid crystal molecules, while the upper limit is necessary for the behavior of the liquid crystal layer 50 as an isotropic medium under the condition of FIG. 22 when incident light is natural light. If the upper limit of the condition is overstepped, the variable focal-length lens 33 is changed to a lens in which the focal length varies with the direction of deflection. Hence, a double image is formed and only a blurred image is obtained.

Figure 24A:
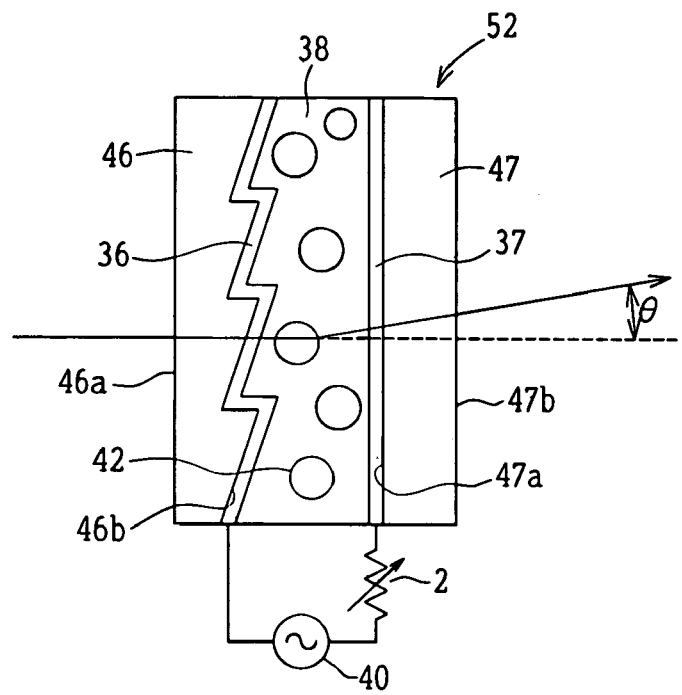
Figure 24B:
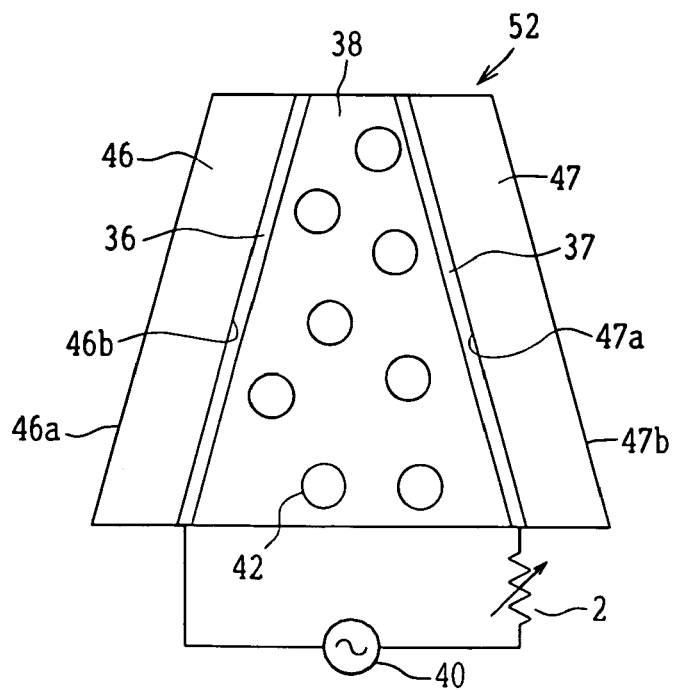
Figure 25:
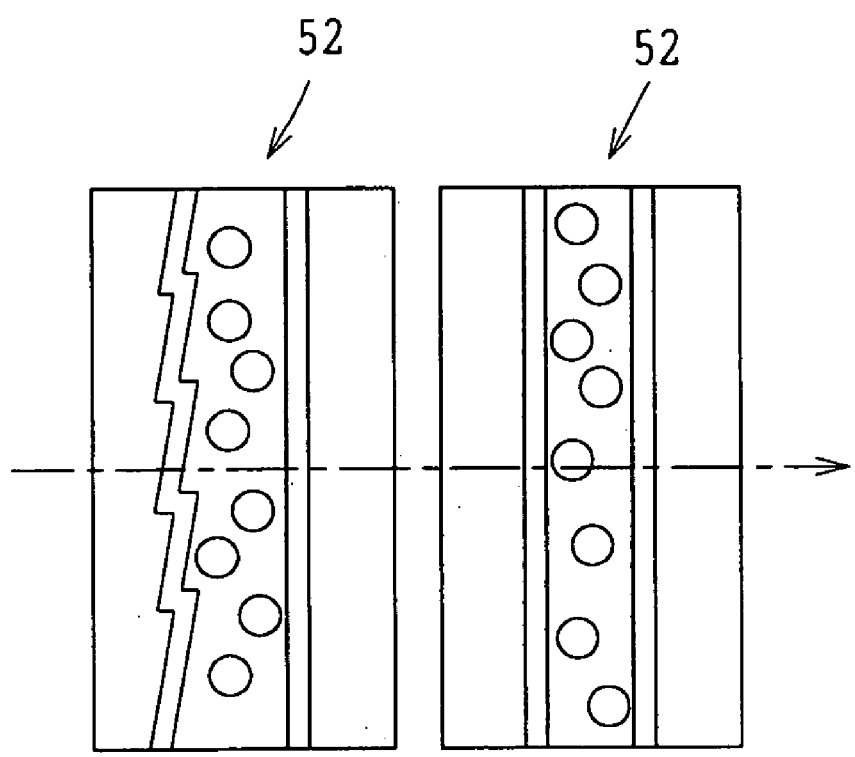
FIG. 25 is a view for explaining the applications of the variable deflection-angle prisms shown in FIGS. 24A and 24B.

FIG. 24A and 24B show variable deflection-angle prisms according to the present invention. In FIG. 24A and 24B and FIG. 25, the liquid crystal molecules 51 are omitted. A variable deflection-angle prism 52 includes a first transparent substrate 46 on the entrance side, having a first surface 46a and a second surface 46b; and a second transparent substrate 47 of a plane-parallel plate on the exit side, having a third surface 47a and a fourth surface 47b. The inner surface (the second surface) 46b of the transparent substrate 46 on the entrance side is configured into a Fresnel form, and the macromolecular dispersed liquid crystal layer 38, as in FIG. 16, is sandwiched, through the transparent electrodes 36 and 37, between the transparent substrate 46 and the transparent substrate 47 on the exit side. The transparent electrodes 36 and 37 are connected to the alternating-current power supply 40 through the variable resistor 2. Whereby, the alternating-current electric field is applied to the liquid crystal layer 38 so that the deflection angle of light transmitted through the variable deflection-angle prism 52 is controlled.

Also, in FIG. 24A, the inner surface 46b of the transparent substrate 46 is configured into the Fresnel form, but as shown in FIG. 24B, the inner surfaces of the transparent substrates 46 and 47 may be configured like an ordinary prism whose surfaces are relatively inclined, or may be configured like the diffraction grating shown in FIG. 21. In the case of the latter, when Equations (21)–(24) and Conditions (25)–(27) are satisfied, the same description as in the variable focal-length diffraction optical element 45 and the variable focal-length spectacles 48 is applied.

The variable deflection-angle prism 52 constructed mentioned above can be effectively used for shake prevention for TV cameras, digital cameras, film cameras, binoculars, etc. In this case, it is desirable that the direction of refraction (deflection) of the variable deflection-angle prism 52 is vertical, but in order to further improve its performance, it is desirable that two variable deflection-angle prisms 52 are arranged so that the directions of deflection are varied and as shown in FIG. 25, the refraction angles are changed in vertical and lateral directions.

Figure 26:
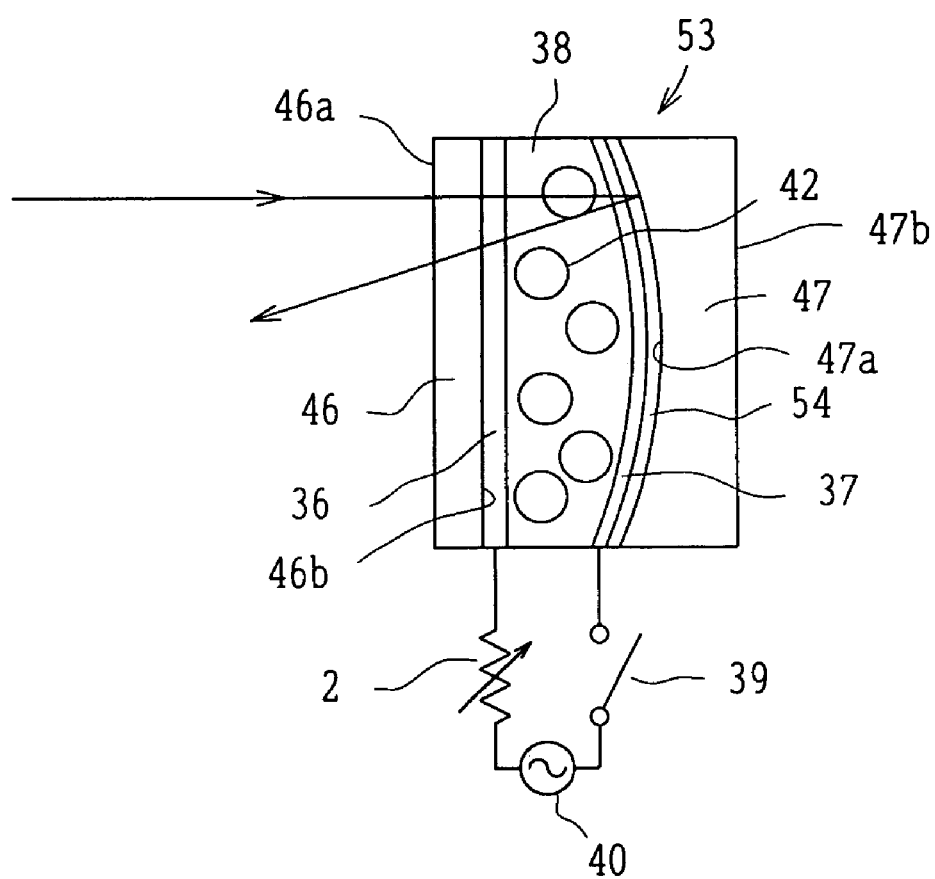
FIG. 26 is a view showing an example of a variable focal-length mirror as the variable focal-length lens according to the present invention.

FIG. 26 shows a variable focal-length mirror as the variable focal-length lens applicable to the present invention. In this figure, the liquid crystal molecules are not shown. A variable focal-length mirror 53 includes a first transparent substrate 46 having a first surface 46a and a second surface 46b, and a second transparent substrate 47 having a third surface 47a and a fourth surface 47b. The first transparent substrate 46 is configured into a flat plate or lens shape to provide the transparent electrode 36a on the inner surface (the second surface) 46b. The second transparent substrate 47 is such that the inner surface (the third surface) 47a is configured as a concave surface, on which a reflecting film 54 is deposited, and the transparent electrode 37 is provided on the reflecting film 54. Between the transparent electrodes 36 and 37, as in FIG. 16, the macromolecular dispersed liquid crystal layer 38 is sandwiched so that the transparent electrodes 36 and 37 are connected to the alternating-current power supply 40 through the switch 39 and the variable resistor 2, and the alternating-current electric field is applied to the macromolecular dispersed liquid crystal layer 38.

According to the above structure, since a ray of light incident on the transparent substrate 46 is passed again through the liquid crystal layer 38 by the reflecting film 54, the function of the liquid crystal layer 38 can be exercised twice, and the focal position of reflected light can be shifted by changing the voltage applied to the liquid crystal layer 38. In this case, the ray of light incident on the variable focal-length mirror 53 is transmitted twice through the liquid crystal layer 38, and therefore when a thickness twice that of the liquid crystal layer 38 is represented by t, Conditions mentioned above can be used. Moreover, the inner surface of the transparent substrate 46 or 47, as shown in FIG. 21, can also be configured into the diffraction grating shape to reduce the thickness of the liquid crystal layer 38. By doing so, the amount of scattered light can be decreased.

In the above description, in order to prevent the deterioration of the liquid crystal, the alternating-current power supply 40 is used as a voltage source to apply the alternating-current electric field to the liquid crystal. However, a direct-current power supply is used and thereby a direct-current electric field can also be applied to the liquid crystal. Techniques of shifting the orientation of the liquid crystal molecules, in addition to changing the voltage, can be achieved by changing the frequency of the electric field applied to the liquid crystal, the strength and frequency of the magnetic field applied to the liquid crystal, or the temperature of the liquid crystal. In the above embodiments, since the macromolecular dispersed liquid crystal is close to a solid, rather than a liquid, one of the lenses 34 and 35, the transparent substrate 46, the lens 44, the transparent substrate 47 of FIG. 24A, or one of the transparent substrates 46 and 47 of FIG. 24B, may be eliminated. In the present invention, the variable focal-length mirror whose shape is not changed, such as that shown in FIG. 26, also falls into the category of the deformable mirror.

Figure 27:
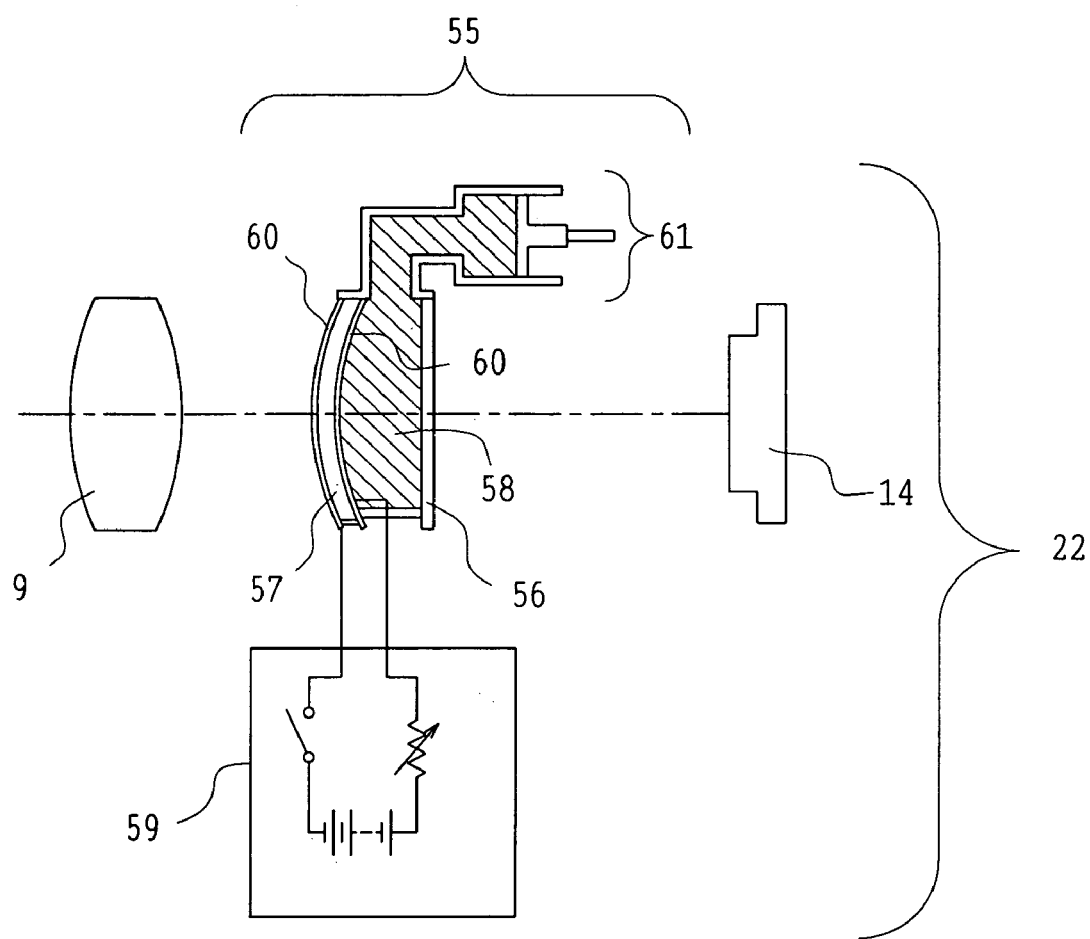
FIG. 27 is a view showing schematically an imaging device using the variable focal-length lens, according to another embodiment of the optical apparatus of the present invention.

FIG. 27 shows the imaging device 22 using a variable focal-length lens 55, in another embodiment according to the present invention. The imaging device 22 can be used as the imaging system of the present invention. In this embodiment, the lens 9 and the variable focal-length lens 55 constitute an imaging lens system, and the imaging lens system and the solid-state image sensor 14 constitute the imaging device 22. The variable focal-length lens 55 is constructed with a light-transmitting fluid or jelly-like substance 58 sandwiched between a transparent member 56 and a soft transparent substance 57 such as piezoelectric synthetic resin.

As the fluid or jelly-like substance 58, silicon oil, elastic rubber, jelly, or water can be used. Transparent electrodes 60 are provided on both surfaces of the transparent substance 57, and when the voltage is applied through a circuit 59, the transparent substance 57 is deformed by the piezoelectric effect of the transparent substance 57 so that the focal length of the variable focal-length lens 55 is changed.

Thus, according to the embodiment, even when the object distance is changed, focusing can be performed without moving the optical system with a motor, and as such the embodiment excels in compact and lightweight design and low power consumption.

In FIG. 27, reference numeral 61 denotes a cylinder for storing a fluid. For the transparent substance 57, high-polymer piezoelectrics such as polyurethane, silicon rubber, acrylic elastomer, PZT, PLZT, and PVDF; vinylidene cyanide copolymer; or copolymer of vinylidene fluoride and trifluoroethylene is used.

The use of an organic substance, synthetic resin, or elastomer, having a piezoelectric property, brings about a considerable deformation of the surface of the deformable mirror, which is favorable. It is good practice to use a transparent piezoelectric substance for the variable focal-length lens.

Figure 28:
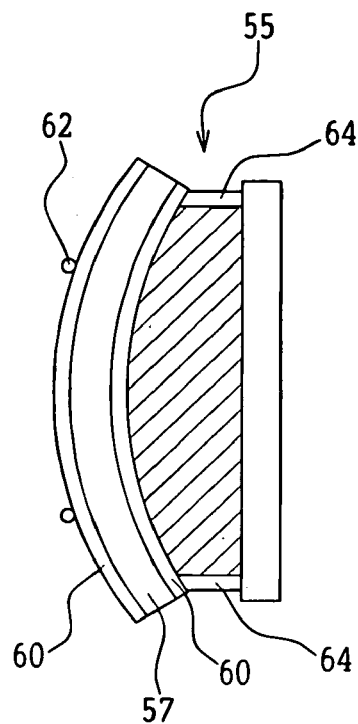
FIG. 28 is an explanatory view showing the variable focal-length lens where a cylinder is eliminated in the embodiment of FIG. 27.

In FIG. 27, instead of using the cylinder 61, the variable focal-length lens 55, as shown in FIG. 28, may be designed to use supporting members 62.

Figure 29:
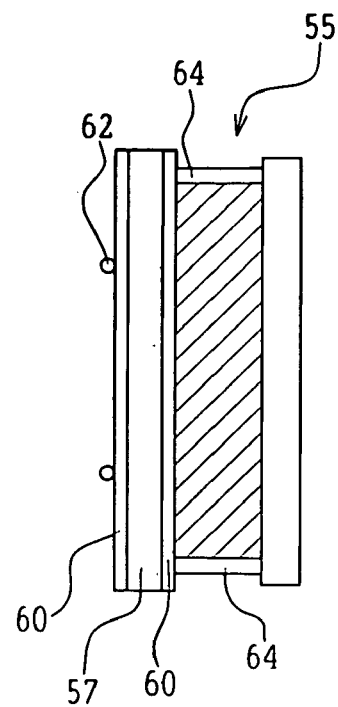
FIG. 29 is an explanatory view showing a state where the variable focal-length lens of FIG. 28 is deformed.

The supporting members 62 are designed to fix the periphery of a part of the transparent substance 57 sandwiched between the transparent electrodes 60. According to the embodiment, even when the voltage is applied to the transparent substance 57 and thereby the transparent substance 57 is deformed, as shown in FIG. 29, the volume of the entire variable focal-length lens 55 remains unchanged. As such, the cylinder 61 becomes unnecessary. Also, in FIGS. 28 and 29, reference numeral 64 designates a deformable member, which is made with an elastic body, accordion-shaped synthetic resin, or metal.

In each of the examples shown in FIGS. 27 and 28, when a reverse voltage is applied, the transparent substance 57 is deformed in a reverse direction, and thus it is also possible to construct a concave lens.

Where an electrostrictive substance, for example, acrylic elastomer or silicon rubber, is used for the transparent substance 57, it is desirable that the transparent substance 57 is constructed so that the transparent substrate and the electrostrictive substance are cemented to each other.

Figure 30:
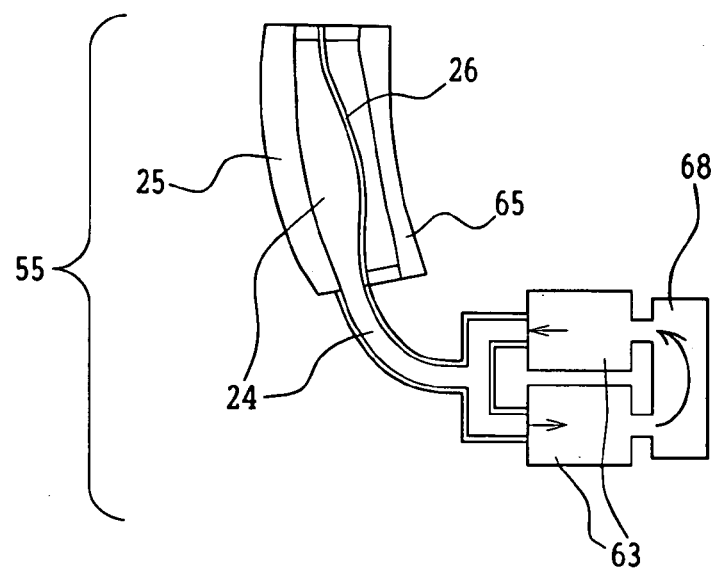
FIG. 30 is a view showing schematically the variable focal-length lens according to another embodiment of the present invention.

FIG. 30 shows the variable focal-length lens 55 in which the fluid 24 is taken in and out by a micropump 63 to deform the lens surface, in another embodiment of the variable focal-length lens applicable to the present invention.

The micropump 63 is a small-sized pump, for example, made by a micromachining technique and is constructed so that it is operated with an electric power. The fluid 24 is sandwiched between a transparent substrate 25 and an elastic body 26. In FIG. 30, reference numeral 65 represents a transparent substrate for protecting the elastic body 26 and this substrate is not necessarily required.

As examples of pumps made by the micromachining technique, there are those which use thermal deformations, piezoelectric substances, and electrostatic forces.

It is also possible to use the micropump 23 shown in FIG. 15 as two micropumps, for example, as in the micropump 63 used in the variable focal-length lens 55 of FIG. 30.

In the variable focal-length lens which uses the electrostatic force or the piezoelectric effect, a high voltage is sometimes required for drive. In this case, it is desirable that the boosting transformer or the piezoelectric transformer is used to constitute the control system. When a laminated piezoelectric transformer is particularly used, a compact design is achieved.

Figure 31:
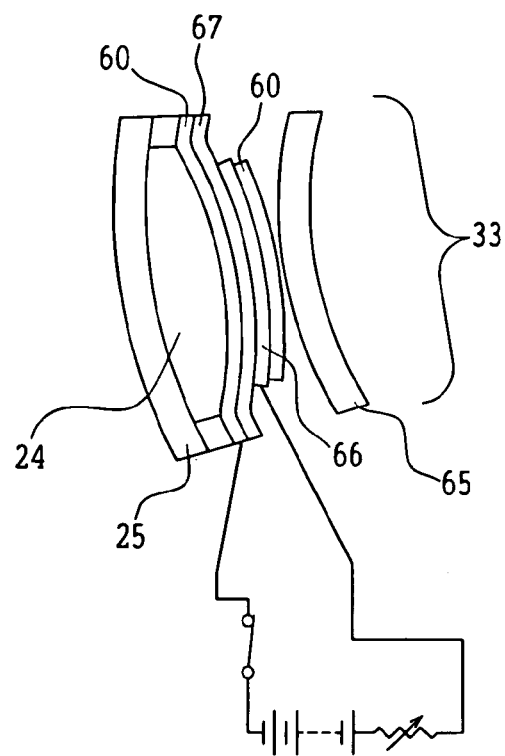
FIG. 31 is a view showing schematically a variable focal-length lens using a piezoelectric substance in another embodiment of the variable optical-property element according to the present invention.

FIG. 31 shows the variable focal-length lens 33 using a piezoelectric substance 66 in another embodiment of a variable optical-property element according to the present invention.

The same substance as the transparent substance 57 shown in FIGS. 27 and 28 is used for the piezoelectric substance 66, which is provided on a soft transparent substrate 67. It is desirable that synthetic resin or an organic substance is used for the substrate 67.

In this embodiment, the voltage is applied to the piezoelectric substance 66 through the two transparent electrodes 60, and thereby the piezoelectric substance 66 is deformed so that the function of a convex lens is exercised in FIG. 31.

Figure 32:
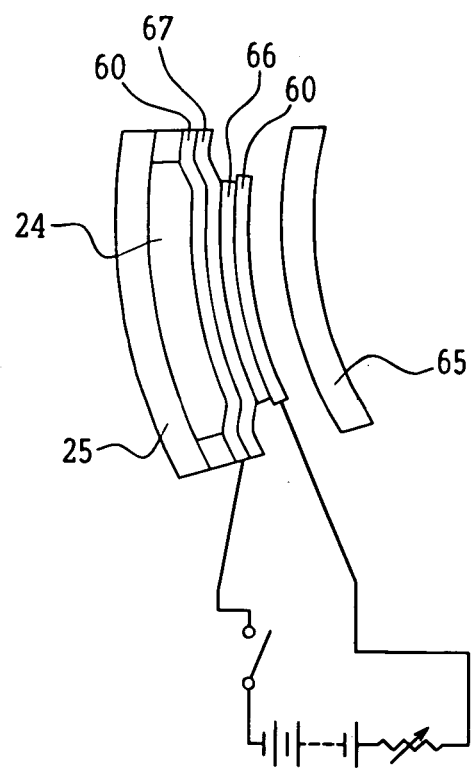
FIG. 32 is an explanatory view showing a state where the variable focal-length lens of FIG. 31 is deformed.

The substrate 67 is previously configured into a convex form, and at least one of the two transparent electrodes 60 is caused to differ in size from the substrate 67, for example, one of the electrodes 60 is made smaller than the substrate 67. In doing so, when the applied voltage is removed, the opposite, preset portions of the two transparent electrodes 60, as shown in FIG. 32, are deformed into concave shapes so as to have the function of a concave lens, acting as the variable focal-length lens.

In this case, since the substrate 67 is deformed so that the volume of the fluid 24 is not changed, there is the merit that the liquid tank 68 becomes unnecessary.

This embodiment has a great merit that a part of the substrate holding the fluid 24 is deformed by the piezoelectric substance and the liquid tank 68 is dispensed with.

The transparent substrates 25 and 65 may be constructed with lenses or plane surfaces, and the same may be said of the embodiment of FIG. 30.

Figure 33:
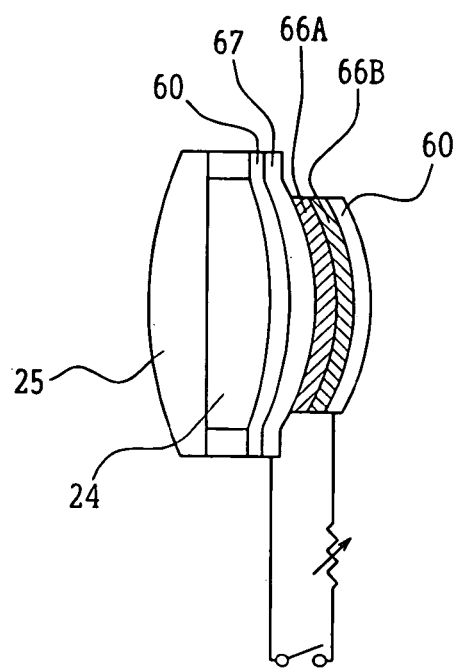
FIG. 33 is a view showing schematically a variable focal-length lens using two thin plates made with piezoelectric substances in still another embodiment of the variable optical-property element according to the present invention.

FIG. 33 shows a variable focal-length lens using two thin plates 66A and 66B constructed of piezoelectric substances in still another embodiment of the variable optical-property element according to the present invention.

The variable focal-length lens of this embodiment has the merit that the thin plate 66A is reversed in direction of the substance with respect to the thin plate 66B, and thereby the amount of deformation is increased so that a wide variable focal-length range can be obtained. Also, in FIG. 33, reference numeral 25 denotes a lens-shaped transparent substrate. Even in the embodiment, the transparent electrode 60 on the right side of the figure is configured to be smaller than the substrate 67.

In the embodiments of FIGS. 31–33, the thicknesses of the substrate 67, the piezoelectric substance 66, and the thin plates 66A and 66B may be rendered uneven so that a state of deformation caused by the application of the voltage is controlled. By doing so, lens aberration can be corrected, which is convenient.

Figure 34:
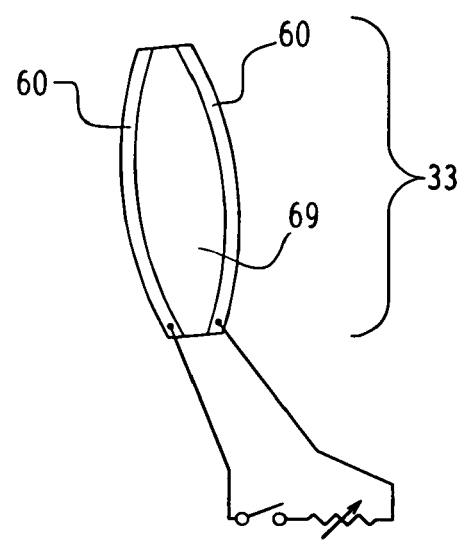
FIG. 34 is a view showing schematically another embodiment of the variable focal-length lens according to the present invention.

FIG. 34 shows another embodiment of the variable focal-length lens applicable to the present invention. A variable focal-length lens 33 of this embodiment uses an electrostrictive substance 69 such as silicon rubber or acrylic elastomer.

Figure 35:
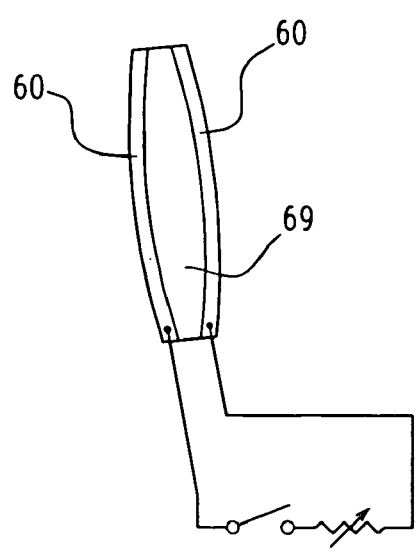
FIG. 35 is an explanatory view showing the deformation of the variable focal-length lens of FIG. 34.

According to the embodiment, when the voltage is low, the electrostrictive substance 69, as depicted in FIG. 34, acts as a convex lens, while when the voltage is increased, the electrostrictive substance 69, as depicted in FIG. 35, expands in a vertical direction and contracts in a lateral direction, and thus the focal length is increased. In this way, the electrostrictive substance 69 operates as the variable focal-length lens. According to the variable focal-length lens of the embodiment, there is the merit that since a large power supply is not required, power consumption is minimized.

Figure 36:
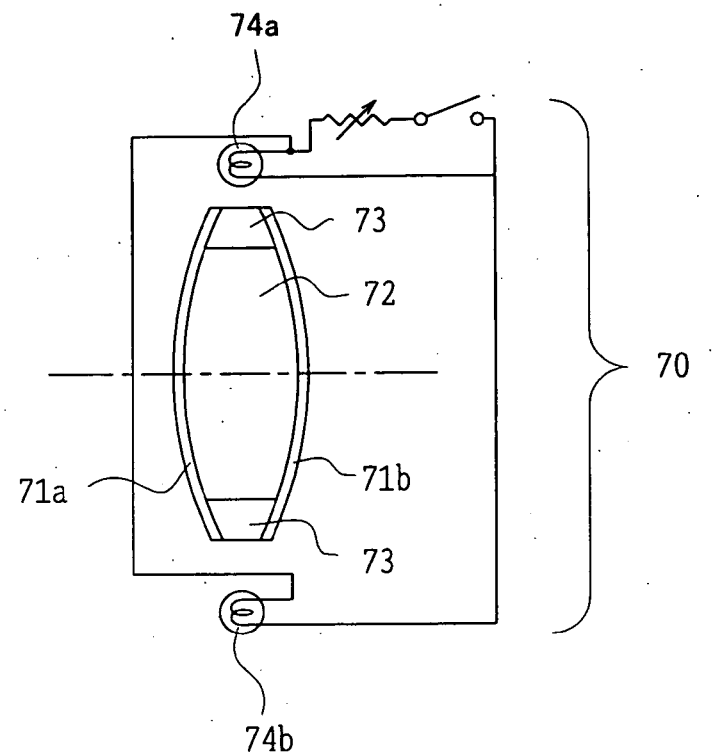
FIG. 36 is a view showing schematically a variable focal-length lens using a photonical effect in a further embodiment of the variable optical-property element according to the present invention.

FIG. 36 shows a variable focal-length lens using a photonical effect in a further embodiment of the variable optical-property element according to the present invention. A variable focal-length lens 70 of this embodiment is designed so that azobenzene 72 is sandwiched between transparent elastic bodies 71a and 71b and is irradiated with ultraviolet light through a transparent spacer 73. In FIG. 36, reference numerals 74a and 74b represent ultraviolet light sources, such as ultraviolet LEDs or ultraviolet semiconductor lasers, of central wavelengths $\lambda_1$ and $\lambda_2$, respectively.

Figure 37A:
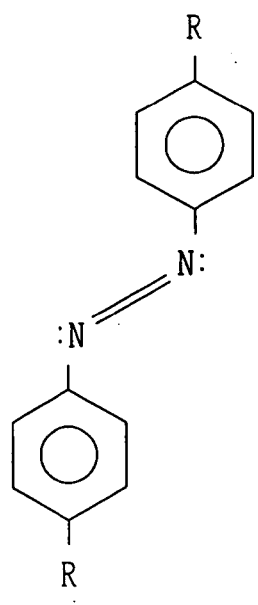
FIGS. 37A and 37B are explanatory views showing the structures of azobenzene used in the variable focal-length lens according to the embodiment of FIG. 36.
Figure 37B:
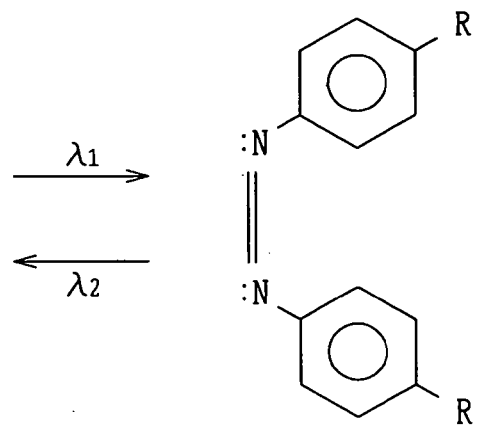

In the embodiment, when trans-type azobenzene shown in FIG. 37A is irradiated with ultraviolet light of the central wavelength $\lambda_1$, the azobenzene 72 changes to cistype azobenzene shown in FIG. 37B to reduce its volume. Consequently, the thickness of the variable focal-length lens 70 is decreased, and the function of the convex lens is impaired.

On the other hand, when the cis-type azobenzene shown in FIG. 37B is irradiated with ultraviolet light of the central wavelength $\lambda_2$, the azobenzene 72 changes to the trans-type azobenzene shown in FIG. 37A to increase the volume. Consequently, the thickness of the variable focal-length lens 70 is increased, and the function of the convex lens is improved.

In this way, the optical element of the embodiment acts as the variable focal-length lens. In the variable focal-length lens 70, since the ultraviolet light is totally reflected at the interface between each of the transparent elastic bodies 71a and 71b and air, the light does not leak through the exterior and high efficiency is obtained.

Figure 38:
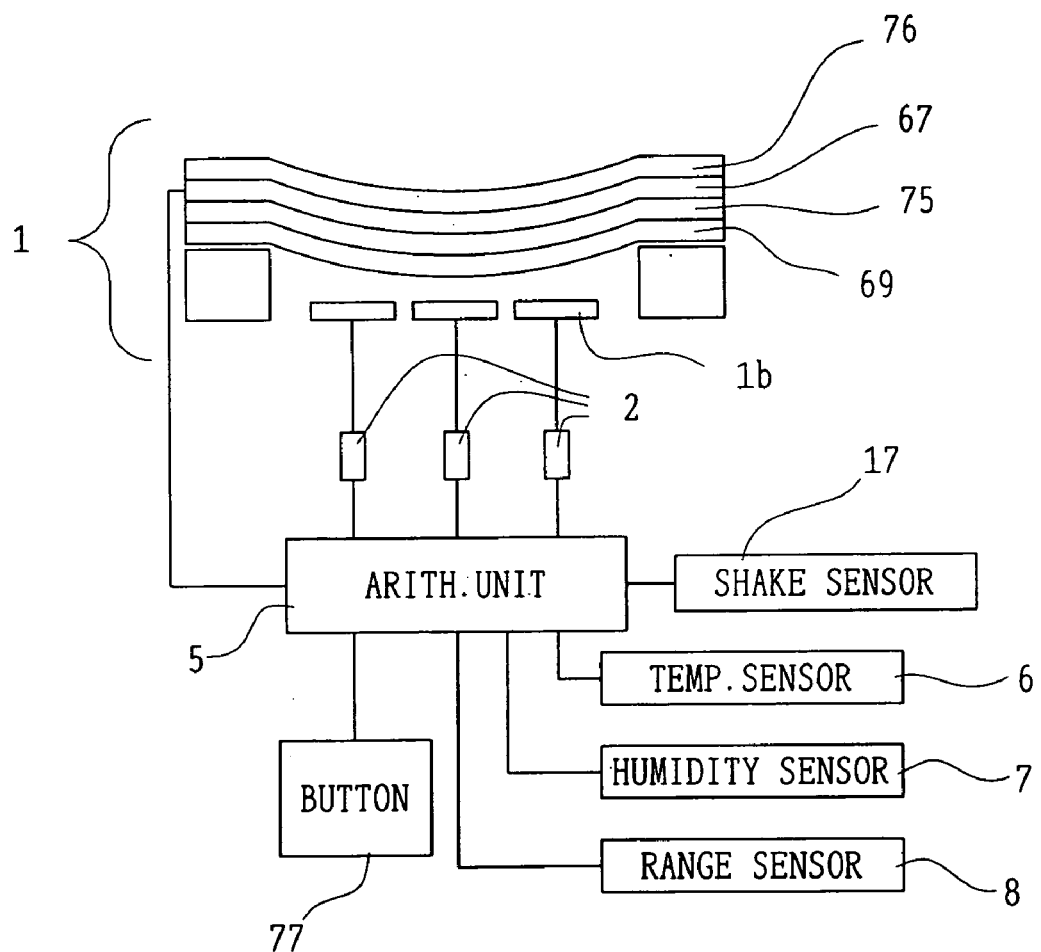
FIG. 38 is a view showing schematically another embodiment of the deformable mirror according to the present invention.

FIG. 38 shows another embodiment of the deformable mirror according to the present invention. In this embodiment, the deformable mirror is used in the digital camera. The deformable mirror of the embodiment is such that the divided electrodes 1b are spaced away from the electrostrictive substance 69 including an organic substance such as acrylic elastomer, on which an electrode 75 and the deformable substrate 67 are placed in turn, and a reflecting film 76 including metal, such as aluminum, for reflecting incident light is provided on the substrate 67.

The deformable mirror, when constructed as mentioned above, has the merit that the surface of the reflecting film 76 becomes smooth and it is hard to produce aberration, in contrast to the case where the divided electrodes 1b and the electrostrictive substance 69 are integrally constructed. Also, the deformable substrate 67 and the electrode 75 may be arranged in reverse order.

In FIG. 38, reference numeral 77 stands for a button for changing the magnification of the optical system or zooming. The deformable mirror 1 is controlled through the arithmetical unit 5 so that a user pushes the button 77 and thereby the reflecting film 76 can be deformed to change the magnification or zoom. Also, instead of the electrostrictive substance including an organic substance such as acrylic elastomer, the piezoelectric substance such as barium titanate.

Figure 39:
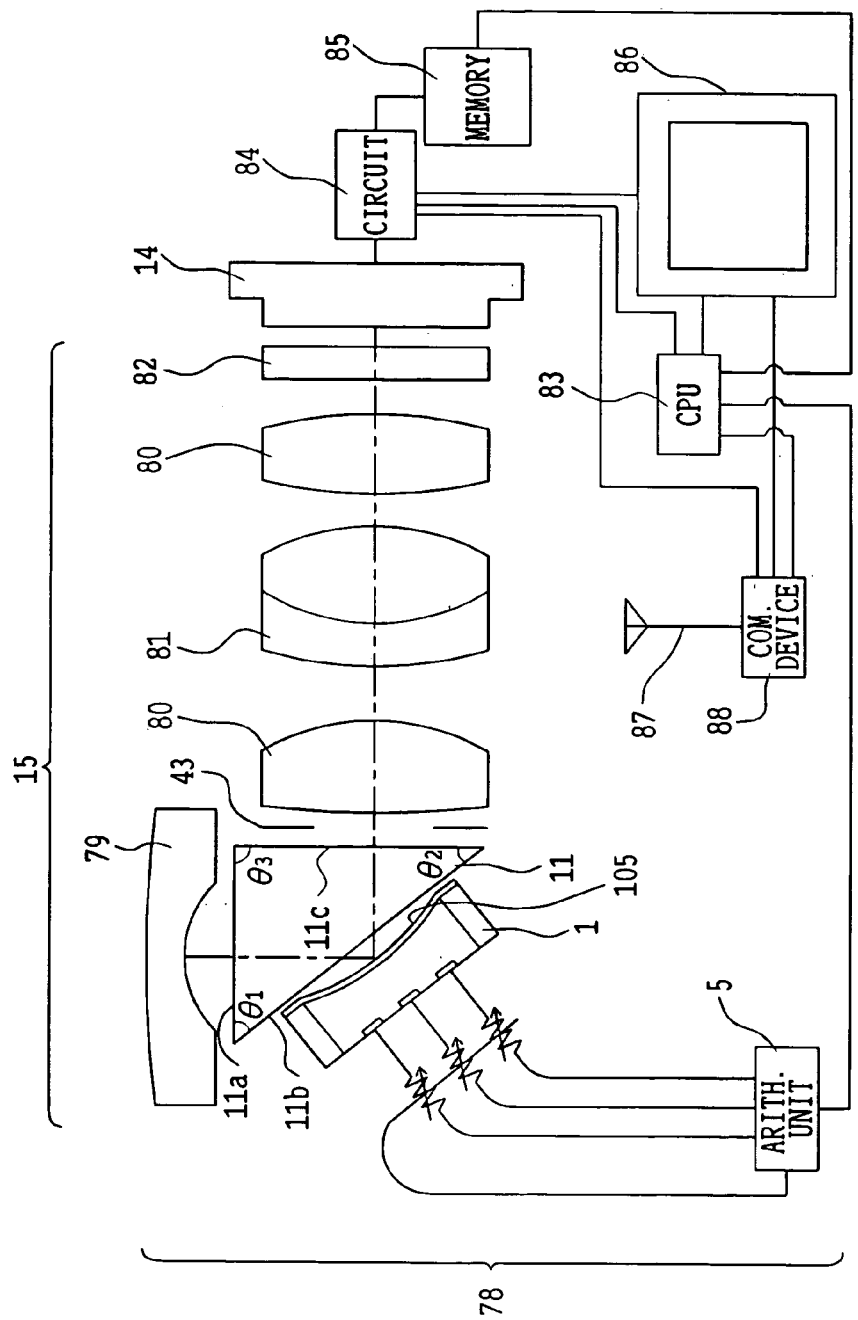
FIG. 39 is a view illustrating schematically an embodiment of a digital camera using the deformable mirror according to the present invention.

FIG. 39 illustrates an example of a digital camera 78 using the deformable mirror, for example, the deformable mirror 1 which is electrostatically driven. By using the deformable mirror 1, it is possible to perform focusing without moving lenses. The imaging lens 15 comprises a concave lens 79, the prism 11, a convex lenses 80, a cemented lens 81, a low-pass filter (not shown), and an infrared cutoff filter 82. In FIG. 39, reference numeral 83 represents a CPU (central processing unit).

An electric signal imaged by the solid-state image sensor 14 is processed through an electronic circuit 84 and stored in a memory 85. The electric signal imaged by the solid-state image sensor 14 is displayed on a display device 86 such as a liquid crystal display, an organic EL display, or a TV monitor. Information coming via an antenna 87 may be processed in a communication device 88 and displayed on the display device 86.

It is also possible to transmit image information or the like which is output of the electronic circuit 84, from the antenna 87 via the communication device 88. In this example, the prism 11 should preferably satisfy the following condition:

$$n_{11} \leq 1.41 \tag{29}$$

where $n_{11}$ is the refractive index of the prism 11. When symbols $\theta_1$, $\theta_2$ and $\theta_3$ denote angles of the prism 11 shown in FIG. 39, it is easy to mechanically design the imaging lens 15 with $\theta_1 = 45° = \theta_2$. In order that the light passing through a slant of the prism 11 is incident on the deformable mirror 1, it is necessary that total reflection does not occur, and for this purpose, Condition (29) must be satisfied.

When $\theta_1 = 40°$, $\theta_2 = 40°$, and $\theta_3 = 100°$, in order that the light is not totally reflected by the slant of the prism 11, it is only necessary to satisfy the following condition:

$$n_{11} \leq 1.555 \tag{30}$$

As a material satisfying Condition (29) or (30), a conjugate material may be used, in addition to a low-refractive index organic material, such as plastic, and synthetic resin.

The conjugate material is also called an organic/inorganic material, which has physical properties of a compromise between glass and plastic, dispersing glass particles of a few nanometers to several tens of nanometers in synthetic resin. The conjugate material provides an advantage of obtaining a material with a low refractive index.

Since a high-dispersion and low-refractive index material is available from the conjugate material, it is simultaneously possible to remove chromatic aberration and reduce the Petzval sum by using concave lenses for the entire optical system, and this is desirable because of the availability of an optical system having a small curvature of field and free from chromatic aberration.

For example, the following materials satisfy Condition (29) or (30):

| SITOP made by Asahi Glass Co., Ltd.: | refractive index, 1.34 |
|---|---|
| Acryl (PMMA): | refractive index, 1.49 |
| Molten quartz: | refractive index, 1.46 |

The above-mentioned digital camera 78 is applicable for a cellular phone, a PDA, or the like.

For two angles of the prism shown in FIG. 39, proper selection of the angle $\theta_1$ of 30° or larger and the angle $\theta_2$ of 60° or smaller permits easy design. As the deformable mirror 1, the deformable mirror of any of other embodiments of the present invention may be adopted.

Surfaces 11a, 11b and 11c of the prism 11 in FIG. 39 may be curved surfaces. A free-formed surface, if adopted as a curved surface, is favorable for aberration for correction.

Figure 40:
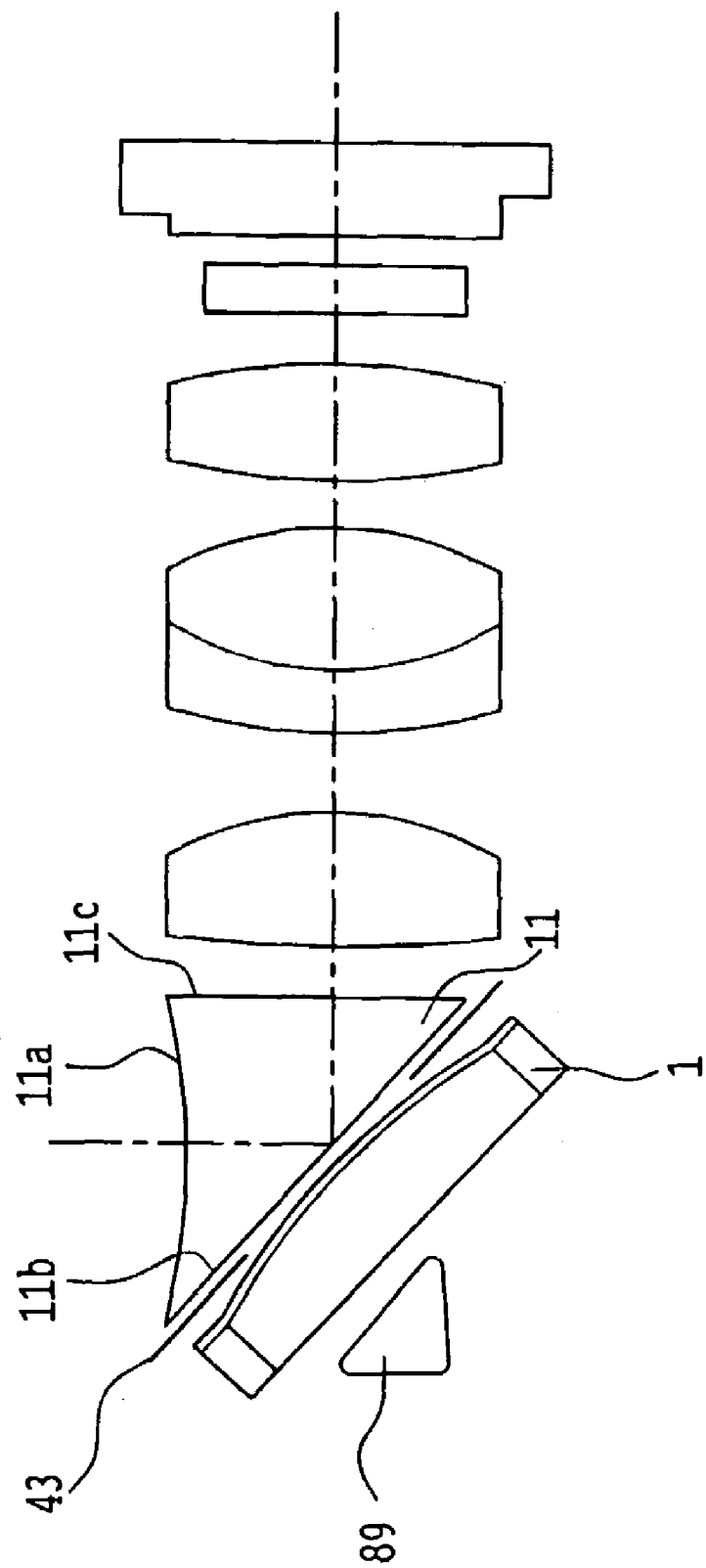
FIG. 40 is a view illustrating schematically a digital camera having a concave prism surface in another embodiment of a prism according to the embodiment of FIG. 39.

FIG. 40 shows a digital camera in which the surface 11a of the prism 11 of the embodiment in FIG. 39 is configured as a concave surface. The concave surface 11a of the prism 11 as shown in FIG. 40 permits omission of the concave lens 79 shown in FIG. 39, thus providing advantages in size reduction and cost curtailment. When the electrostatically driven deformable mirror is used as the deformable mirror 1, the placement of a boosting transformer 89 for driving on the back of the deformable mirror is preferable because a compact design of the apparatus is achieved as a whole.

Figure 41:
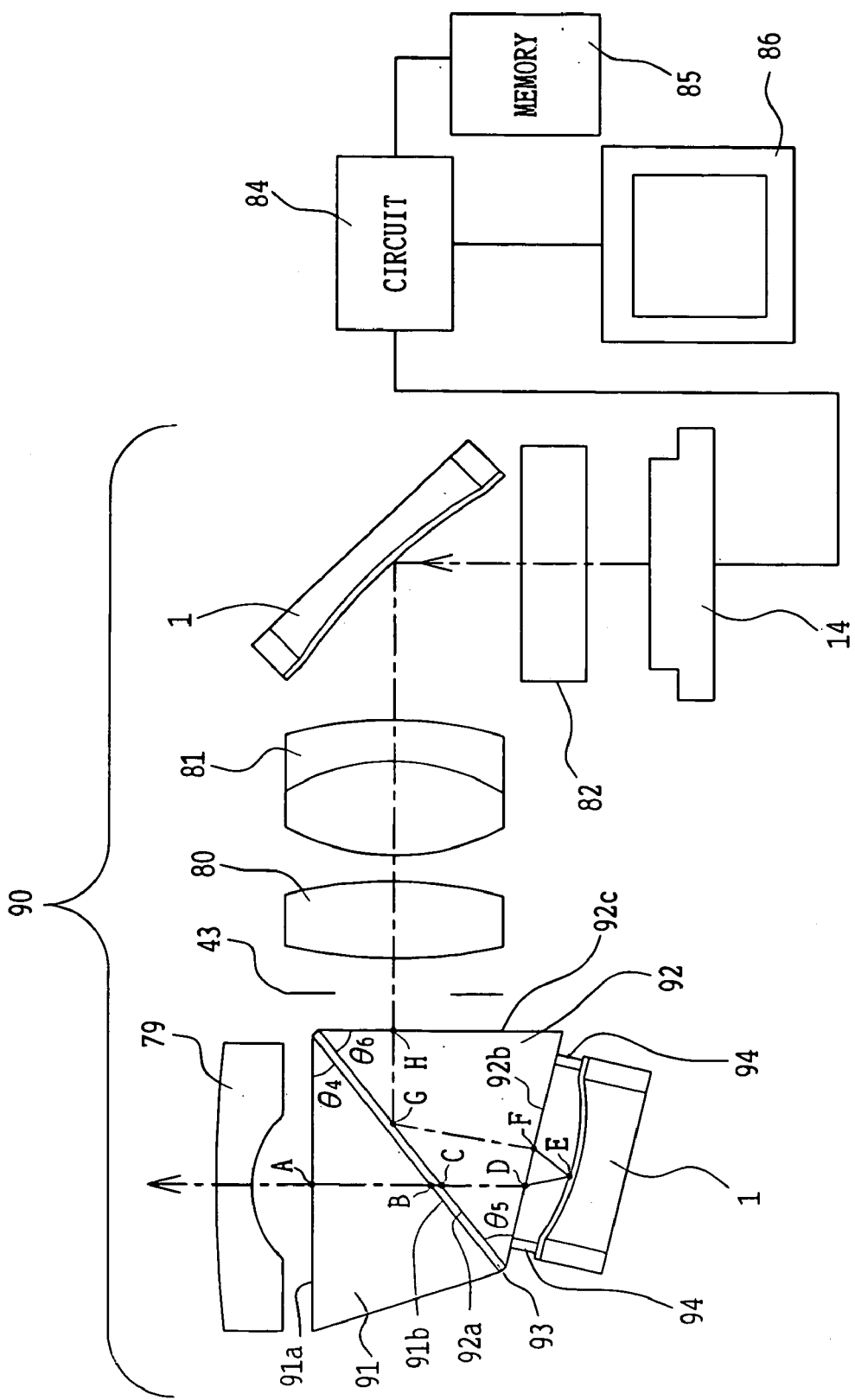
FIG. 41 is a diagram illustrating schematically an electronic imaging system used in a digital camera, an animation recording camera, or a TV camera in another embodiment of the present invention.
Figure 42:
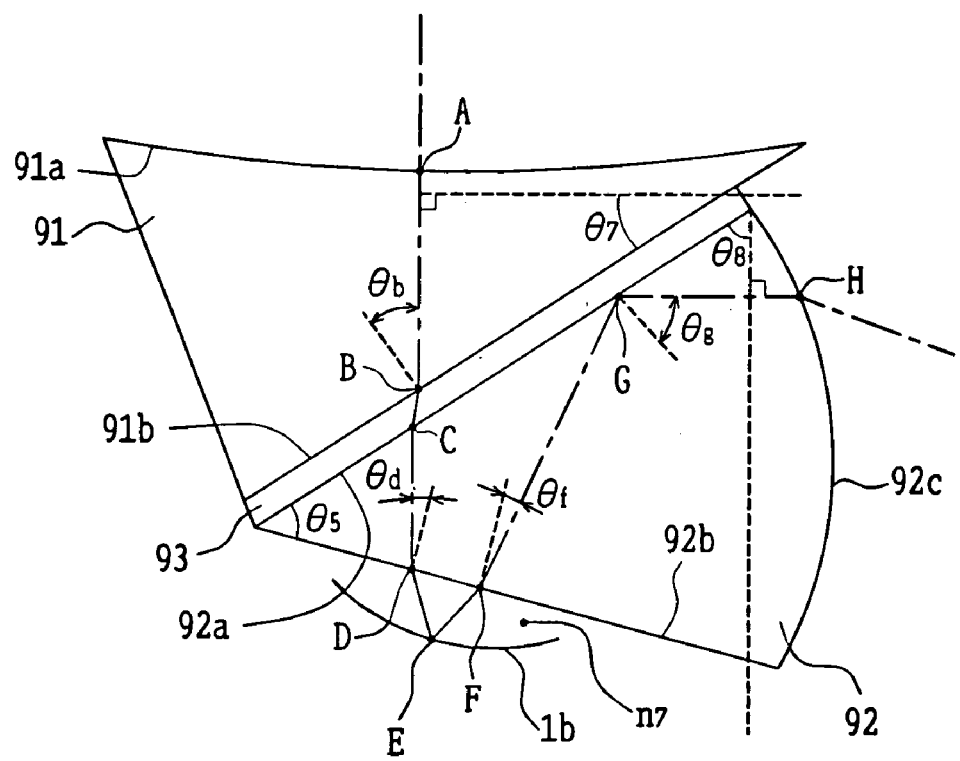
FIG. 42 is an enlarged view of the prism shown in FIG. 41.

FIG. 41 shows an electronic imaging system 90 used in a digital camera, an animation recording camera, or a TV camera, in still another embodiment of the present invention. FIG. 42 shows the enlargement of prisms 91 and 92 in FIG. 41. Use of the deformable mirror 1 and a second deformable mirror 1' permits achievement of zooming and focusing without mechanically moving the lenses.

The deformable mirror 1' uses, for example, electromagnetic force, and may be the deformable mirror 1 of any other embodiments of the present invention. The deformable mirror 1' is integrated with the two prisms 91 and 92 as shown in FIG. 41, and arranged opposite to a surface of the prism 92.

In FIG. 41, the prism 91 is assumed to have a wedge angle $\theta_4$, the prism 92, a wedge angle $\theta_5$, and the prism 92, a shown angle $\theta_6$. The prism 91 is assumed to have a refractive index $n_{91}$, the prism 92, a refractive index $n_{92}$, and a medium 93 between the prisms 91 and 92, a refractive index $n_{93}$. The medium 93 may be air, or vacuum, an adhesive or a thin glass plate.

As shown in FIG. 42, points of intersection of the axial ray with surfaces of the prism 91, the medium 93, and the prism 92 are called A, B, C, D, E, F, G, and H. The two surfaces of the prism 91 are referred to as 91a and 91b, and the three surfaces of the prism 92, as 92a, 92b, and 92c. The surfaces 91a, 91b, 92a, 92b, and 92c may be curved surfaces. Particularly, adoption of a free-formed surface, an aspherical surface, or an eccentric rotationally symmetry plane is advantageous for correction for aberration.

The flat surfaces 91b, 92a and 92b are preferable because it is easy to fabricate the prisms 91 and 92. When the surfaces 91a and 91b of the prism 91 are flat, its fabrication becomes easier.

By hermetically sealing the space between the deformable mirror 1' and the prism 92 with a sealing member 94 from surroundings, it is possible to protect the surface of the deformable mirror. The deformable mirror can thus be protected by arranging the deformable mirror 1' opposite to the optical element and cutting off the reflecting surface from the surrounding space.

In FIG. 42, angles made by the axial ray with normal lines drawn at points B, D, F and G are assumed to be $\theta_b$, $\theta_d$, $\theta_f$ and $\theta_g$, respectively. The surfaces 91a and 92c are configured curved surfaces, and symbols $\theta_7$ and $\theta_8$ represents angles made by vertical lines drawn on the axial ray in the prisms with the surfaces 91b and 92a, respectively.

In order that the incident light at point B in FIG. 42 is not totally reflected, it is necessary to satisfy the following condition:

$$\sin\theta_b < n_{93}/n_{91} \quad (31)$$

In order that the incident light passes the point D toward the deformable mirror 1, it is necessary to satisfy the following condition:

$$\sin\theta_d < n_7/n_{92} \quad (32)$$

where, $n_7$ is a refractive index of the medium between the deformable mirror 1' and the surface 92b of the prism 92. Conceivable media include air, vacuum, water, and silicone oil.

In order that the incident light is totally reflected at point G, the following condition must be satisfied:

$$\sin\theta_g > n_{93}/n_{92} \quad (33)$$

By selecting shapes and refractive indices of the convex lens 80, the cemented lens 81, and the infrared cutoff filter 82 so as to satisfy Conditions (31)–(33), an electronic imaging system permitting focusing, a magnification change and zooming with the deformable mirrors 1 and 1' is available.

When the surfaces 91a, 91b, 92a, 92b and 92c are all flat,
$\theta_7=30°$, $\theta_5=45°$, $\theta_8=60°$,
$n_{91}=1.8$, $n_{92}=1.8$, $n_{93}=1.5$, $n_7=1.0$,
$\theta_b=30°$, $\theta_d=15°$, $\theta_f=15°$, $\theta_g=60°$ When the prisms satisfy the following condition:

$$70° \leq \theta_7+\theta_8 \leq 110° \quad (34)$$

a mechanical design is facilitated, which is favorable.

Figure 43:
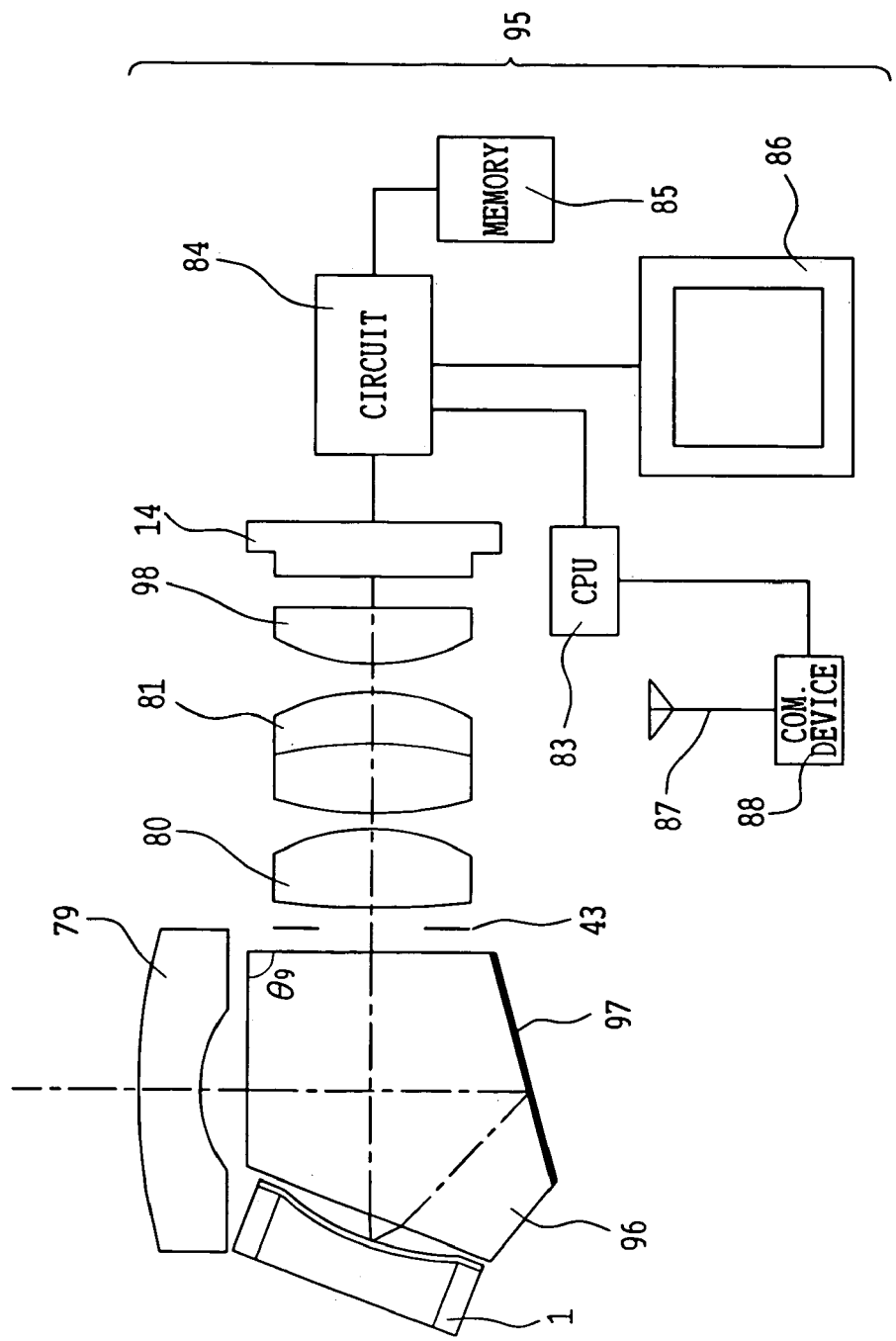
FIG. 43 is a diagram illustrating schematically an optical apparatus for cellular phones, in another embodiment of the optical apparatus according to the present invention.

FIG. 43 illustrates another embodiment of the optical apparatus according to the present invention. In an optical apparatus 95 for cellular phones of this embodiment, the deformable mirror 1 is arranged opposite to a transmitting surface of a prism 96 having three transmitting surfaces and one reflecting surface. By using the deformable mirror 1, it is possible to conduct focusing without mechanically moving the optical elements.

A wide angle is achieved by arranging the concave lens 79 in a front unit and the convex lens 80 in a rear unit, with the prism 96 having four optical flat surfaces between them. The wide angle means here that a diagonal imaging view angle is 47° or larger.

If an angle $\theta_9$ of the prism 96 shown in FIG. 43 is 90°, mechanical design can be made more conveniently. This is a pentaprism which is widely used. In FIG. 43, reference numeral 97 represents a reflecting film formed by aluminum vapor deposition or the like. Use of an aspherical lens 98 in the optical system permit better correction for aberration.

Figure 44:
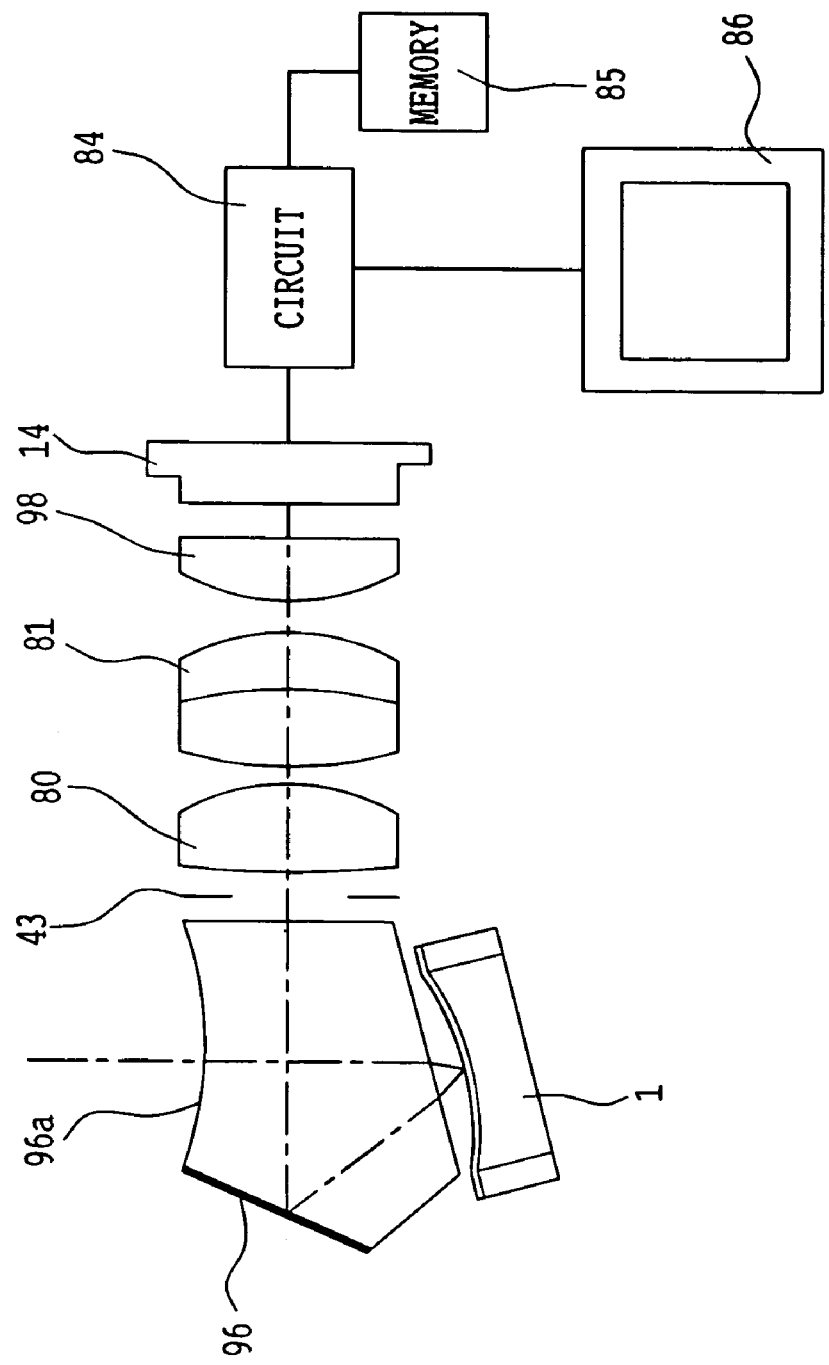
FIG. 44 is a diagram illustrating schematically another embodiment of the optical apparatus for cellular phones according to the present invention.

FIG. 44 shows another embodiment of the optical apparatus for cellular phones of the present invention. The optical apparatus for cellular phones has the prism 96 having a concave surface 96a. Use of the concave surface 96a provides an advantage of omitting the concave lens 79 in FIG. 43.

Figure 45:
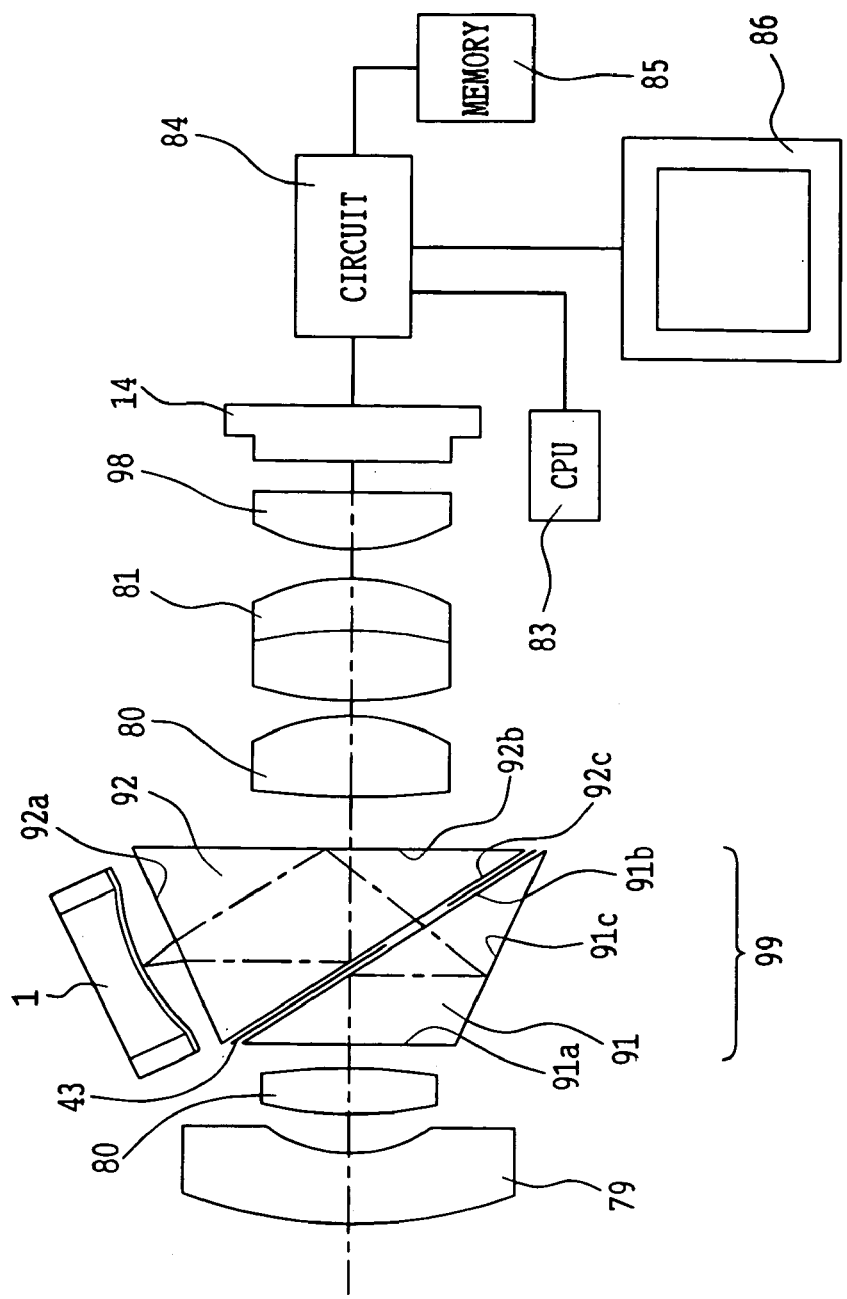
FIG. 45 is a diagram showing schematically the deformable mirror arranged opposite to a surface not giving a total reflection of a Schmidt prism, in an embodiment of a direct-view optical system according to the present invention.

In an embodiment shown in FIG. 45, the deformable mirror 1 is placed opposite to a surface not totally reflecting the light of a Schmidt prism 99. Unlike the example of a side-view optical system as in FIG. 39, this is a direct-view optical system. By using the deformable mirror 1, it is possible to conduct focusing without moving the optical elements.

A stop 43 is interposed between the two triangular prisms 91 and 92 constituting the Schmidt prism 99. The deformable mirror 1 may be placed opposite to the surface 91c of the triangular prism 91.

Figure 46:
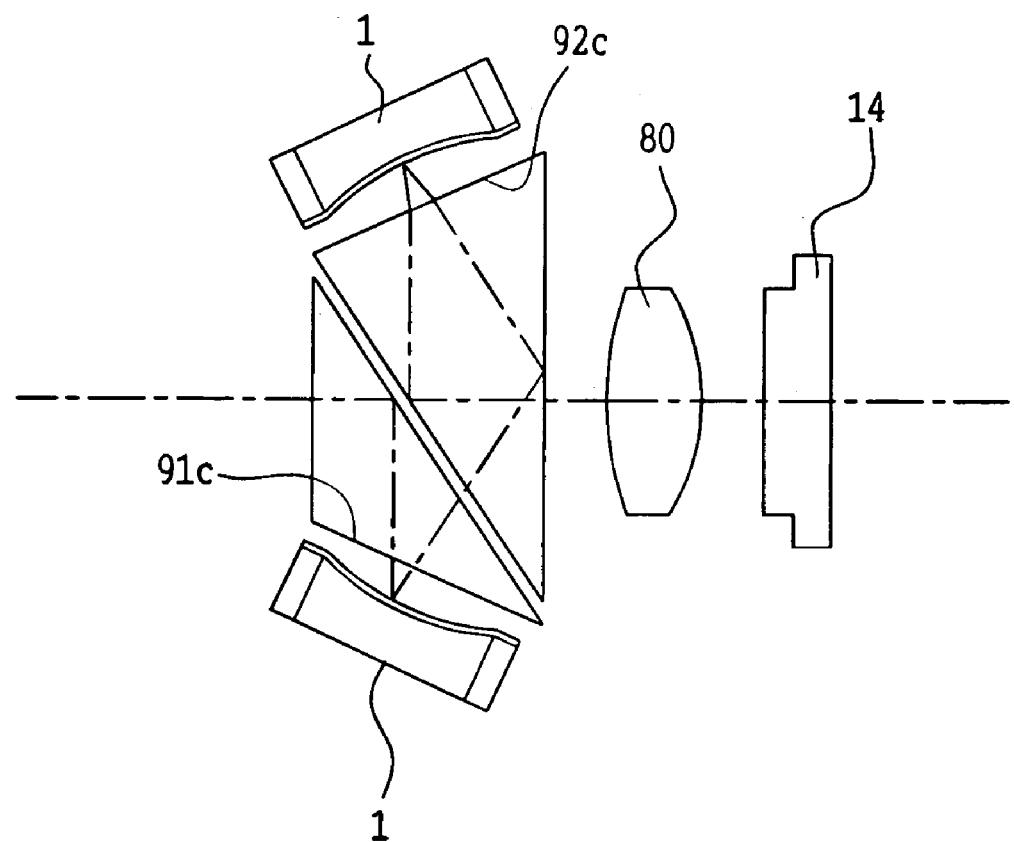
FIG. 46 is a view showing schematically an optical system in which the deformable mirrors, each shown in FIG. 45, are arranged on the surfaces of triangular prisms.

Arrangement of the deformable mirrors 1 and 1' opposite to surfaces of the triangular prisms 91c and 92c, as shown in FIG. 46, permits both zooming and focusing.

Figure 47:
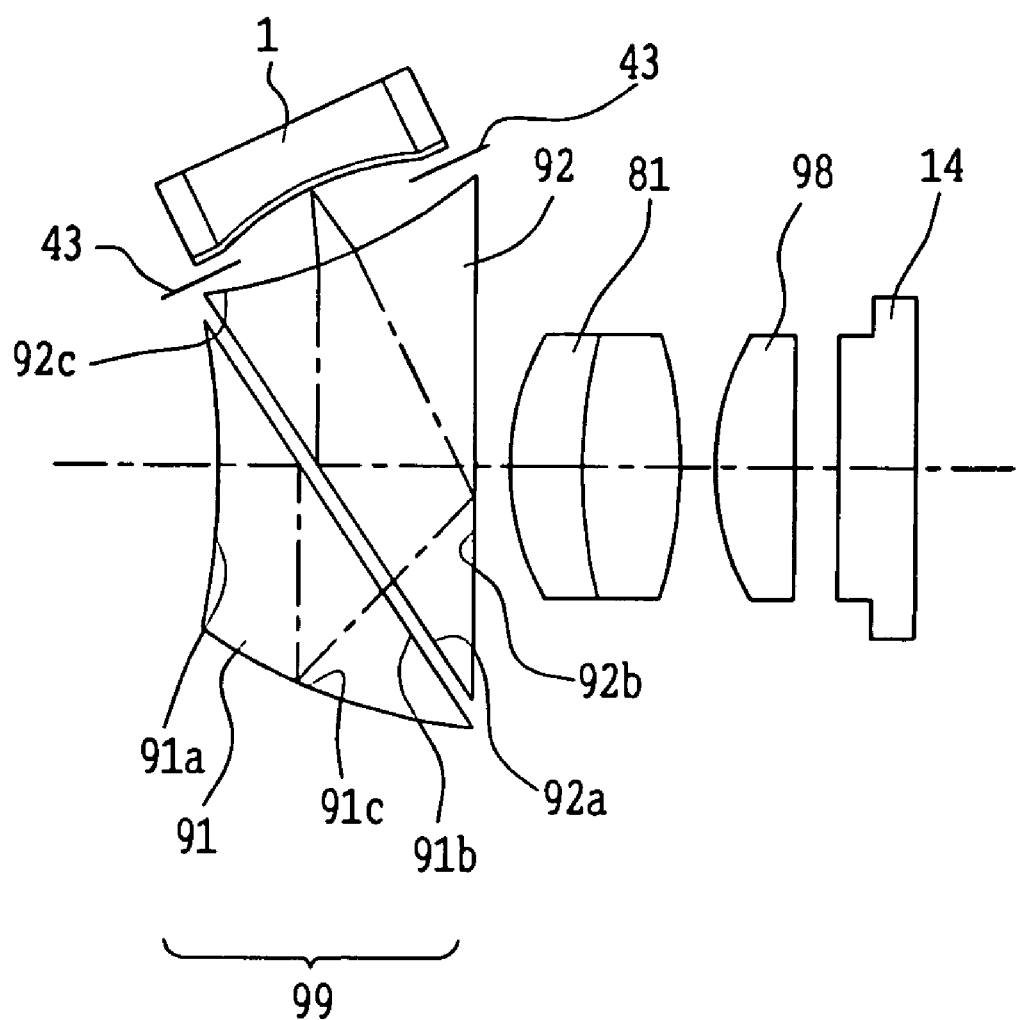
FIG. 47 is a view showing schematically an optical system in which any of the surfaces of the triangular prisms shown in FIG. 45 is configured as a curved surface.

As shown in FIG. 47, any of the surfaces 91a, 91b, and 91c of the triangular prism 91 and the surfaces 92a, 92b, and 92c of the triangular prism 92 may be configured as curved surfaces, this providing a favorable merit of omitting lenses such as the concave lens 79 and the convex lens 80.

When a roof surface is not provided on the Schmidt prism 99, a mirror image is formed In this case, it is only necessary to electrically invert the image by performing image processing in an electronic circuit 84 shown in FIG. 45. This is desirable because cost can be reduced.

In the embodiments shown in FIGS. 39 to 47, the curved surfaces used in the prism should preferably be free-formed surfaces. Adoption of free-formed surfaces is favorable because sufficient correction for aberration can be made. The embodiments of the optical systems shown in FIGS. 39 to 47 may be applied to electronic endoscopes or capsule endoscopes, and also to various imaging devices or observing units.

Figure 48B:
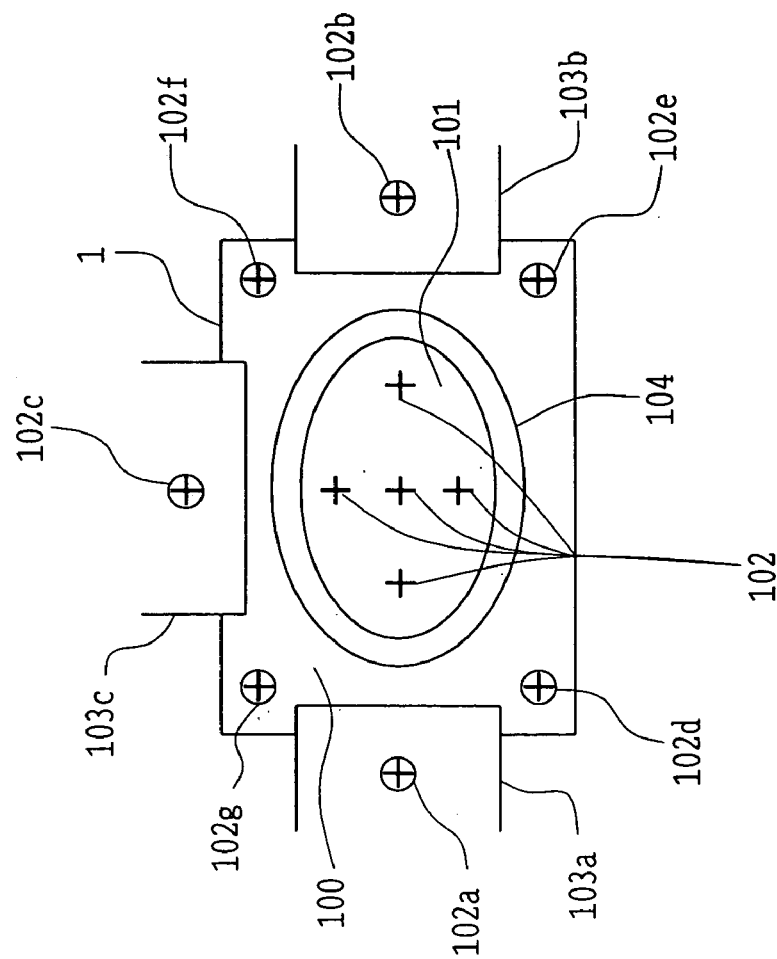
FIG. 48B is a plan view showing the deformable mirror of FIG. 48A.
Figure 48A:
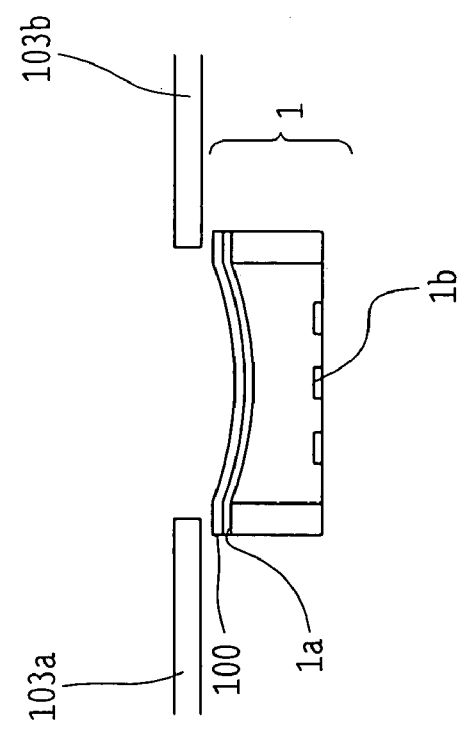
FIG. 48A is a side view illustrating schematically still another embodiment of the deformable mirror according to the present invention.

FIGS. 48A and 48B shows the deformable mirror 1 which is still another embodiment of the present invention. In this deformable mirror 1, a reflecting film 100 made, for example, of an aluminum coating film is deposited on the thin film 1a of an organic material, for example, of polyimide.

In general, when incorporating the deformable mirror into an optical system, it is necessary to position and fix it with respect to other optical elements such as prisms or frames. For this purpose, understanding of the center of a beam passing portion of the deformable mirror 1 will facilitate assembling and adjustment.

For this purpose, in the present invention, marks 102 are provided in a beam passing portion 101 of the reflecting film 100 (see FIG. 48B).

The mark 102 is formed by providing a crossed portion having no reflecting coat, by removing a crossed portion from the coat after providing a reflecting coat, or by vapor-depositing a black material onto the reflecting coat. The shape of the mark is not limited to a cross, but may be a circle, a ring, a straight line, or a line segment, and the number of marks may be one or more.

If the sum of mark areas contained in an axial beam passing portion is 1/5 or less of the area of the axial beam passing portion, such marks are acceptable because they have no effect on image forming. Alternatively, in an optical system of a slightly lower cost, marks are applicable with no problem if the sum of the mark areas is 1/10 or less of the area of the beam passing portion 101.

In FIG. 48B, reference numerals 103a, 103b and 103c represent frames to which the deformable mirror 1 is mounted. As shown in FIG. 48B, it is recommendable to provide positioning marks 102a, 102b and 102c on the frames 103a, 103b and 103c. As a result, by positioning the marks 102a, 102b and 102c visually or while watching through a loupe or a microscope, correct assembly as designed can be conveniently achieved.

The marks 102, 102a, 102b and 102c can also be used for confirming correct positioning after assembling. The shape of the marks 102a, 102b and 102c can be appropriately selected from a line segment, a cross, a circle, a black point and the like, which are formed, scratched, printed, and painted on the frames. The marks 102a, 102b and 102c may be provided, not on the frames to which the deformable mirror is mounted, but on frames or members in the proximity thereof.

Marks 102d, 102e, 102f and 102g shown in FIG. 48B are positioning marks provided outside the beam passing portion of the deformable mirror. Checkup after positioning or assembling of the deformable mirror 1 may be carried out with combinations of the marks 102d, 102e, 102f and 102g with the marks 102a, 102b and 102c. The shape of the marks 102d, 102e, 102f and 102g can be selected in the same manner as in the marks 102a, 102b and 102c.

In FIG. 48B, reference numeral 104 represents the outer periphery of the portion where the surface profile of the deformable mirror 1 is deformed. The beam passing portion 101 on which a light beam is actually incident is present inside this outer periphery 104.

In this case, in order to bring the shape of the beam passing portion 101 closer to an optical design, it is necessary to adopt an area $S_1$ of the beam passing portion 101 smaller than an area $S_2$ inside the outer periphery 104. It is desirable to satisfy the following condition:

$$0.3 < S_1/S_2 < 0.995 \tag{35}$$

If the upper limit of Condition (35) is surpassed, the shape of the peripheral portion of the beam passing portion 101 of the deformable mirror will be out of the design value, leading to deterioration in optical performance. On the other hand, if the actual value is less than the lower limit of Condition (35), the deformable mirror becomes too large, resulting in a cost increase.

In order to achieve higher performance and lower cost, it is only necessary to satisfy the following condition:

$$0.4 < S_1/S_2 < 0.95 \tag{36}$$

Figure 49:
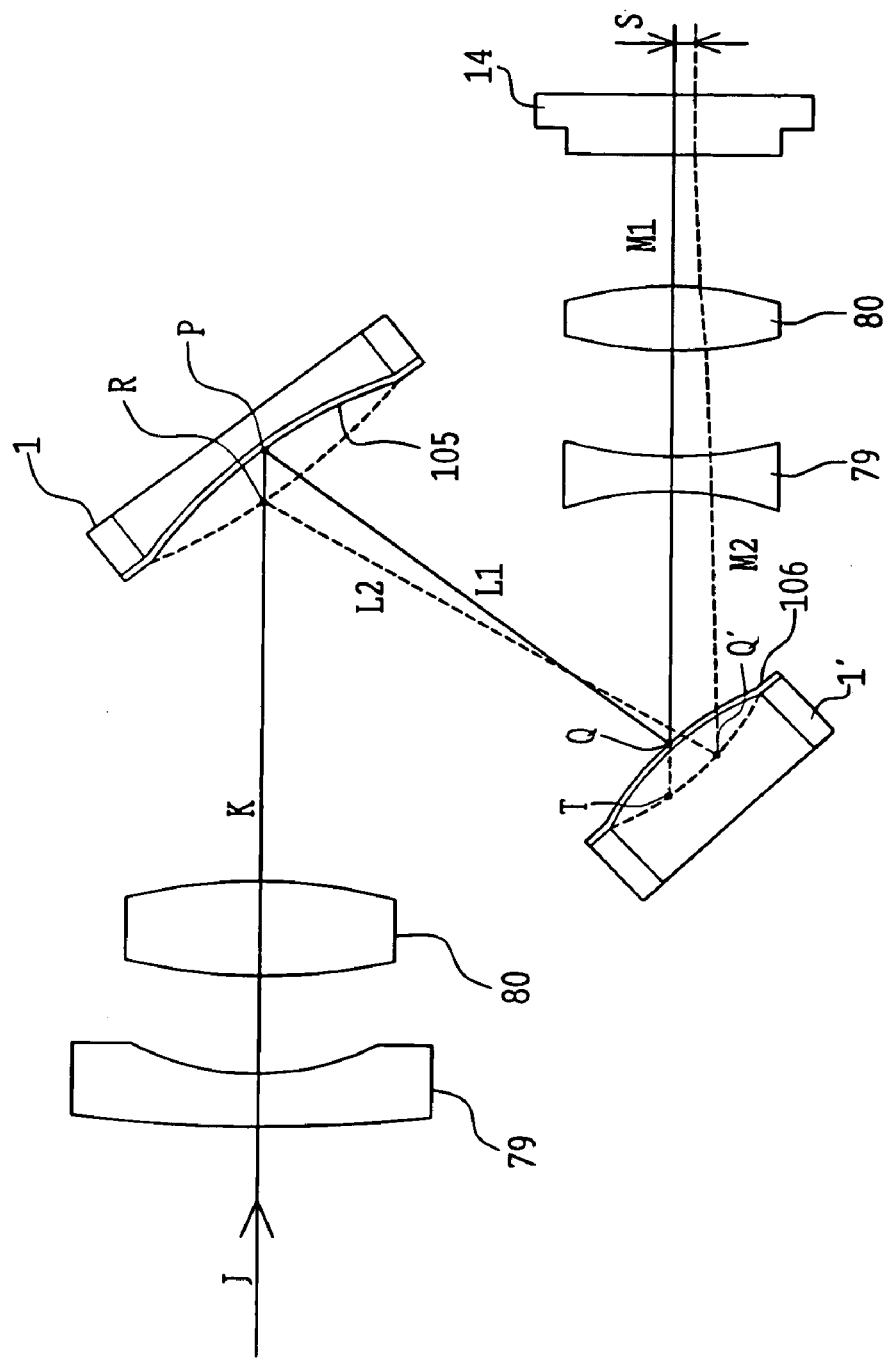
FIG. 49 is a view showing schematically a digital camera having deformable mirrors in still another embodiment of the zoom imaging optical system of the present invention.

FIG. 49 shows a digital camera having the deformable mirrors 1 and 1' in another embodiment of the zoom imaging optical system of the present invention. By using the two deformable mirrors 1 and 1', it is possible to accomplish zooming and focusing without moving the optical elements. This state can be displayed on a display device not shown.

In a first state (at the wide-angle position), an axial ray J becomes an axial ray K after passing through the concave lens 79 and the convex lens 80 and changes to an axial ray L1 after reflection at a point P on the deformable mirror 1. The axial ray is then reflected at a point Q on the deformable mirror 1' to change to an axial ray M1 and enters the solid-state image sensor 14.

Subsequently, in a second state (at the telephoto position), a reflecting surface 105 of the deformable mirror 1 and a reflecting surface 106 of the deformable mirror 1' are deformed as indicated by broken lines in FIG. 49. The axial ray J becoming the axial ray K is therefore reflected at a point R on the deformable mirror 1 and changes to an axial ray L2. The axial ray is then reflected at a point Q' on the deformable mirror 1' to change to an axial ray M2, and reaches a position shifted by a distance S on the solid-state image sensor 14. This generally leads to a defect in that zooming causes a change in field direction. For the purpose of obviating this defect, the optical apparatus of the present invention is designed so that the amount of shift S can be reduced to zero.

Figure 50:
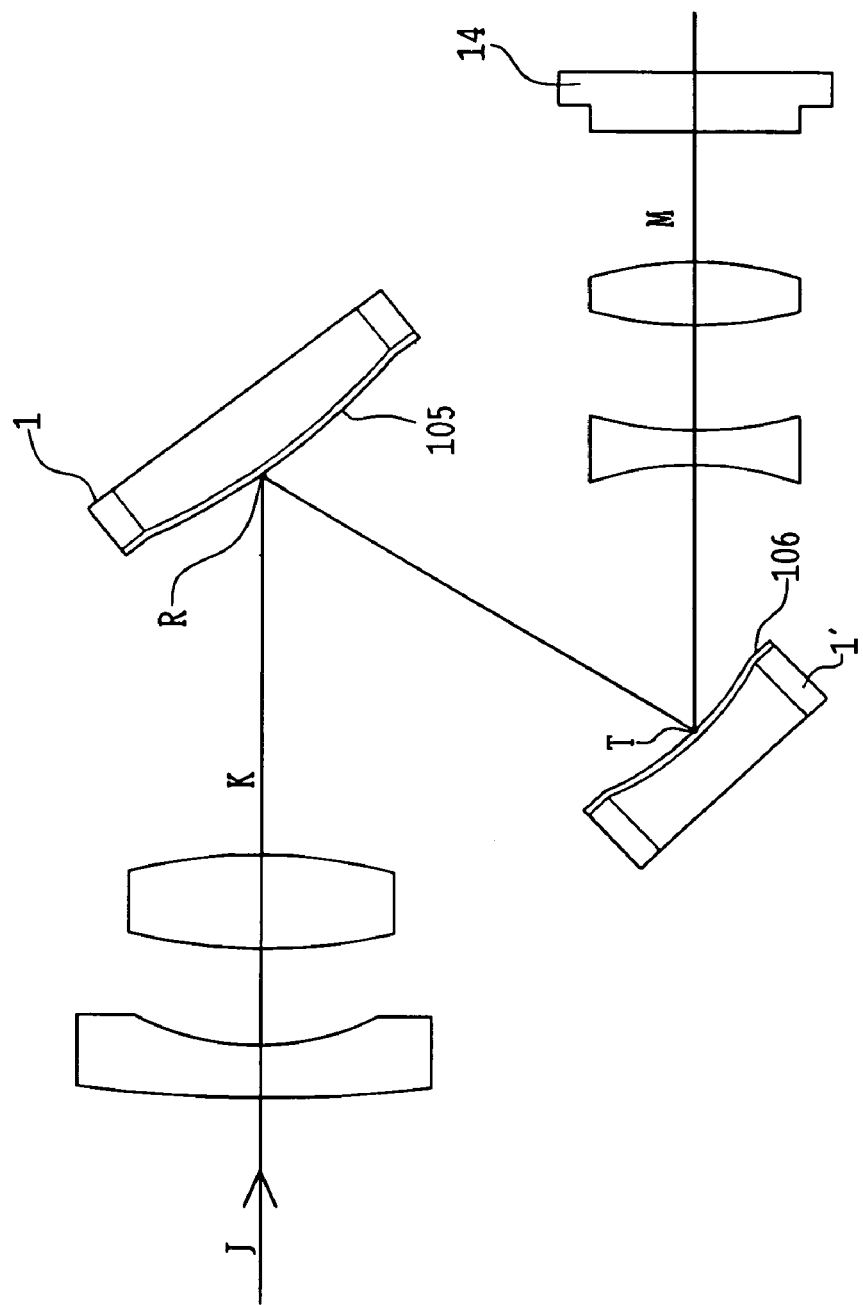
FIG. 50 is an explanatory view showing the reflection locus of the light in a first state (wide angle) of the zoom imaging optical system of the present invention.

FIG. 50 illustrates an embodiment for this purpose. Specifically, in the second state (telephoto), when the point of intersection of the axial ray K with the deformable mirror 1 is denoted by R and the point of intersection of the axial ray M with the deformable mirror 1' is denoted by T, the amount of shift S can be reduced to zero by changing the shape of the reflecting surfaces 105 and 106 so that a light ray travels from the point of intersection R to the point of intersection T.

In practice, when the optical system has a focal length f, it is only necessary to satisfy the following condition:

$$|S|<(1/30)|f| \qquad (37)$$

For a low-accuracy optical system, when it satisfies the following condition:

$$|S|<(1/5)|f| \qquad (38)$$

this optical system is applicable in practice.

For an optical system of a high accuracy, it is necessary to satisfy the following condition:

$$|S|<(1/50)|f| \qquad (39)$$

Here, the focal length f stands for an average of the focal length at a long focus position and that at a short focus position.

The reflecting surfaces 105 and 106 configured as free-formed surfaces are favorable for correction for aberration.

In order that the light ray reflected at the point R shown in FIG. 50 reaches the point of intersection T, it is only necessary to appropriately vary the first- and lower-order terms for X and Y in the free-formed surface equation expressing the reflecting surfaces 105 and 106. The first-order term changes the inclination of the surface, and the zero-order term changes the position of the surface.

An attempt made to reduce the amount of shift S by using the second-order term causes a change in power of the optical system. This is not therefore acceptable. It is therefore good practice to vary the zero- and first-order terms, i.e., the coefficients along with zooming.

An example of an imaging system has been described. The same holds for the cases of other zoom systems, display optical systems, observing optical systems and information processing systems.

In the above description of FIGS. 49 and 50, no optical element is present between the two deformable mirrors. The same description is applicable even though the optical element is provided. The same concept is valid also for an optical system having three or more deformable mirrors. By changing the coefficients of the first- and lower-order terms in the free-formed surface equation for at least two deformable mirrors, the amount of shift S can be reduced to zero.

Even when the deformable mirror has a shape other than the free-formed surface, the same consideration is taken by adding the zero- and first-order terms to the equation expressing the curved surface. The consideration of inhibiting a positional shift of the image by changing the first- and lower-order terms is also applicable to compensation for shake in a camera, a digital camera or a TV camera.

In this case, the number of deformable mirrors 1 and 1' and deformable mirrors 1 may be one or more. For example, in order to compensate for shake in the optical system shown in FIG. 39, it is only necessary to change the shape of the reflecting surface 105 of the deformable mirror 1. The first- and lower-order terms in the equation expressing the shape of the reflecting surface 105 are changed, and thereby the compensation for shake can be made.

As shown in FIG. 38, simultaneous use of the shake sensor 17 permits compensation for camera shake caused by manual operation or in photography on a vehicle. This compensation for shake is also suitable for an optical apparatus such as an observing unit, an imaging device or a display device. Conditions (37) to (39) are applicable to the compensation for shake by considering the focal length f as a focal length of the optical apparatus where compensation for shake is made.

The consideration of correcting the shift of the image position when deforming the deformable mirror by means of the zero- and first-order terms is also applicable to the case where one or more deformable mirrors, as shown in FIGS. 39, 43, 45 and 46, are used to perform focusing. Conditions (37) to (39) are applicable to correction for shift of an image position by considering the focal length f as an average of focal lengths upon focusing.

The examples of the deformable mirrors correcting the change of the field direction, the shift of the image position, and the variation of the ray position have been described so far. However, even when an optical element whose surface profile is changed is used, the same correction can be made. The variable focal-length lens shown in each of FIGS. 27, 28, 30, 31, 32, 33, and 34, together with the deformable mirror, is also an example of the optical element whose surface profile is changed. Even when this variable focal-length lens is used, the change of the field direction, the shift of the image position, and the variation of the ray position can be similarly corrected.

Figure 51A:
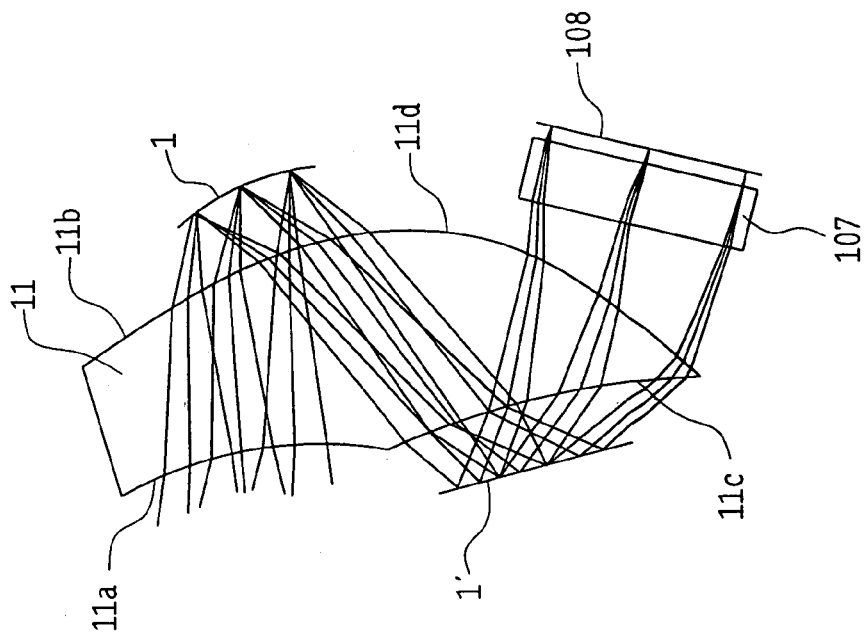
FIG. 51A is a sectional view of a Y-Z plane at the wide-angle position in an embodiment illustrating specific numerical values of the present invention.
Figure 51B:
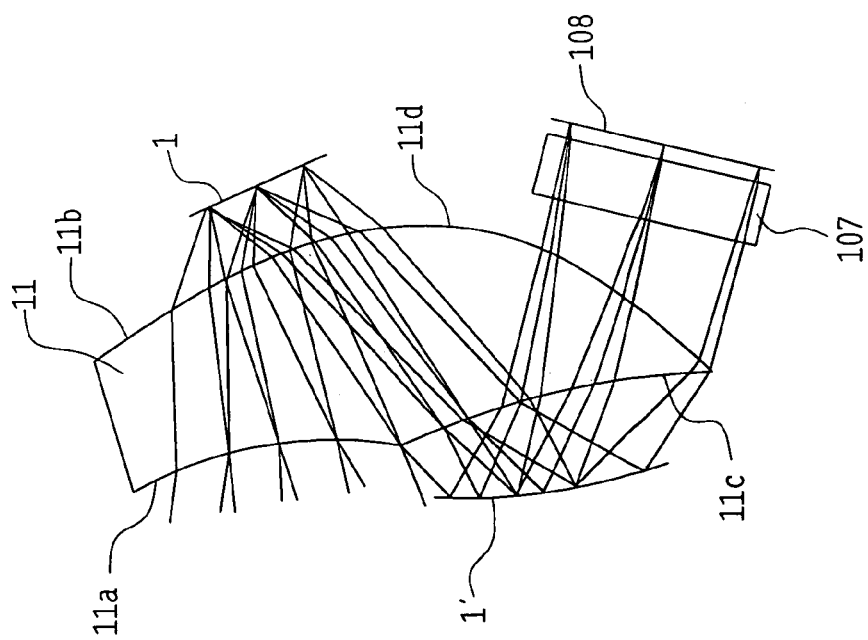
FIG. 51B is a sectional view of the Y-Z plane at the telephoto position in the embodiment illustrating specific numerical values of the present invention.

As an embodiment of the above, a specific optical system using the deformable mirror will now be described. FIGS. 51A and 51B show Y-Z planes in this embodiment.

This embodiment satisfies Condition (38), with f=7.6 and S=0.96. The value of Z representing the coordinate origin of the deformable mirror differs between the wide-angle position and the telephoto position. The first- and lower-order terms of a function expressing the shape of the deformable mirror are changed.

FIG. 51A illustrates the cross-section at the wide-angle position, and FIG. 51B, the cross-section at the telephoto position. Two free-formed-surface deformable mirrors 1 and 1' are provided so as to face refractive surfaces 11b and 11c, respectively, on the both longitudinal sides of the free-formed surface prism 11 comprising four free-formed refractive surfaces 11a, 11b, 11c and 11d, interposed between the mirrors 1 and 1'. Downsizing is achieved, and this is an optical system for an electronic imaging system conducting both zooming and focusing.

In FIGS. 51A and 51B, reference numeral 107 represents a plane-parallel plate such as a filter, and 108 represents an imaging plane (image forming plane). A stop is placed on the surface of the first deformable mirror 1 or in the proximity thereof. The stop can be achieved by applying a black coating around the reflecting surface of the deformable mirror 1.

The two deformable mirrors 1 and 1' on zooming are such that the shape of the deformable mirror 1 transforms from a flat surface into a concave surface, and that of the deformable mirror 1', from a concave surface into a flat surface in a reverse direction. These two deformable mirrors 1 and 1' may, of course, be changed from convex to concave, and from concave to convex surfaces. This is because a reverse change is carried out.

The imaging plane 108 is positioned on the opposite side of the deformable mirror 1' relative to the longitudinal direction of the free-formed surface prism 11 interposed between them, and on the same side as the deformable mirror 1 relative to the longitudinal direction of the free-formed surface prism. This arrangement is preferable because the entire optical system can be reduced in size.

The first deformable mirror 1 is also deformed on focusing. This deformable mirror 1, located on the stop surface, has the merit that it is hard to cause a change of the view angle even when deformed. The second deformable mirror 1' is deformed on zooming. Since the height of a principal ray of light is higher than the radius of a beam of light, it is possible to accomplish zooming (or a magnification change) without causing a large change of focusing. During zooming, the first deformable mirror 1 may also be deformed (see numerical data described later).

In the numerical data of this embodiment described later, an F-number is 4.6 at the wide-angle position and 5.8 at the telephoto position; a focal length $f_{TOT}$ is 5.8 mm at the wide-angle position and 9.4 mm at the telephoto position; an image size is 3.86×2.9 mm; and a view angle at the wide-angle position is 45° in diagonal view angle, 28° in shorter side direction, and 36.8° in longer side direction, and a view angle at the telephoto position is 28° in diagonal view angle, 18° in shorter side direction, and 23° in longer side direction.

At least one of the deformable mirrors of the present invention including the case of this embodiment in at least one state during operation is desirable to satisfy one of the following conditions:

$$0 \leq |P_x/P_{TOT}| < 1000 \tag{40}$$

$$0 \leq |P_y/P_{TOT}| < 1000 \tag{41}$$

where, $P_x$ is an inverse number of the main radius of curvature closer to the entrance surface from among main radii of curvature near the optical axis of the deformable mirror; $P_y$ is an inverse number of the main radius of curvature distant from the entrance surface from among main radii of curvature near the optical axis of the deformable mirror (when the free-formed surface is expressed by Equation (a) described later and a symmetric surface in parallel with the Y-Z plane is the only free-formed surface, calculation can be based on $P_x=2C_6$, and $P_y=2C_4$), and $P_{TOT}=1/f_{TOT}$, where $f_{TOT}$ is the focal length of the entire system.

According as $|P_x/P_{TOT}|$ or $|P_y/P_{TOT}|$ approaches the value of 0 of the lower limit of Condition (40) or (41), the surface profile becomes closer to a flat surface or a cylindrical surface, thus making it easier to control the surface profile. If the above value exceeds the value of 1000 of the upper limit, it becomes more difficult to correct for aberration and to manufacture the deformable mirror.

For applications of higher accuracy, it is recommended to satisfy the following conditions:

$$0 \leq |P_x/P_{TOT}| < 100 \tag{42}$$

$$0 \leq |P_y/P_{TOT}| < 100 \tag{43}$$

in place of Conditions (40) and (41).

It is desirable that at least one of the deformable mirrors used in the optical system of the present invention including the case of this embodiment in at least one state during operation satisfies one of the following conditions:

$$0.00001 \leq |\Delta P_x/P_{TOT}| < 1000 \tag{44}$$

$$0.00001 \leq |\Delta P_y/P_{TOT}| < 1000 \tag{45}$$

where, $\Delta P_x$ and $\Delta P_y$ represent the amounts of change in the values $P_x$ and $P_y$, respectively.

If the values of $|\Delta P_x/P_{TOT}|$ and $|\Delta P_y/P_{TOT}|$ become lower than the value of 0.00001 of the lower limit, the effect as a deformable mirror will be reduced. If the values exceed the value of 1000 of the upper limit, on the other hand, it becomes difficult to correct for aberration and manufacture the deformable mirror.

When higher accuracy is desired, it is favorable to satisfy the following conditions:

$$0.00001 < |\Delta P_x/P_{TOT}| < 100 \tag{46}$$

$$0.00001 < |\Delta P_y/P_{TOT}| < 100 \tag{47}$$

in place of Conditions (44) and (45).

It is desirable that the deformable mirrors used in the optical system of the present invention, including the case of this embodiment, satisfy in an operating state at least one of the following conditions:

$$0.00001 < |P_x| < 100 (\text{mm}^{-1}) \tag{48}$$

$$0.00001 < |P_y| < 100 (\text{mm}^{-1}) \tag{49}$$

When the value $|P_x|$ or $|P_y|$ exceeds the value of 100 of the upper limit of Condition (48) or (49), the deformable mirror becomes too small in size, and it becomes difficult to manufacture the same. Below the value of 0.00001 of the lower limit, the effect of the deformable mirror is lost.

When higher accuracy is required, it is recommended to satisfy the following conditions:

$$0.001 < |P_x| < 100 \ (\text{mm}^{-1}) \tag{50}$$

$$0.001 < |P_y| < 100 \ (\text{mm}^{-1}) \tag{51}$$

in place of Conditions (48) and (49).

It is more desirable to satisfy the following conditions:

$$0.005 < |P_x| < 10 (\text{mm}^{-1}) \tag{52}$$

$$0.005 < |P_y| < 10 (\text{mm}^{-1}) \tag{53}$$

in place of Conditions (50) and (51).

It is desirable that at least one of the deformable mirrors used in the present invention including the case of this embodiment satisfies in an operating state at least one of the following conditions:

$$0.0001 < |\Delta P_x| < 100 (\text{mm}^{-1}) \tag{54}$$

$$0.0001 < |\Delta P_y| < 100 (\text{mm}^{-1}) \tag{55}$$

If the value of $|\Delta P_x|$ or $|\Delta P_y|$ is over the value of 100 of the upper limit 100 of each condition, the amount of deformation of the deformable mirror will be extremely increased and may be damaged. Below the value of 0.0001 of the lower limit, the effect as a deformable mirror is reduced.

When higher accuracy is required, it is recommendable to satisfy the following conditions:

$$0.0005 < |\Delta P_x| < 10 (\text{mm}^{-1}) \tag{56}$$

$$0.0005 < |\Delta P_y| < 10 (\text{mm}^{-1}) \tag{57}$$

in place of Conditions (54) and (55).

It is more desirable to satisfy the following conditions:

$$0.002 < |\Delta P_x| < 10 (\text{mm}^{-1}) \quad (58)$$

$$0.002 < |\Delta P_y| < 10 (\text{mm}^{-1}) \quad (59)$$

in place of Conditions (56) and (57).

It is desirable that at least one of the deformable mirrors used in the optical systems of the present invention including the case of this embodiment satisfies in an operating state the following condition:

$$0 \leq |P_x/(P_y \cos \phi)| < 100 \quad (60)$$

where, $\phi$ represents the incident angle of an axial ray on the deformable mirror.

The value of $|P_x/(P_y \cos \phi)|$ passes the value of 100 of the upper limit, correction for astigmatism becomes difficult Approaching the value of 0 of the lower limit corresponds to approaching a cylindrical surface of the surface profile.

For use requiring higher accuracy, it is desirable, instead of Condition (60), to satisfy the following condition:

$$0 \leq |P_x/(P_y \cos \phi)| < 25 \quad (61)$$

When $P_y=0$ and $P_x=0$ in Conditions (48) and (61), i.e., in the case of a flat surface, $P_x/(P_y \cos \phi)$ should be replaced by $1/\cos \phi$.

When $P_x \neq 0$ and $P_y=0$ in Conditions (48) and (61), $P_y \cos \phi$ should be replaced by 1.

Similarly, for the purpose of correcting astigmatism, it is favorable to satisfy the following condition:

$$|P_y| \geq |P_x| \quad (62)$$

in an operating state with one or more deformable mirrors.

Conditions (40) to (62) mentioned above are applicable to the embodiments according to the present invention.

As for the present invention as a whole, a zooming optical system is generally one of variable magnification optical systems. The term the zooming optical system is sometimes used in the same definition as the variable magnification optical system.

The dimensions in all the embodiments are expressed in millimeters.

The deformable mirror in the aforementioned embodiment is continuously deformed along with zooming or focusing, which may be discontinuously carried out at several points.

In the embodiment, for example, the periphery of the deformable mirror is fixed relative to the other optical elements so that the middle portion is deformed. Therefore, the vertex area of the surface of the deformable mirror varies with deformation of the deformable mirror.

In an optical system using the deformable mirror, it is desirable to satisfy one of the following conditions in an operating state:

$$0 \leq |P_x| \leq 0.01 (\text{mm}^{-1}) \quad (63)$$

$$0 \leq |P_y| \leq 0.01 (\text{mm}^{-1}) \quad (64)$$

Each of these two conditions represents a case where a surface of a radius of curvature is close to a flat surface in the operating state. The flat surface is excellent because it permits easy shape control and saving of power consumption. These two conditions are established for the embodiments of the present invention.

The constituent parameters of the above-mentioned embodiment are as follows.

In the following table, "FFS" means a free-formed surface; "ASS", an aspherical surface; "RP", a reference plane; "HRP", a virtual plane; "RE", a reflecting surface; "DM", a deformable mirror, "XTR", an X toric surface; and "ANM", an anamorphic surface. Regarding the surface profile and eccentricity, "WE" and "TE" mean a wide-angle position and a telephoto position, respectively, and "OD" means an objective distance.

| Face No. | Radius of curvature | Face interval | Eccentricity | Refractive index | Abbe's number |
|---|---|---|---|---|---|
| Object surface | ∞ | 1000.00 | | | |
| 1 | ∞ (HRP, RP) | | Eccentricity (1) | | |
| 2 | FFS (1) | | Eccentricity (2) | 1.5254 | 56.2 |
| 3 | FFS (2) | | Eccentricity (3) | | |
| 4 | FFS (3) (Stop) (DM 1) | | Eccentricity (4) | | |
| 5 | FFS (2) | | Eccentricity (3) | 1.5254 | 56.2 |
| 6 | FFS (4) | | Eccentricity (5) | | |
| 7 | FFS (5) (DM 1) | | Eccentricity (6) | | |
| 8 | FFS (4) | | Eccentricity (5) | 1.5254 | 56.2 |
| 9 | FFS (6) | | Eccentricity (7) | | |
| 10 | ∞ | | Eccentricity (8) | 1.5163 | 64.1 |
| 11 | ∞ | | Eccentricity (9) | | |
| Image plane | ∞ | | Eccentricity (10) | | |

FFS (1)

| $C_4$ | $-6.7765 \times 10^{-2}$ | $C_6$ | $-6.2321 \times 10^{-2}$ | $C_8$ | $-2.2954 \times 10^{-2}$ |
| $C_{10}$ | $-1.9491 \times 10^{-2}$ | $C_{11}$ | $-3.1101 \times 10^{-3}$ | $C_{13}$ | $-6.5957 \times 10^{-3}$ |
| $C_{15}$ | $-2.9764 \times 10^{-2}$ | | | | |

FFS (2)

| $C_4$ | $-7.7519 \times 10^{-2}$ | $C_6$ | $-6.0590 \times 10^{-2}$ | $C_8$ | $-5.9666 \times 10^{-3}$ |
| $C_{10}$ | $-2.6208 \times 10^{-3}$ | $C_{11}$ | $-7.4511 \times 10^{-4}$ | $C_{13}$ | $-4.5909 \times 10^{-4}$ |
| $C_{15}$ | $-4.2617 \times 10^{-5}$ | | | | |

FFS (3)

| WE: | ∞ (flat surface) | | | | |
| TE: | | | | | |
| $C_4$ | $-1.7971 \times 10^{-2}$ | $C_6$ | $-1.8050 \times 10^{-2}$ | $C_8$ | $3.0008 \times 10^{-5}$ |
| $C_{10}$ | $-1.3132 \times 10^{-3}$ | $C_{11}$ | $-3.4160 \times 10^{-4}$ | $C_{13}$ | $-7.3683 \times 10^{-4}$ |
| $C_{15}$ | $-3.1388 \times 10^{-4}$ | | | | |

-continued

FFS (4)

| | | | | | |
|---|---|---|---|---|---|
| $C_4$ | $-6.8810 \times 10^{-2}$ | $C_6$ | $-5.6218 \times 10^{-2}$ | $C_8$ | $1.0316 \times 10^{-3}$ |
| $C_{10}$ | $-4.5924 \times 10^{-4}$ | $C_{11}$ | $-3.0583 \times 10^{-3}$ | $C_{13}$ | $5.7663 \times 10^{-4}$ |
| $C_{15}$ | $8.8386 \times 10^{-4}$ | | | | |

FFS (5)

WE:

| | | | | | |
|---|---|---|---|---|---|
| $C_4$ | $5.1461 \times 10^{-2}$ | $C_6$ | $3.7863 \times 10^{-2}$ | $C_8$ | $-3.0012 \times 10^{-3}$ |
| $C_{10}$ | $-6.4390 \times 10^{-4}$ | $C_{11}$ | $1.8790 \times 10^{-3}$ | $C_{13}$ | $2.5101 \times 10^{-3}$ |
| $C_{15}$ | $6.3665 \times 10^{-4}$ | | | | |
| TE: | ∞ (flat surface) | | | | |

FFS (6)

| | | | | | |
|---|---|---|---|---|---|
| $C_4$ | $-4.1970 \times 10^{-2}$ | $C_6$ | $-7.0058 \times 10^{-2}$ | $C_8$ | $-1.5784 \times 10^{-2}$ |
| $C_{10}$ | $-1.6308 \times 10^{-2}$ | $C_{11}$ | $-2.8968 \times 10^{-3}$ | $C_{13}$ | $4.4919 \times 10^{-3}$ |
| $C_{15}$ | $-1.1667 \times 10^{-2}$ | | | | |

Eccentric (1)

| X | 0.00 | Y | 0.00 | Z | 0.00 |
|---|---|---|---|---|---|
| α | 0.00 | β | 0.00 | γ | 0.00 |

Eccentric (2)

| X | 0.00 | Y | −0.03 | Z | 0.33 |
|---|---|---|---|---|---|
| α | 1.73 | β | 0.00 | γ | 0.00 |

Eccentric (3)

| X | 0.00 | Y | −0.10 | Z | 2.94 |
|---|---|---|---|---|---|
| α | 19.43 | β | 0.00 | γ | 0.00 |

Eccentric (4)

WE:

| X | 0.00 | Y | −0.26 | Z | 4.08 |
|---|---|---|---|---|---|
| α | 16.93 | β | 0.00 | γ | 0.00 |

TE:

| X | 0.00 | Y | −0.26 | Z | 4.12 |
|---|---|---|---|---|---|
| α | 16.93 | β | 0.00 | γ | 0.00 |

Eccentric (5)

| X | 0.00 | Y | −3.83 | Z | 1.02 |
|---|---|---|---|---|---|
| α | 8.48 | β | 0.00 | γ | 0.00 |

Eccentric (6)

WE:

| X | 0.00 | Y | −4.80 | Z | −0.22 |
|---|---|---|---|---|---|
| α | 8.00 | β | 0.00 | γ | 0.00 |

TE:

| X | 0.00 | Y | −4.80 | Z | 0.20 |
|---|---|---|---|---|---|
| α | 8.00 | β | 0.00 | γ | 0.00 |

Eccentric (7)

| X | 0.00 | Y | −4.33 | Z | 2.61 |
|---|---|---|---|---|---|
| α | −34.51 | β | 0.00 | γ | 0.00 |

Eccentric (8)

| X | 0.00 | Y | −6.16 | Z | 3.17 |
|---|---|---|---|---|---|
| α | −13.93 | β | 0.00 | γ | 0.00 |

Eccentric (9)

| X | 0.00 | Y | −6.40 | Z | 4.14 |
|---|---|---|---|---|---|
| α | −13.93 | β | 0.00 | γ | 0.00 |

Eccentric (10)

| X | 0.00 | Y | −6.46 | Z | 4.39 |
|---|---|---|---|---|---|
| α | −13.93 | β | 0.00 | γ | 0.00 |

Subsequently, values of Conditions (40) to (62) of the above embodiment will be shown. In the following table, reference symbol d represents a diameter of a circle having the same area as the beam passing portion of the deformable mirror.

|  | Deformable mirror | |
| --- | --- | --- |
|  | 1 | 2 |
| State | TE-WE | TE-WE |
| Shape of the beam passing portion | Ellipse | Square |
| Δ | 0.0016 | 0.0740 |
| (⅕) × d | 0.332 | 0.8 |
| H | 0.04 | 0.042 |
| HJ/HK | 0.0952 |  |
| φ | 27 | 40 |
| $P_x$ | −0.0361 | 0.0757 |
| $P_y$ | −0.0359 | 0.1029 |
| $\Delta P_x$ | −0.0361 | −0.0757 |
| $\Delta P_y$ | −0.0359 | −0.1029 |
| $|P_x/(P_y \cos \phi)|$ | 1.1273 | 0.9604 |
| $|P_x/P_{TOT}|$ | 0.2094 | 0.4392 |
| $|P_y/P_{TOT}|$ | 0.2085 | 0.5969 |
| $|\Delta P_x/P_{TOT}|$ | 0.2094 | 0.4392 |
| $|\Delta P_y/P_{TOT}|$ | 0.2085 | 0.5969 |

Figure 52:
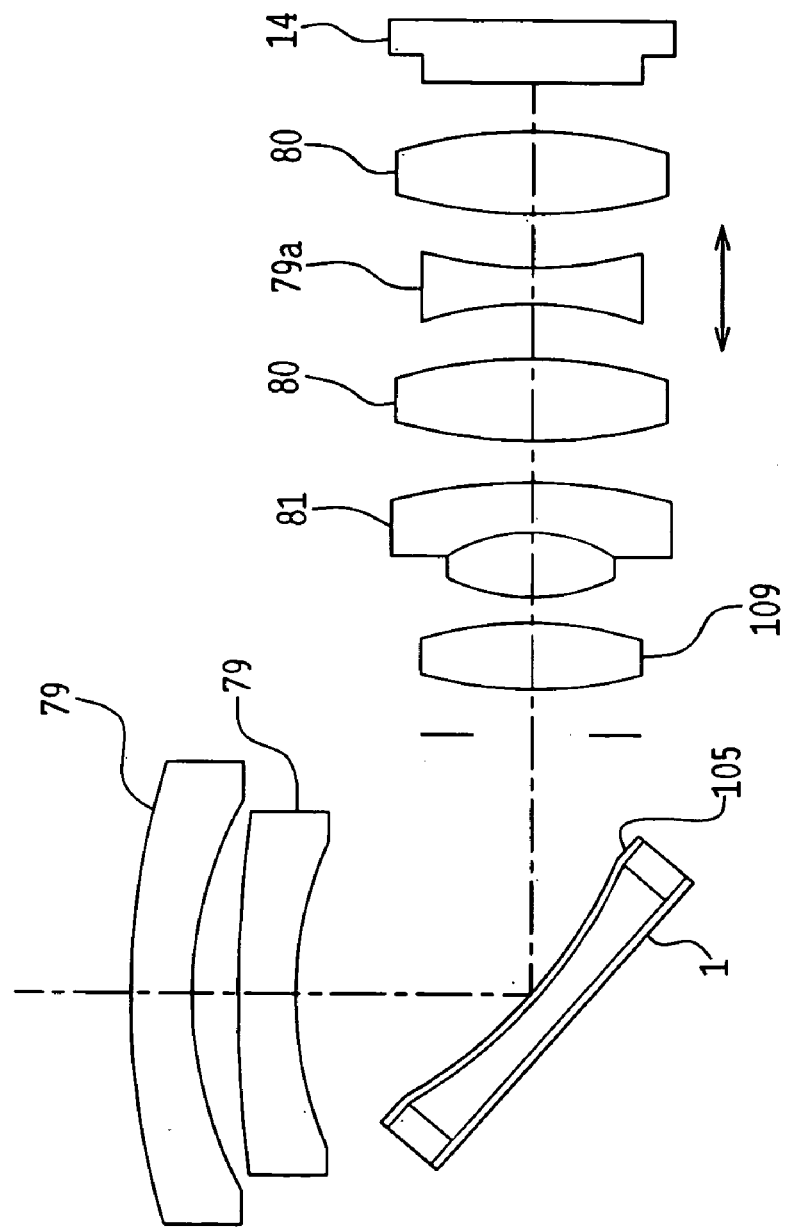
FIG. 52 is a view showing schematically a TV camera having the deformable mirror in still another embodiment of the present invention.

FIG. 52 shows a TV camera using a deformable mirror 1 of another embodiment of the present invention. In this embodiment, the deformable mirror 1 is used for focusing.

Consider now a case where light is brought to a focus at a distant point. In this case, the reflecting surface 105 of the deformable mirror 1 should be designed to be flat. However, it is not always flat as a result of a manufacturing error. For example, when a deformable mirror having an elliptic opening is fabricated by lithography, the mirror surface is not configured as a flat surface because of the camber of the substrate, and often assumes the shape of a curved surface having astigmatism.

In this embodiment, therefore, a shape error of the deformable mirror is corrected by use of a lens 109 having a non-rotationally symmetrical surface which is an example of a rotationally asymmetrical optical surface so as to cancel aberration caused by a manufacturing error.

As described above, if the reflecting surface 105 of the deformable mirror 1 has astigmatism, it is only necessary to configure at least one surface of the lens 109 as an anamorphic surface or a free-formed surface having a shape similar to the anamorphic surface.

Although in the above example the lens 109 is used, a mirror or a prism having rotationally asymmetrical surface may be combined with a deformable mirror having a shape error.

In each of the optical systems shown in FIGS. 39, 40, 43, 44, 45, 47 and 52 described above, focusing of the optical system is achieved without mechanically moving other optical elements by using the single deformable mirror 1.

In each of these optical systems, however, zooming may be carried out in such a way that the focal length is changed by moving one or more optical elements such as the convex lens 80 and the cemented lens 81, and a change of the focal position caused thereby is corrected by means of the deformable mirror. This reduces the number of moving lens units and permits achievement of a compact and lightweight optical system as compared with a case where the deformable mirror is not used.

For example, it is only necessary to change the focal length by moving a concave lens 79a in FIG. 52 in an arrow direction and to correct focus displacement (a change of the focal length) involved in zooming by changing the shape of the reflecting surface 105 of the deformable mirror 1. This consideration is applicable, for example, to the observing optical system shown in FIG. 1.

Finally, the terms used in the present invention will be described.

The term the free-formed surface used in the present invention is defined by the following equation. The Z axis in this defining equation constitutes an axis of the free-formed surface.

$$Z = cr^2 / \left[1 + \sqrt{\{1 - (1+k)c^2 r^2\}}\right] + \sum_{j=2}^{66} C_j X^m Y^n \quad (a)$$

where, the first term of this equation is a spherical surface term, and the second term is a free-formed surface term.

In the spherical surface term,
c: curvature of the vertex,
k: conic constant,
$r = \sqrt{(X^2 + Y^2)}$ The free-formed surface term is as follows:

$$\sum_{j=2}^{66} C_j X^m Y^n = C_2 X + C_3 Y + C_4 X^2 + C_5 XY + C_6 Y^2 +$$
$$C_7 X^3 + C_8 X^2 Y + C_9 XY^2 + C_{10} Y^3 + C_{11} X^4 + C_{12} X^3 Y +$$
$$C_{13} X^2 Y^2 + C_{14} XY^3 + C_{15} Y^4 + C_{16} X^5 + C_{17} X^4 Y + C_{18} X^3 Y^2 +$$
$$C_{19} X^2 Y^3 + C_{20} XY^4 + C_{21} Y^5 + C_{22} X^6 + C_{23} X^5 Y + C_{24} X^4 Y^2 +$$
$$C_{25} X^3 Y^3 + C_{26} X^2 Y^4 + C_{27} XY^5 + C_{28} Y^6 + C_{29} X^7 + C_{30} X^6 Y +$$
$$C_{31} X^5 Y^2 + C_{32} X^4 Y^3 + C_{33} X^3 Y^4 + C_{34} X^2 Y^5 + C_{35} XY^6 + C_{36} Y^7$$

where, $C_j$ (j is an integer of 2 or larger) is a coefficient.

The above-mentioned free-formed surface never generally has a symmetric surface for both the X-Z plane and the Y-Z plane. However, by bringing all odd-number order terms of X to 0, a free-formed surface having only one symmetrical surface parallel to the Y-Z plane is obtained. By bringing all odd-number order terms to 0, a free-formed surface having only one symmetrical surface parallel to the X-Z plane is obtained.

As another defining equation of the free-formed surface which is a surface of a rotationally asymmetrical curved shape, it is possible to define the same by a Zernike polynomial. The shape of this surface is defined by means of the following equation (b). The Z axis of this defining equation (b) constitutes the axis of the Zernike polynomial. The rotationally asymmetrical surface is defined by means of polar coordinates of the axial height of Z relative to the X-Y plane, where A represents the distance from the Z axis within the X-Y plane and R represents the azimuth around the Z axis, expressed by the rotational angle as measured from the Z axis.

$$x = R \times \cos(A) \quad (b)$$
$$y = R \times \sin(A)$$
$$Z = D_2 + D_3 R \cos(A) + D_4 R \sin(A) +$$

-continued $$D_5R^2\cos(2A) + D_6(R2-1) + D_7R^2\sin(2A) + D_8R^3\cos(3A) +$$

$$D_9(3R^3 - 2R)\cos(A) + D_{10}(3R^3 - 2R)\sin(A) + D_{11}R^3\sin(3A) +$$

$$D_{12}R^4\cos(4A) + D_{13}(4R^4 - 3R^2)\cos(2A) + D_{14}(6R^4 - 6R^2 + 1) +$$

$$D_{15}(4R^4 - 3R^2)\sin(2A) + D_{16}R^4\sin(4A) + D_{17}R^5\cos(5A) +$$

$$D_{18}(5R^5 - 4R^3)\cos(3A) + D_{19}(10R^5 - 12R^3 + 3R)\cos(A) +$$

$$D_{20}(10R^5 - 12R^3 + 3R)\sin(A) + D_{21}(5R^5 - 4R^3)\sin(3A) +$$

$$D_{22}R^5\sin(5A) + D_{23}R^6\cos(6A) + D_{24}(6R^6 - 5R^4)\cos(4A) +$$

$$D_{25}(15R^6 - 20R^4 + 6R^2)\cos(2A) + D_{26}(20R^6 - 30R^4 + 12R^2 - 1) +$$

$$D_{27}(15R^6 - 20R^4 + 6R^2)\sin(2A) +$$

$$D_{28}(6R^6 - 5R^4)\sin(4A) + D_{29}R^6\sin(6A)$$

where $D_m$ (m is an integer of 2 or larger) is a coefficient. In order to design an optical system symmetrical about the direction of the X axis, it is only necessary to use $D_4$, $D_5$, $D_6$, $D_{10}$, $D_{11}$, $D_{12}$, $D_{13}$, $D_{14}$, $D_{20}$, $D_{21}$, $D_{22}$. . . .

The above defining equations have been shown as an example of a rotationally asymmetrical curved surface. It is needless to mention that the same advantages are available for any other defining equation. So far as mathematically the same value is obtained, the curved surface profile may be expressed by any other definition.

As an example of another defining equation of the free-formed surface, the following defining equation (c) is available:

$$Z = \Sigma_n \Sigma_m C_{nm} X^n Y^m.$$

For example, when k=7 (seventh order equation) is considered, it is possible to explode as follows:

$$Z = C_2 + C_3Y + C_4|X| + C_5Y^2 + C_6Y|X| + C_7X^2 + C_8Y^3 + C_9Y^2|X| + \quad (c)$$

$$C_{10}YX^2 + C_{11}|X^3| + C_{12}Y^4 + C_{13}Y^3|X| + C_{14}Y^2X^2 + C_{15}Y|X^3| +$$

$$C_{16}X^4 + C_{17}Y^5 + C_{18}Y^4|X| + C_{19}Y^3X^2 + C_{20}Y^2|X^3| + C_{21}YX^4 +$$

$$C_{22}|X^5| + C_{23}Y^6 + C_{24}Y^5|X| + C_{25}Y^4X^2 + C_{26}Y^3|X^3| +$$

$$C_{27}Y^2X^4 + C_{28}Y|X^5| + C_{29}X^6 + C_{30}Y^7 + C_{31}Y^6|X| + C_{32}Y^5X^2 +$$

$$C_{33}Y^4|X^3| + C_{34}Y^3X^4 + C_{35}Y^2|X^5| + C_{36}YX^6 + C_{37}|X^7|$$

The aspherical surface is a rotationally symmetrical aspherical surface obtained from the following defining equation:

$$Z = (Y^2/R)/[1+\{1-(1+K)Y^2/R^2\}^{1/2}] + AY^4 + BY^6 + CY^8 + DY^{10} +. \quad (d)$$

Here, Z is taken as the optical axis (axial chief ray) that a light traveling direction is positive, and Y is an axis perpendicular to the optical axis. In this equation, R represents a paraxial radius of curvature, K represents a conic constant, and A, B, C, D . . . represent aspherical coefficients of the fourth, sixth, eighth, and tenth orders, respectively. The Z axis is the axis of the rotationally symmetrical aspherical surface.

The shape of the anamorphic surface is defined by the following equation. A straight line passing through the origin of the surface profile and perpendicular to the optical plane is the axis of the anamorphic surface.

$$Z = (Cx \cdot X^2 + Cy \cdot Y^2)/[1+\{1-(1+Kx)Cx^2 \cdot X^2 - (1+Ky)Cy^2 \cdot Y^2\}^{1/2}] +$$

$$\Sigma Rn\{(1-Pn)X^2 + (1+Pn)Y^2\}^{(n+1)}$$

Here, for example, when n=4 (fourth-order term), the exploded form can be expressed by the following equation:

$$Z = (Cx \cdot X^2 + Cy \cdot Y^2)/ \quad (e)$$

$$[1+\{1-(1+Kx)Cx^2 \cdot X^2 - (1+Ky)Cy^2 \cdot Y^2\}^{1/2}] + R1$$

$$\{(1-P1)X^2 + (1+P1)Y^2\}^2 + R2\{(1-P2)X^2 + (1+P2)Y^2\}^3 +$$

$$R3\{(1-P3)X^2 + (1+P3)Y^2\}^4 + R4\{(1-P4)X^2 + (1+P4)Y^2\}^5$$

where Z represents the amount of shift from a tangential plane relative to the origin of the surface profile; Cx, curvature in the direction of the X axis; Cy, curvature in the direction of the Y axis; Kx, a conic coefficient in the direction of the X axis; Ky, a conic coefficient in the direction of the Y axis; Rn, an aspherical-term rotationally symmetrical component; and Pn, an aspherical-term rotationally asymmetrical component. Between a radius of curvature Rx in the direction of the X axis and the curvature Cx and between a radius of curvature Ry in the direction of the Y axis and the curvature Cy, there are the following relationships:

Rx=1/Cx, Ry=1/Cy

The toric surfaces include an X toric surface and a Y toric surface, which are defined by the following equations. A straight line passing through the origin of the surface profile and perpendicular to the optical plane is the axis of the toric surface. The X toric surface is defined as follows:

$$F(X) = Cx \cdot X^2/[1+\{1-(1+K)Cx^2 \cdot X^2\}^{1/2}] + AX^4 + BX^6 + CX^8 + DX^{10} \ldots$$

$$Z = F(X) + (\tfrac{1}{2})Cy\{Y^2 + Z^2 - F(X)^2\} \quad (f)$$

Then, it passes through the center of curvature in the Y direction and rotates around the X axis. As a result, the surface becomes aspherical in the X-Z plane and circular in the Y-Z plane.

The Y toric surface is defined as follows:

$$F(Y) = Cy \cdot Y^2/[1+\{1-(1+K)Cy^2 \cdot Y^2\}^{1/2}] + AY^4 + BY^6 + CY^8 + DY^{10} \ldots$$

$$Z = F(Y) + (\tfrac{1}{2})Cx\{X^2 + Z^2 - F(Y)^2\} \quad (g)$$

Then, it passes through the center of curvature in the Y direction and rotates around the Y axis. As a result, the surface becomes aspherical in the Y-Z plane and circular in the X-Z plane.

In the above-mentioned equation, Z represents the amount of shift from the tangential plane relative to the origin of the surface profile; Cx, curvature in the direction of the X axis; Cy, curvature in the direction of the Y axis; K, a conic coefficient; and A, B, C and D, aspherical coefficients. Also, between the radius of curvature Rx in the direction of the X axis and the curvature Cx and between the radius of curvature Ry in the direction of the Y axis and the curvature Cy, there are the following relationships:

Rx=1/Cx, Ry=1/Cy

For the eccentric surface, the amount of eccentricity between the center of the reference plane of the optical system and the position of the vertex of this surface (the directions of the X axis, Y axis, and Z axis are expressed as X, Y and Z, respectively), and inclination angles around the X axis, Y axis and the Z axis (α, β and γ (°), respectively) of the center axis of the surface (the Z axis in Equation (a) for the free-formed surface; the Z axis in Equation (d) for the aspherical surface; the Z axis in Equation (e) for the anamorphic surface; and the Z axis in Equation (f) or (g) for the toric surface) are given. In this case, the positive sign of each of the angles α and β means counterclockwise rotation in the positive direction of each axis, and the positive sign of the angle γ means clockwise rotation in the positive direction of the Z axis. The manner of rotation relative to the angles α, β and γ of the center axes of the surface is as follows: The center axis of the surface and its XYZ rectangular coordinate system are rotated counterclockwise by the angle α around the X axis, and then the center axis of the surface having been rotated is rotated counterclockwise by the angle β around the Y axis of the new coordinate system. At the same time, the coordinate system having been rotated once is also rotated counterclockwise by the angle β around the Y axis, and then, the center axis of the surface having been rotated twice is rotated clockwise by the angle γ around the Z axis of the new coordinate system.

Even when only the inclination of the reflecting surface is indicated, the inclination angle of the center axis of the surface is given as the amount of eccentricity.

Terms regarding the free-formed surface and the aspherical surface of which data are not entered are 0.

An optical apparatus used in the present invention refers to an apparatus including an optical system or optical elements. The optical apparatus need not necessarily function by itself. That is, it may be thought of as apart of an apparatus.

The optical apparatus includes an imaging device, an observation device, a display device, an illumination device, and a signal processing device.

The imaging device refers to, for example, a film camera, a digital camera, a robot's eye, a lens-exchangeable digital single-lens reflex camera, a TV camera, a moving-picture recorder, an electronic moving-picture recorder, a camcorder, a VTR camera, or an electronic endoscope. Any of the digital camera, a card digital camera, the TV camera, the VTR camera, and a moving-picture recording camera is an example of an electronic imaging device.

The observation device refers to, for example, a microscope, a telescope, spectacles, binoculars, a magnifier, a fiber scope, a finder, or a viewfinder.

The display device includes, for example, a liquid crystal display, a viewfinder, a game machine (Play Station by Sony), a video projector, a liquid crystal projector, a head mounted display (HMD), a personal digital assistant (PDA), or a cellular phone.

The illumination device includes, for example, a stroboscopic lamp for cameras, a headlight for cars, a light source for endoscopes, or a light source for microscopes.

The signal processing device refers to, for example, a cellular phone, a personal computer, a game machine, a read/write device for optical disks, or an arithmetic unit for optical computers.

The image sensor refers to, for example, a CCD, a pickup tube, a solid-state image sensor, or a photographing film. The plane-parallel plate is included in one of prisms. A change of an observer includes a change in diopter. A change of an object includes a change in object distance, the displacement of the object, the movement of the object, vibration, or the shake of the object.

The variable optical-property element includes a variable focal-length lens, a deformable mirror, a deflection prism in which a surface profile is changed, a variable angle prism, a variable diffraction optical element in which the function of light deflection is changed, namely a variable HOE, or a variable DOE.

The variable focal-length lens also includes a variable lens such that the focal length is not changed, but the amount of aberration is changed. The same holds for the case of the deformable mirror. In a word, an optical element in which the function of light deflection, such as reflection, refraction, or diffraction, can be changed is called the variable optical-property element An information transmitter refers to a device which is capable of inputting and transmitting any information from a cellular phone; a stationary phone; a remote control for game machines, TVs, radio-cassette tape recorders, or stereo sound systems; a personal computer, or a keyboard, mouse, or touch panel for personal computers. It also includes a TV monitor with the imaging device, or a monitor or display for personal computers. The information transmitter is included in the signal processing device.

In general, the present invention has the following features.

(A) The optical apparatus has the deformable mirror in which positioning marks are provided within or outside a beam passing range of the deformable mirror and on frames for mounting the deformable mirror.

(B) The optical system has the deformable mirror in which, in order to minimize variation of an image position on an imaging plane in at least two states where shapes of the deformable mirror are different, first- and lower-order terms of an equation expressing the surface of the deformable mirror are changed in the two states.

(C) The optical system is provided with an optical element having a rotationally asymmetric optical surface in order to correct aberration produced by the shape error of the deformable mirror.

(1) The optical system has an optical element constructed of a conjugate material.

(2) In item (1), the optical element of the optical system is a prism.

(3) In item (1), the optical element of the optical system is a concave lens.

(4) In any one of items (1)–(3), the optical system is provided with the deformable mirror.

(5) The optical apparatus is provided with the optical system set forth in any one of items (1)–(3) which has the deformable mirror and the image sensor.

(6) The optical apparatus is provided with the optical system set forth in any one of items (1)–(3) which has the deformable mirror, the display device, and the image sensor.

(7) The optical apparatus is provided with the optical system set forth in any one of items (1)–(3) which has the deformable mirror, the communication device, the display device, and the image sensor.

(8) The optical system is provided with a prism made of a transparent material, satisfying Condition (29) or (30), and has the deformable mirror located opposite to one surface of the prism.

(9) In item (8), the prism of the optical system is constructed of a conjugate material.

(10) The optical apparatus is provided with the optical system stated in item (8) or (9) which has the deformable mirror and the image sensor.

(11) The optical apparatus includes the optical system set forth in any one of items (8)–(10) which has the deformable mirror, display device, and the image sensor.

(12) The optical apparatus includes the optical system set forth in any one of items (8)–(11) which has the deformable mirror, the communication device, the display device, and the image sensor.

(13) The optical system is provided with the deformable mirror placed opposite to one surface of a prism with four optical surfaces and has a lens with negative power on the object side and a lens with positive power on the image side between which the prism is interposed.

(14) The imaging optical system is provided with the deformable mirror placed opposite to one surface of a prism with four optical flat surfaces and has a lens with negative power on the object side and a lens with positive power on the image side between which the prism is interposed.

(15) The imaging optical system is provided with the deformable mirror placed opposite to one surface of a prism with four optical surfaces and has the object-side surface with negative power of the prism and a lens with positive power on the image side.

(16) In any one of items (13)–(15), the imaging optical system includes an aspherical surface.

(17) The optical apparatus is provided with the optical system stated in any one of items (13)–(15) which has the display device and the image sensor.

(18) The optical system is provided with the deformable mirror placed opposite to at least one of surfaces of two prisms constituting the Schmidt prism.

(19) The imaging optical system is provided with the deformable mirror placed opposite to at least one of side surfaces (the surface 92a in FIG. 45) of two prisms constituting the Schmidt prism.

(20) The imaging optical system is provided with the deformable mirror placed opposite to at least one of side surfaces (the surface 92a in FIG. 45) of two prisms constituting the Schmidt prism and is constructed so that one of surfaces of the Schmidt prism is configured as a curved surface.

(21) In any one of items (18)–(20), the optical system has a stop close to the deformable mirror.

(22) In any one of items (18)–(21), the optical system includes a free-formed surface.

(23) In any one of items (18)–(22), the optical system includes a plurality of deformable mirrors.

(24) The imaging device is provided with the optical system set forth in any one of items (18)–(23) which has the Schmidt prism with no roof surface and the image sensor and is constructed so that an image is inverted by image processing.

(25) The optical apparatus is provided with the optical system set forth in any one of items (18)–(24) which has the display device.

(26) The deformable mirror is provided with positioning marks within a beam passing range of the deformable mirror.

(27) In item (13), the optical system has the deformable mirror in which the sum of the areas of the positioning marks is ⅕ or less of the area of the axial beam passing portion.

(28) In item (13), the optical system has the deformable mirror in which the sum of the areas of the positioning marks is 1/10 or less of the area of the axial beam passing portion.

(29) The optical apparatus includes the deformable mirror in which positioning marks are provided on frames for mounting the deformable mirror.

(30) The optical apparatus includes the deformable mirror in which a plurality of positioning marks are provided on frames for mounting the deformable mirror or members in the proximity thereof.

(31) The optical apparatus includes the deformable mirror in which positioning marks are provided within the beam passing range of the deformable mirror or outside the periphery of the portion where the surface profile of the deformable mirror is changed, or a plurality of positioning mirrors are provided on frames for mounting the deformable mirror or members in the proximity thereof.

(32) The deformable mirror satisfies Condition (35) or (36).

(33) The optical apparatus includes the deformable mirror satisfying Condition (35) or (36), the image sensor, and the display device.

(34) The optical system has a plurality of deformable mirrors in which, in order to minimize variation of an image position on an imaging plane in at least two states where shapes of each of the deformable mirrors are different, first- and lower-order terms of an equation expressing the surface of the deformable mirror are changed in the two states.

(35) The optical system has a plurality of deformable mirrors in which, in order to minimize variation of a ray position in at least two states where shapes of each of the deformable mirrors are different, first- and lower-order terms of an equation expressing the surface of the deformable mirror are changed in the two states.

(36) In item (34) or (35), the optical system is used in a variable magnification optical system.

(37) In any one of items (34)–(36), the optical system satisfies any one of Conditions (37)–(39).

(38) The optical apparatus includes the optical system stated in any one of items (34)–(37) which has the image sensor and the display device.

(39) The optical system has the deformable mirror in which, in order to minimize variation of a ray position in at least two states where shapes of the deformable mirror are different, first- and lower-order terms of an equation expressing the surface of the deformable mirror are changed in the two states.

(40) In item (B) or (39), the optical system is used in a shake compensating optical system.

(41) In item (B), (39), or (40), the optical system satisfies any one of Conditions (37)–(39).

(42) The optical apparatus includes the optical system stated in any one of items (B) and (39)–(41) which has the image sensor and the display device.

(43) The optical apparatus includes the optical system set forth in item (40) which has a shake compensating sensor.

(44) The optical system is provided with the deformable mirror in which, in order to minimize variation of an image position on an imaging plane in at least two states where shapes of the deformable mirror are different, when the deformable mirror is used to perform focusing, first- and lower-order terms of an equation expressing the surface of the deformable mirror are changed in the two states.

(45) In item (44), the optical system satisfies any one of Conditions (37)–(39).

(46) The optical apparatus includes the optical system set forth in item (44) or (45) which the image sensor and the display device.

(47) The optical system is provided with an optical element having a rotationally asymmetric optical surface in order to correct aberration produced by a shape error with fabrication in the deformable mirror fabricated by means of lithography.

(48) The optical apparatus includes the optical system set forth in item (C) or (47) which has the image sensor and the display device.

(49) The optical system is such that the magnification is changed by moving optical elements other than the deformable mirror and defocusing caused when the magnification is changed is corrected by the deformable mirror.

(50) In any one of item (A)–(C), (1), (8), (13), (18), (26), (29), (32), and (44), the optical system is such that the magnification is changed by moving optical elements other than the deformable mirror and defocusing (movement of the focal length) caused when the magnification is changed is corrected by the deformable mirror, or the optical apparatus includes this optical system.

(51) The optical apparatus has the display device and the image sensor and includes the optical system set forth in any one of items (A)–(C), (1), (8), (13), (18), (26), (29), (32), and (44) in which the magnification is changed by moving optical elements other than the deformable mirror and defocusing (movement of the focal length) caused when the magnification is changed is corrected by the deformable mirror.

What is claimed is:

1. A variable optical-property element comprising:
a surface configured to deflect light;
a driving device configured to drive the surface; and
positioning marks formed on the surface,
wherein the positioning marks are positioned within a beam passing portion of the surface.

2. A variable optical-property element according to claim 1, wherein a sum area of the positioning marks is ⅕ or less of an area of a portion of the variable optical-property element where an axial beam passes.

3. A variable optical-property element according to claim 1, wherein a sum area of the positioning marks is ⅒ or less of an area of a portion of the variable optical-property element where an axial beam passes.

4. A variable optical-property element according to claim 1, wherein the variable optical-property element is a deformable mirror.

5. An optical apparatus comprising:
a variable optical-property element having a surface configured to deflect light;
a frame configured to hold the variable optical-property element; and
positioning marks,
wherein the positioning marks are provided on the frame.

6. An optical apparatus comprising:
a variable optical-property element having a surface configured to deflect light;
a frame configured to hold the variable optical-property element; and
positioning marks,
wherein the positioning marks are provided on the frame or a member in a vicinity thereof.

7. An optical apparatus comprising:
a variable optical-property element having a surface configured to deflect light;
a holder member configured to hold the variable optical-property element; and
positioning marks,
wherein the positioning marks are provided in one of the following positions:
on the surface and inside a beam passing portion of the surface;
an a circumference of a surface deformable portion of the variable optical-property element;
outside the circumference of the surface deformable portion;
on a frame on which the variable-optical property element is mounted; and
on a member arranged in a vicinity of the frame.

8. An optical apparatus according to any one of claims 5, 6 and 7, wherein the variable optical-property element is a deformable mirror.

9. An optical apparatus according to claim 8, further comprising an image sensor and a display element.

10. An optical apparatus according to any one of claims 5, 6 and 7, further comprising an image sensor and a display element.

11. A deformable mirror that satisfies one of the following conditions:

$$0.3 < S_1/S_2 < 0.995$$

$$0.4 < S_1/S_2 < 0.95$$

where $S_1$ is an area of a beam passing portion of the deformable mirror, and $S_2$ is an area of a surface deformable portion of the deformable mirror.

12. An optical apparatus comprising:
a deformable mirror;
an image sensor; and
a display element,
wherein the deformable mirror satisfies one of the following conditions:

$$0.3 < S_1/S_2 < 0.995$$

$$0.4 < S_1/S_2 < 0.95$$

where $S_1$ is an area of a beam passing portion of the deformable mirror, and $S_2$ is an area of a surface deformable portion of the deformable mirror.

13. An optical apparatus comprising:
an image sensor;
a display element; and
a variable optical-property element comprising:
a surface configured to deflect light;
a driving device configured to drive the surface; and
positioning marks formed on the surface,
wherein the positioning marks are positioned within a beam passing portion of the surface, and
wherein the variable optical-property element is a deformable mirror.

14. An optical apparatus comprising:
an image sensor;
a display element; and
a variable optical-property element comprising:
a surface configured to deflect light;
a driving device configured to drive the surface; and
positioning marks formed on the surface,
wherein the positioning marks are positioned within a beam passing portion of the surface.

15. A variable optical property element comprising:
a surface; and
positioning marks formed on the surface,
wherein the positioning marks are positioned within a beam passing portion of the surface, and
wherein a sum area of the positioning marks is ⅕ or less of an area of a portion of the variable optical-property element where an axial beam passes.

16. A variable optical property element comprising:
a surface; and
positioning marks formed on the surface,
wherein the positioning marks are positioned within a beam passing portion of the surface, and
wherein a sum area of the positioning marks is $1/10$ or less of an area of a portion of the variable optical-property element where an axial beam passes.

* * * * *

UNITED STATES PATENT AND TRADEMARK OFFICE
CERTIFICATE OF CORRECTION

PATENT NO. : 7,054,053 B2
APPLICATION NO. : 10/887925
DATED : May 30, 2006
INVENTOR(S) : Kimihiko Nishioka It is certified that error appears in the above-identified patent and that said Letters Patent is hereby corrected as shown below:

Col. 42, line 3
replace "an"
with --on--.

Signed and Sealed this

Twenty-seventh Day of March, 2007

JON W. DUDAS
*Director of the United States Patent and Trademark Office*